Figure 1:
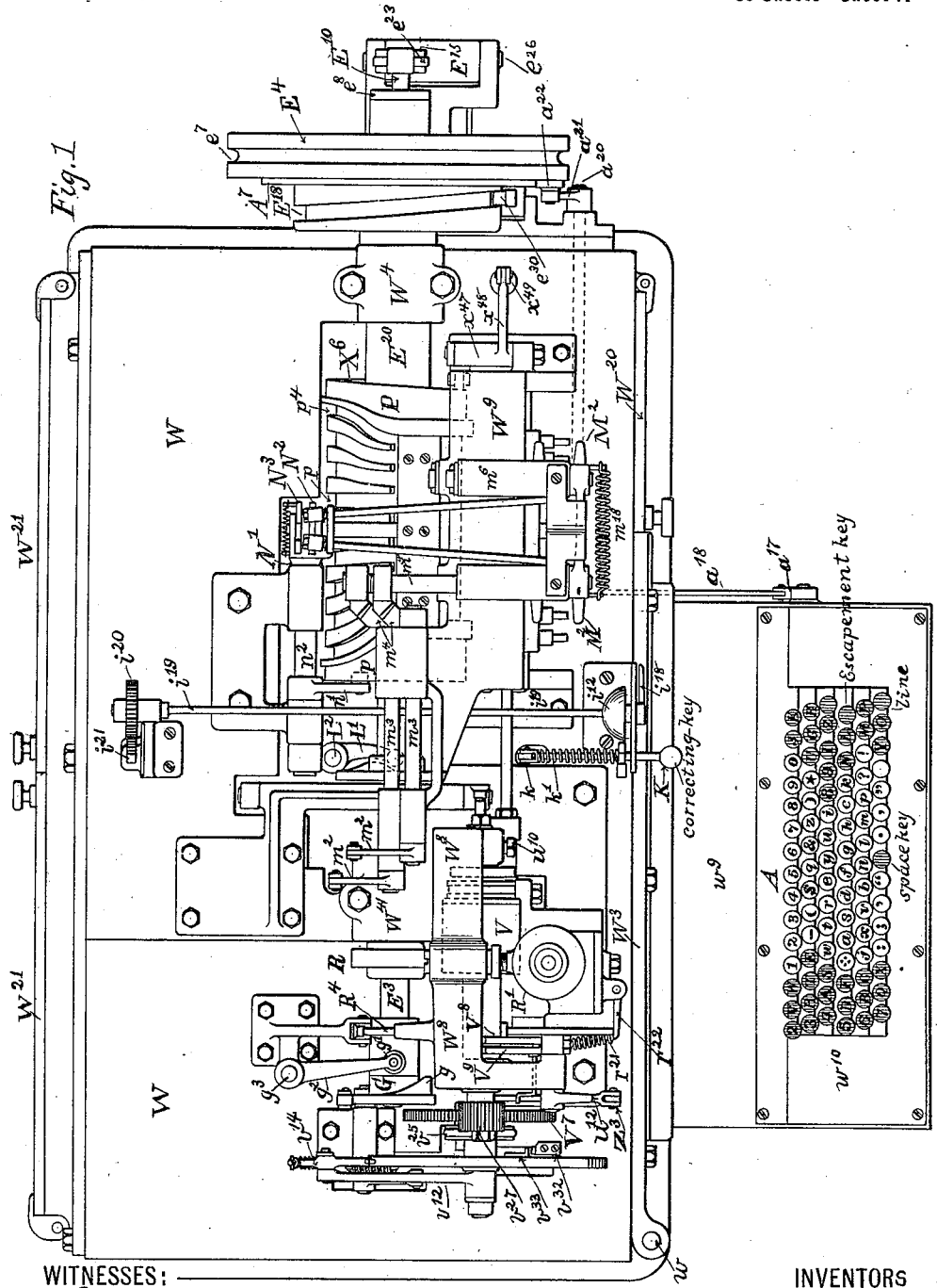

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 1.

WITNESSES:
F. W. Wright
Chas. A. Peard

INVENTORS
ISAAC RISLEY
V. F. LAKE
BY
Howson and Howson
THEIR ATTORNEYS.

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 2.

WITNESSES:
R. W. Wright
Chas. W. Peard

INVENTORS
ISAAC RISLEY
V. F. LAKE
BY
Howson and Howson
THEIR ATTORNEYS

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 3.

WITNESSES:
F. W. Wright.
Chas. A. Beard

INVENTORS
ISAAC RISLEY
V. F. LAKE
BY
Howson and Howson
THEIR ATTORNEYS

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 6.

WITNESSES:
F. W. Wright
Chas. A. Peard

INVENTORS
ISAAC RISLEY
V. F. LAKE
BY
Howson and Howson
THEIR ATTORNEYS

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 7.
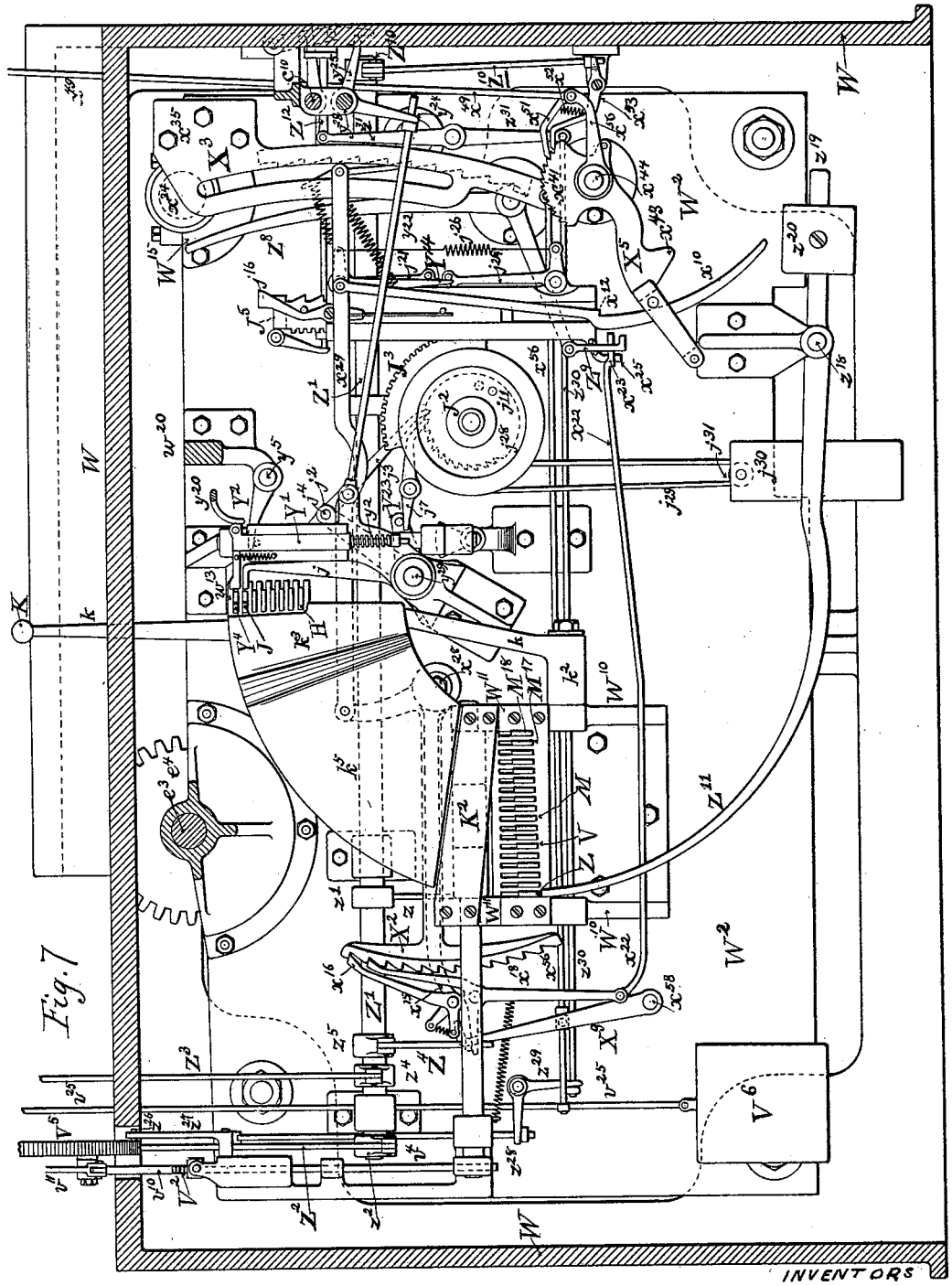
WITNESSES:
P.W. Wright
Chas A. Peard
INVENTORS
ISAAC RISLEY AND
V.F. LAKE
BY
Howson and Howson
THEIR ATTORNEYS.

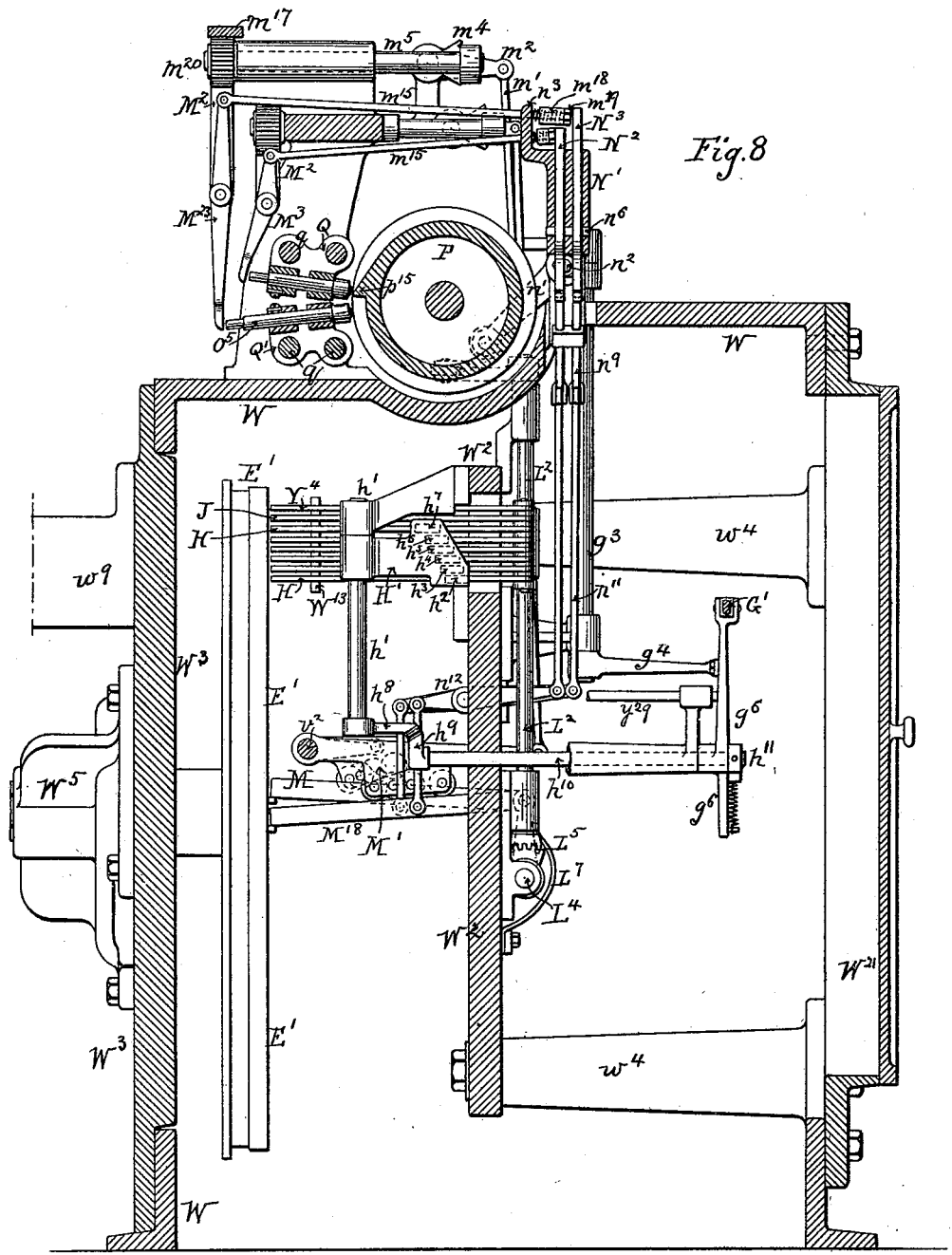

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 9.
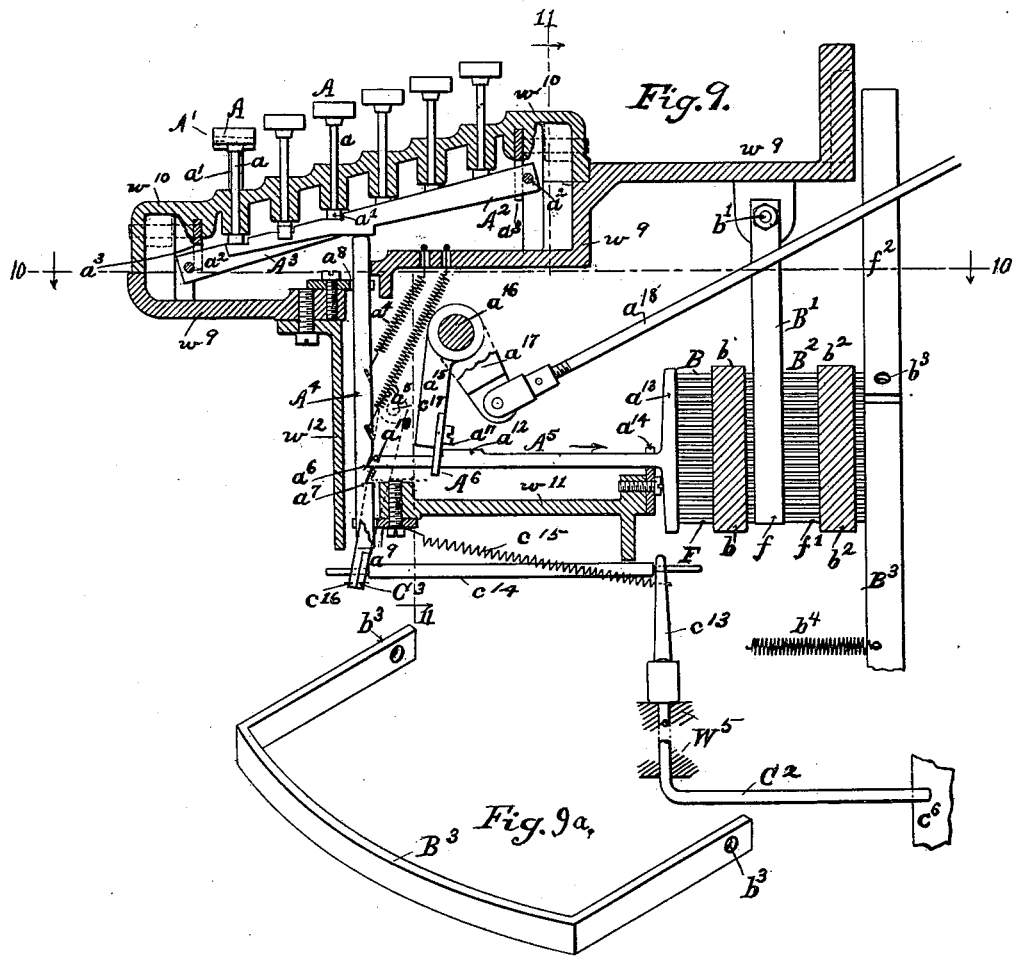
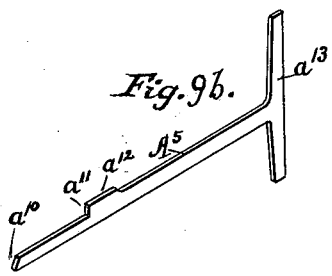
WITNESSES:—
Fred Wright
Chas. A. Peard
INVENTORS
ISAAC RISLEY
V. F. LAKE
BY Howson and Howson
THEIR ATTORNEYS

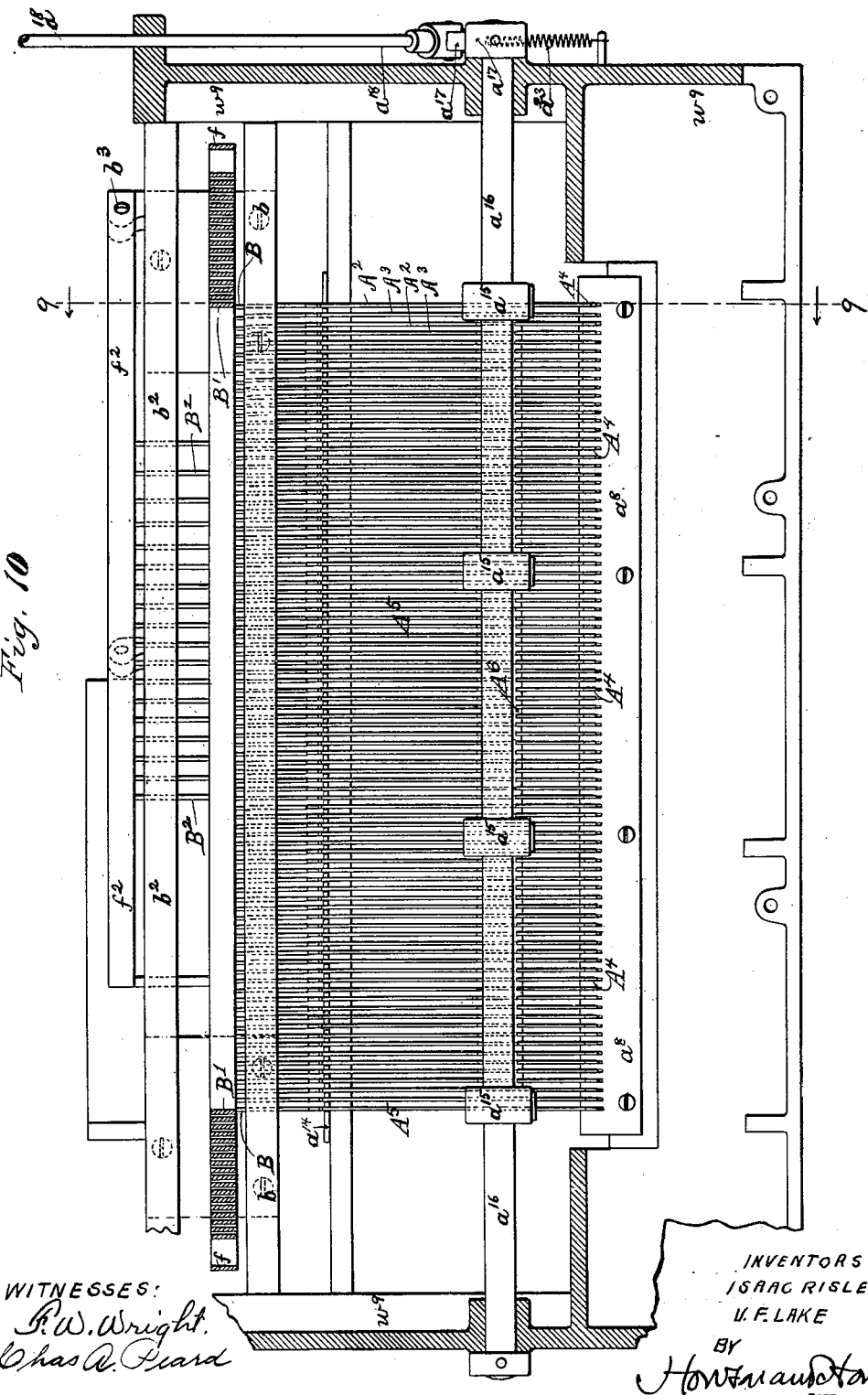

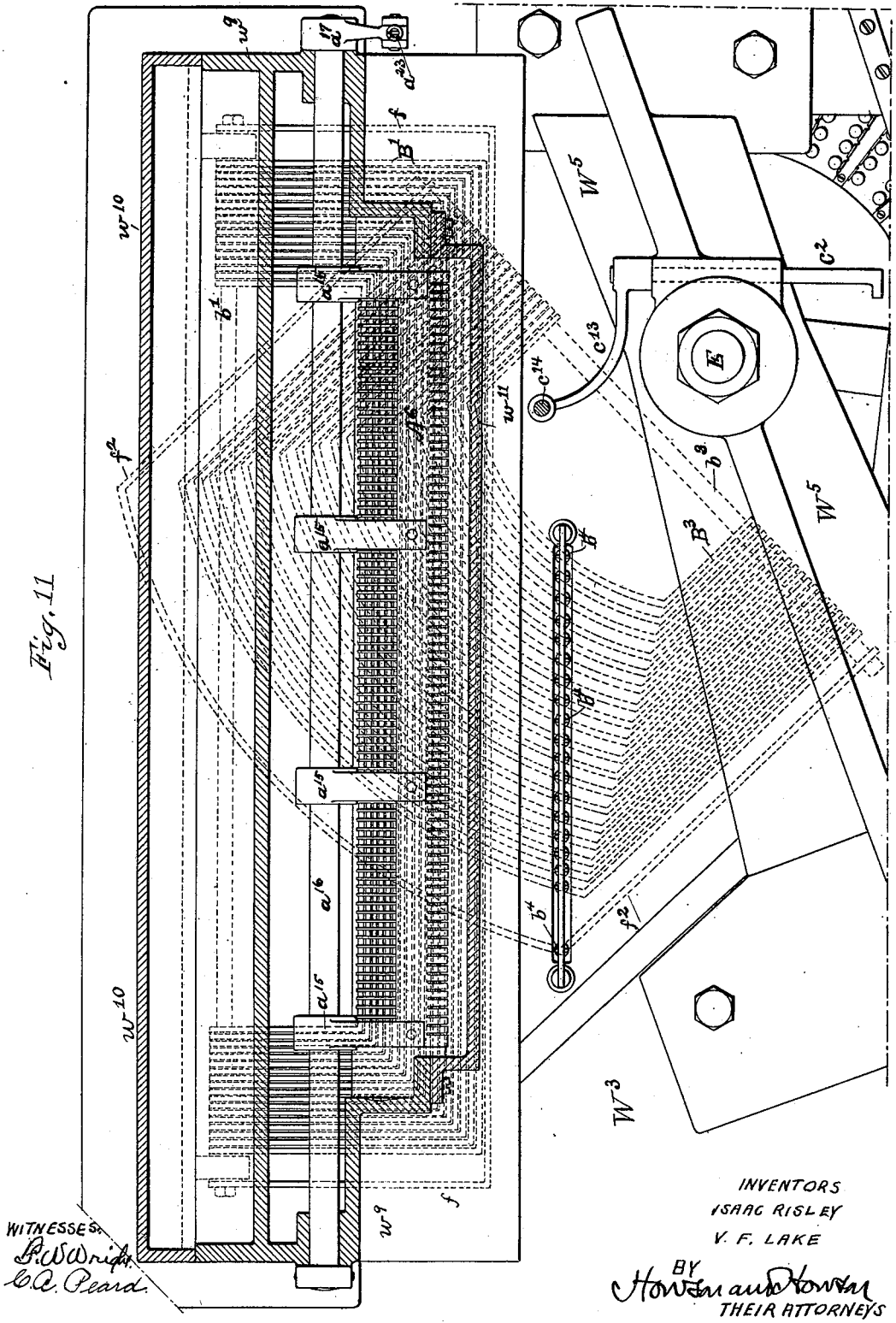

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 12.
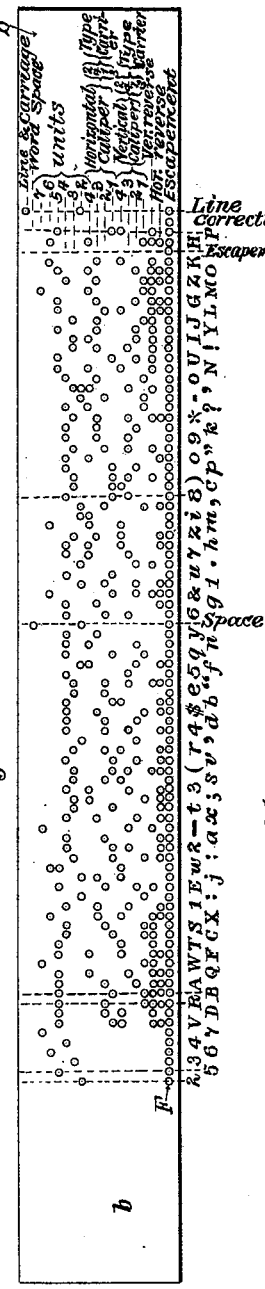
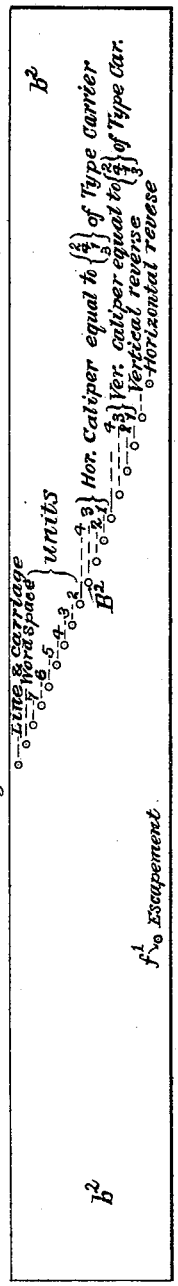
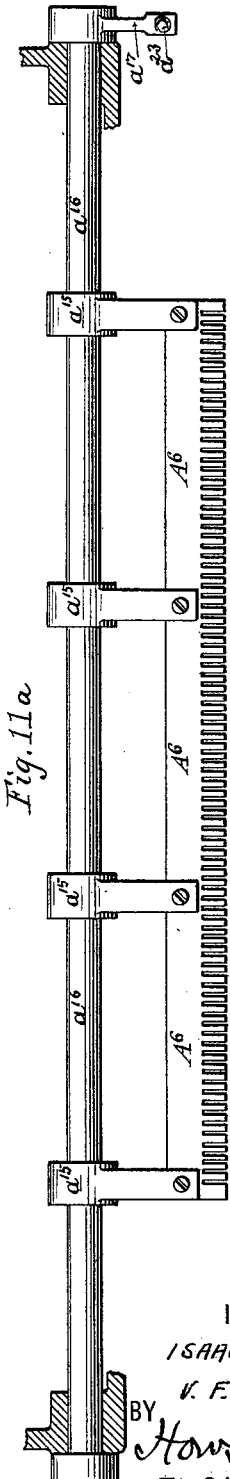
WITNESSES:
INVENTORS
ISAAC RISLEY
V. F. LAKE
BY
THEIR ATTORNEYS.

No. 626,098. Patented May 30, 1899.
I. RISLEY & V. F. LAKE.
TYPOGRAPHIC MACHINE.
(Application filed Jan. 27, 1899.)

(No Model.) 35 Sheets—Sheet 13.

WITNESSES:
F. W. Wright
Chas A. Peard

INVENTORS
ISAAC RISLEY
V. F. LAKE
BY
Howson and Howson
THEIR ATTORNEYS

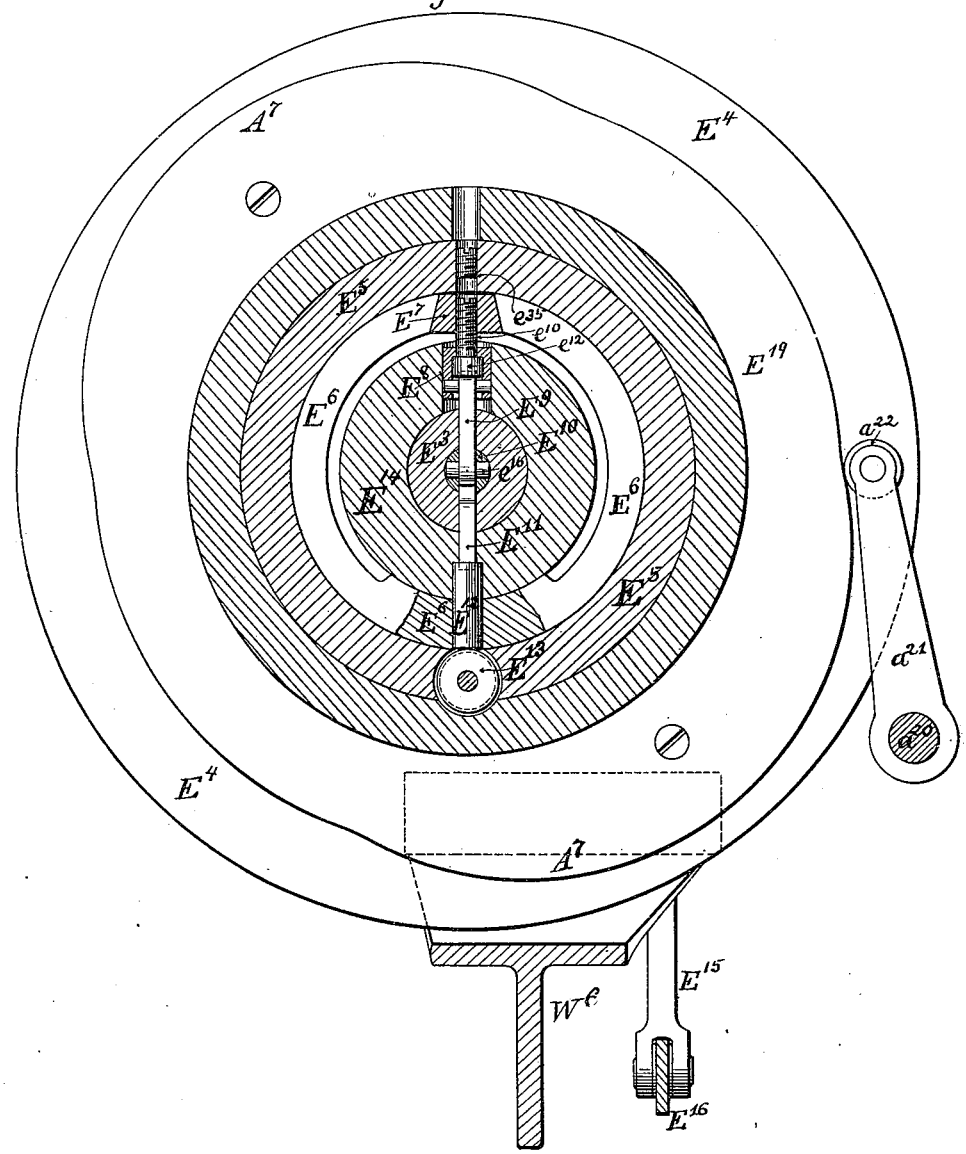

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 15.
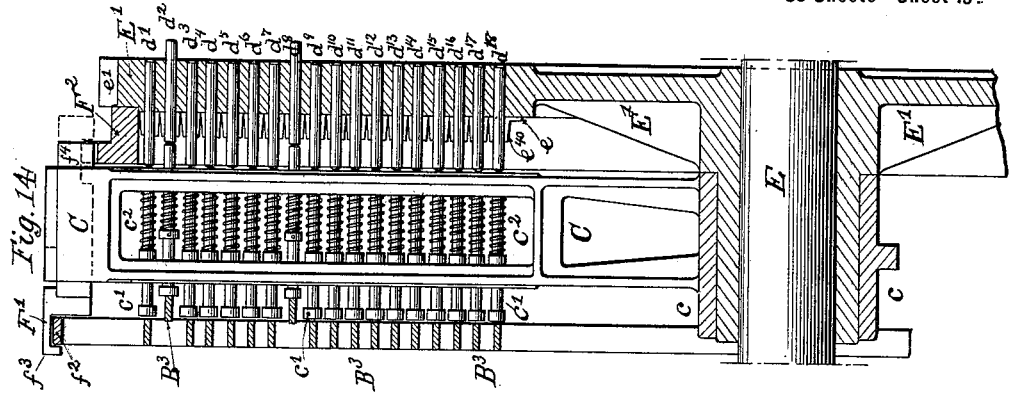
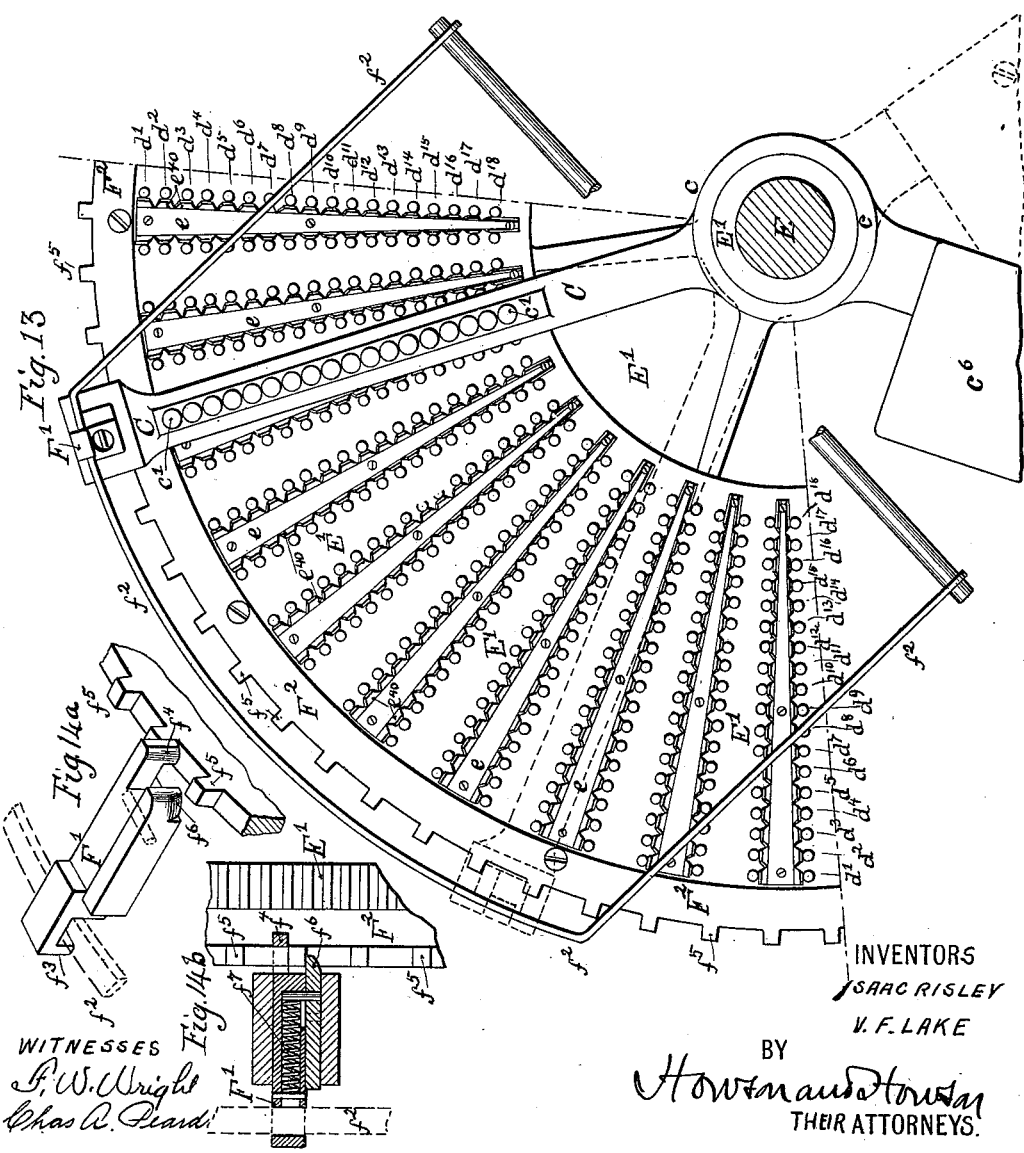
WITNESSES
F. W. Wright
Chas. A. Beard
INVENTORS
ISAAC RISLEY
V. F. LAKE
BY
Howson and Howson
THEIR ATTORNEYS.
THE NORRIS PETERS CO., PHOTO-LITHO., WASHINGTON, D. C.

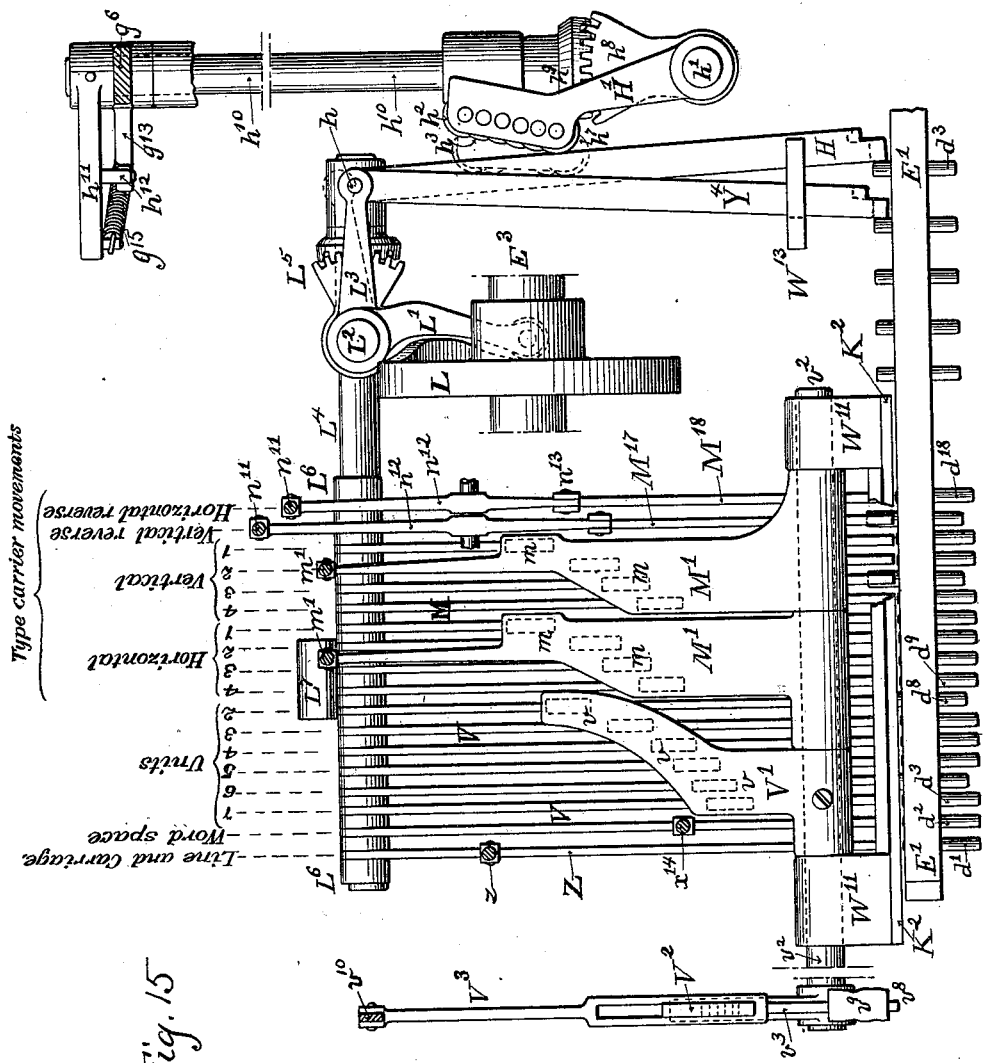

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 17.

WITNESSES:
F. W. Wright
Chas. A. Peard

INVENTORS
ISAAC RISLEY
V. F. LAKE
BY
Howson and Howson
THEIR ATTORNEYS

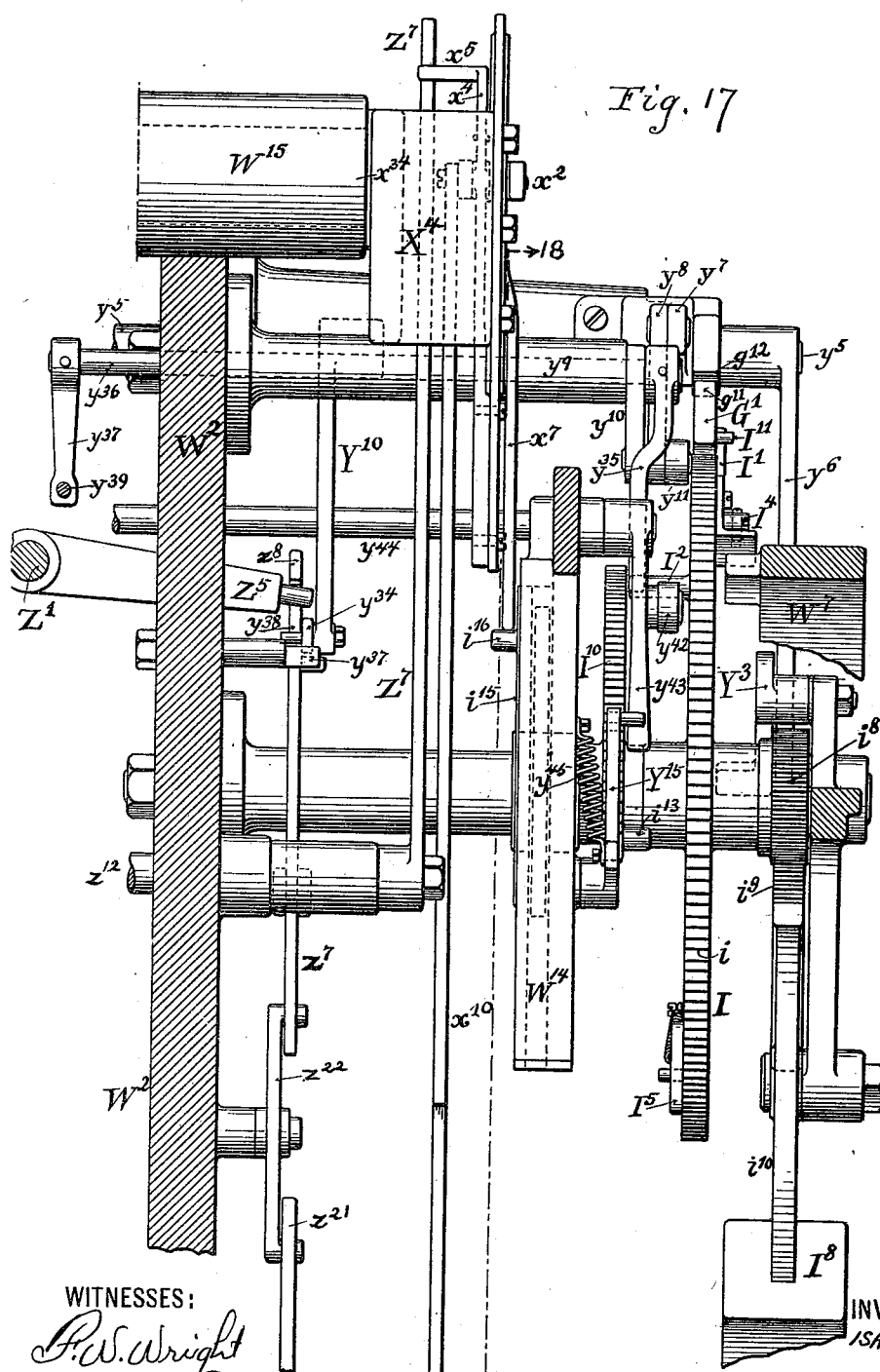

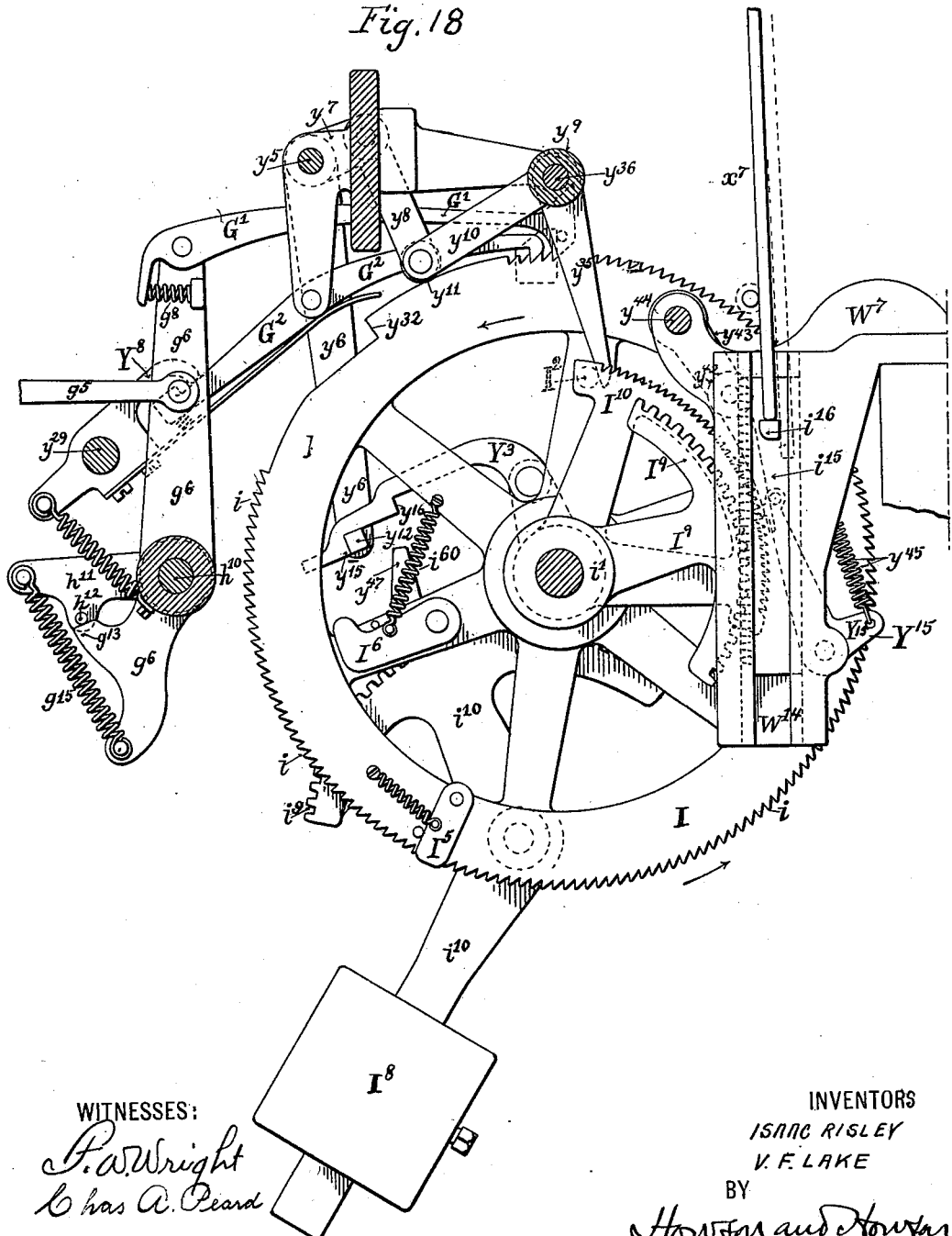

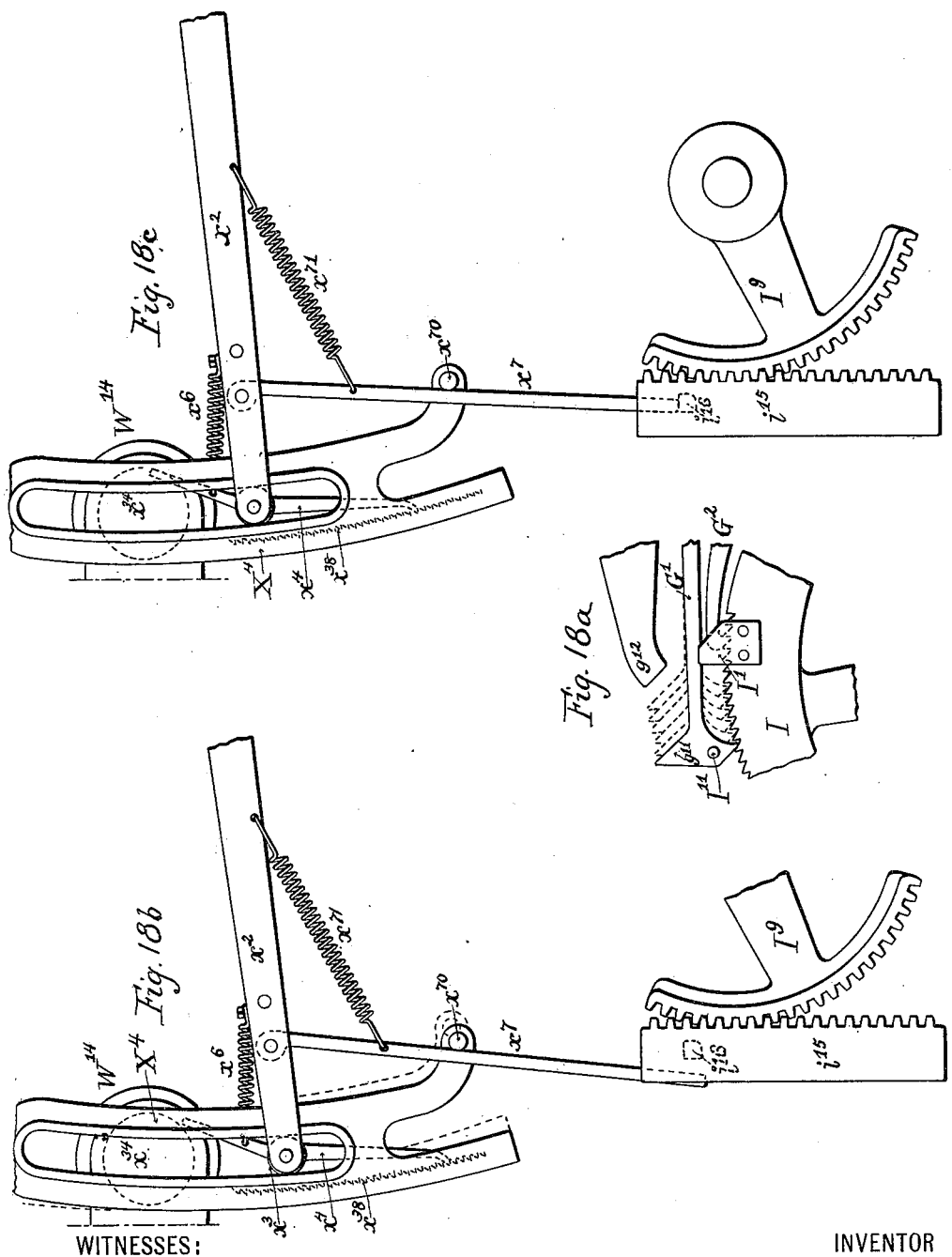

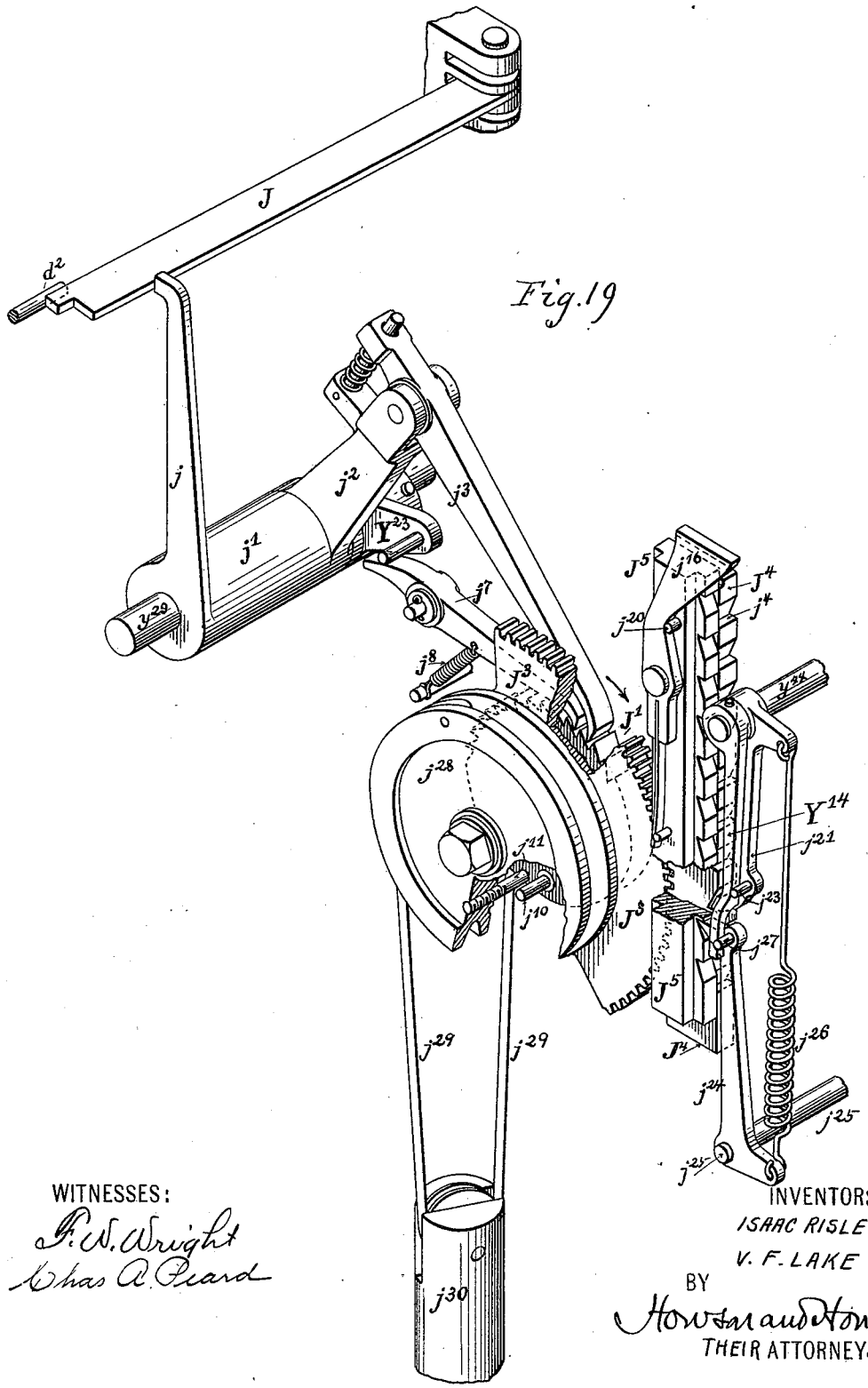

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 22.
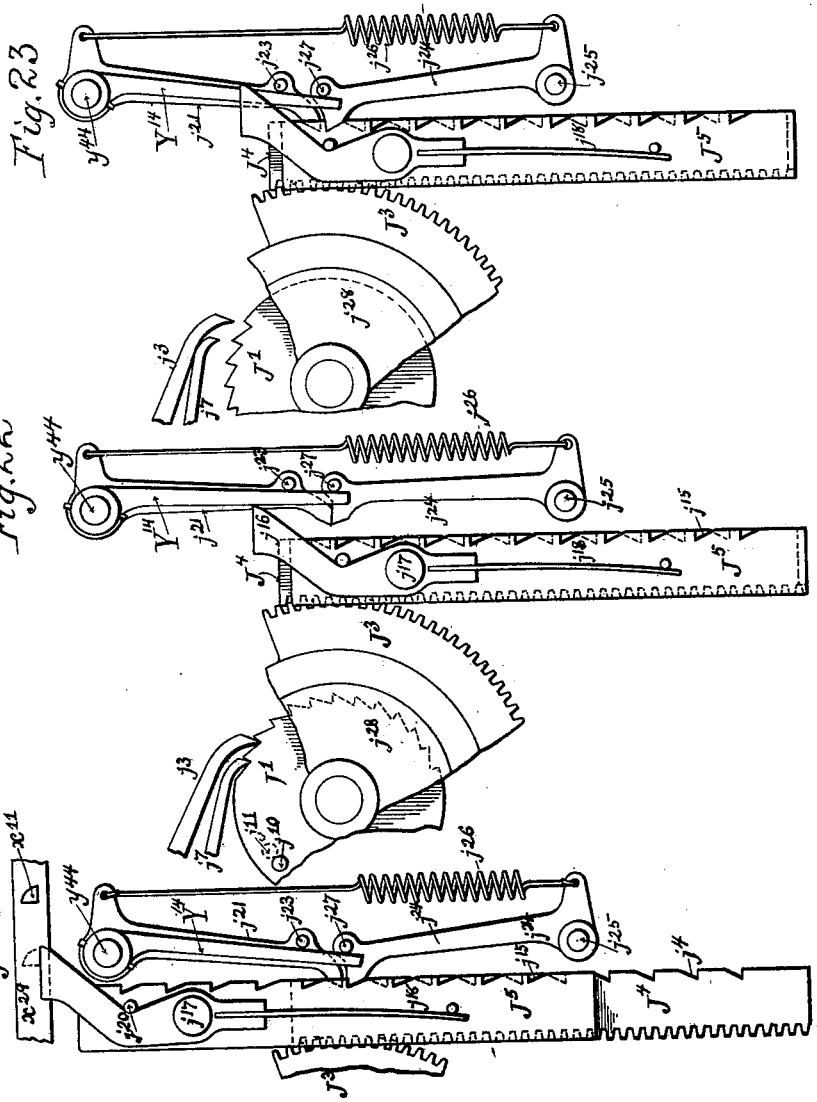
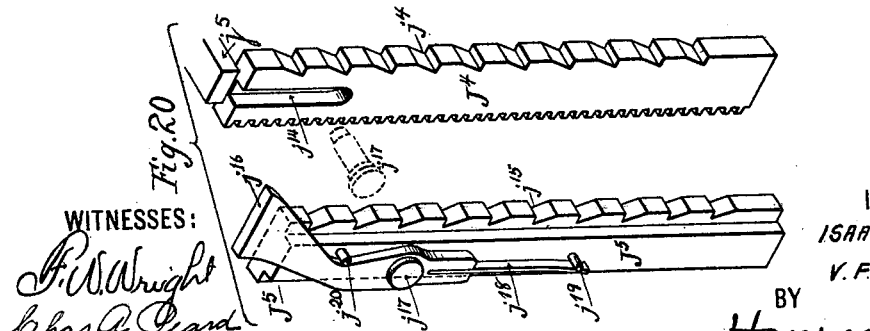
WITNESSES:
INVENTORS
ISAAC RISLEY
V. F. LAKE
BY
THEIR ATTORNEYS No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 23.
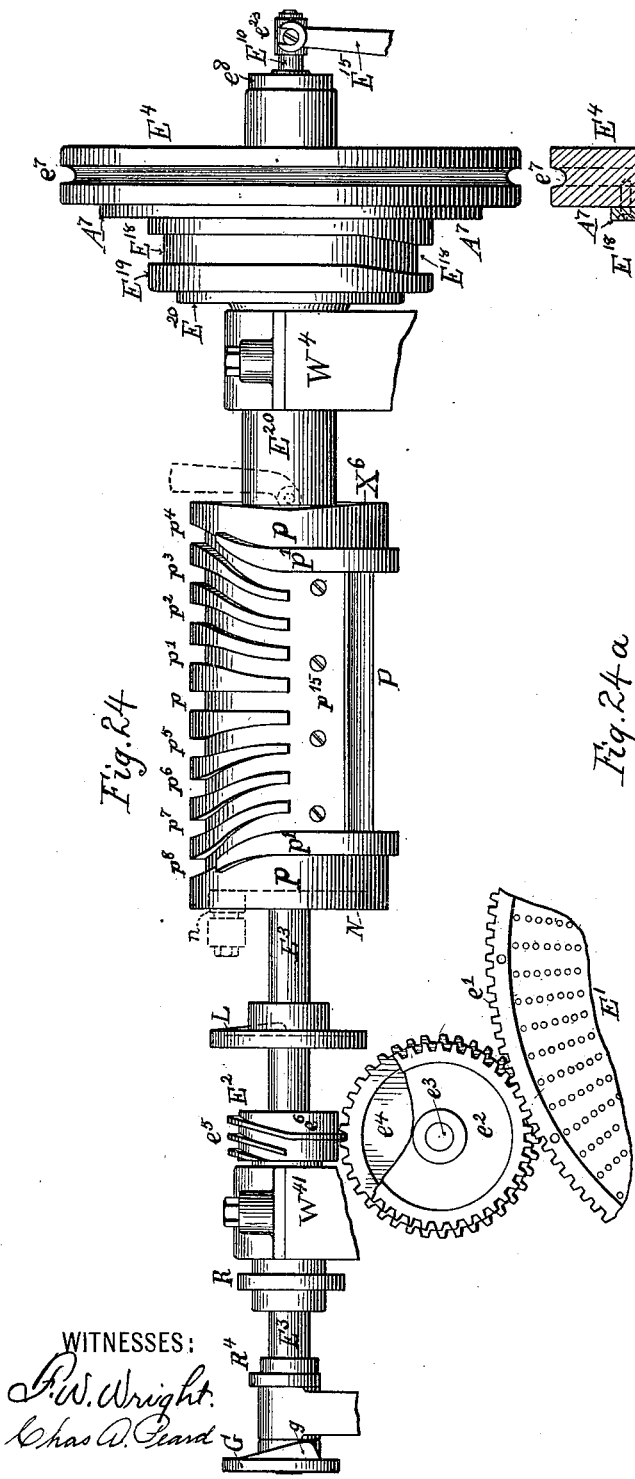
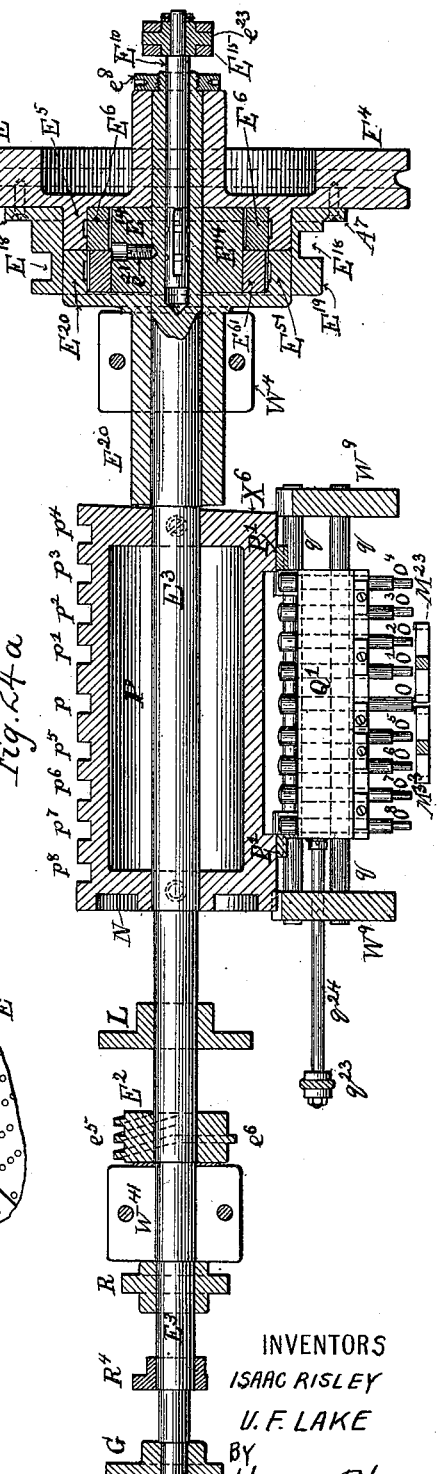
WITNESSES:
INVENTORS
ISAAC RISLEY
V. F. LAKE
BY
THEIR ATTORNEYS

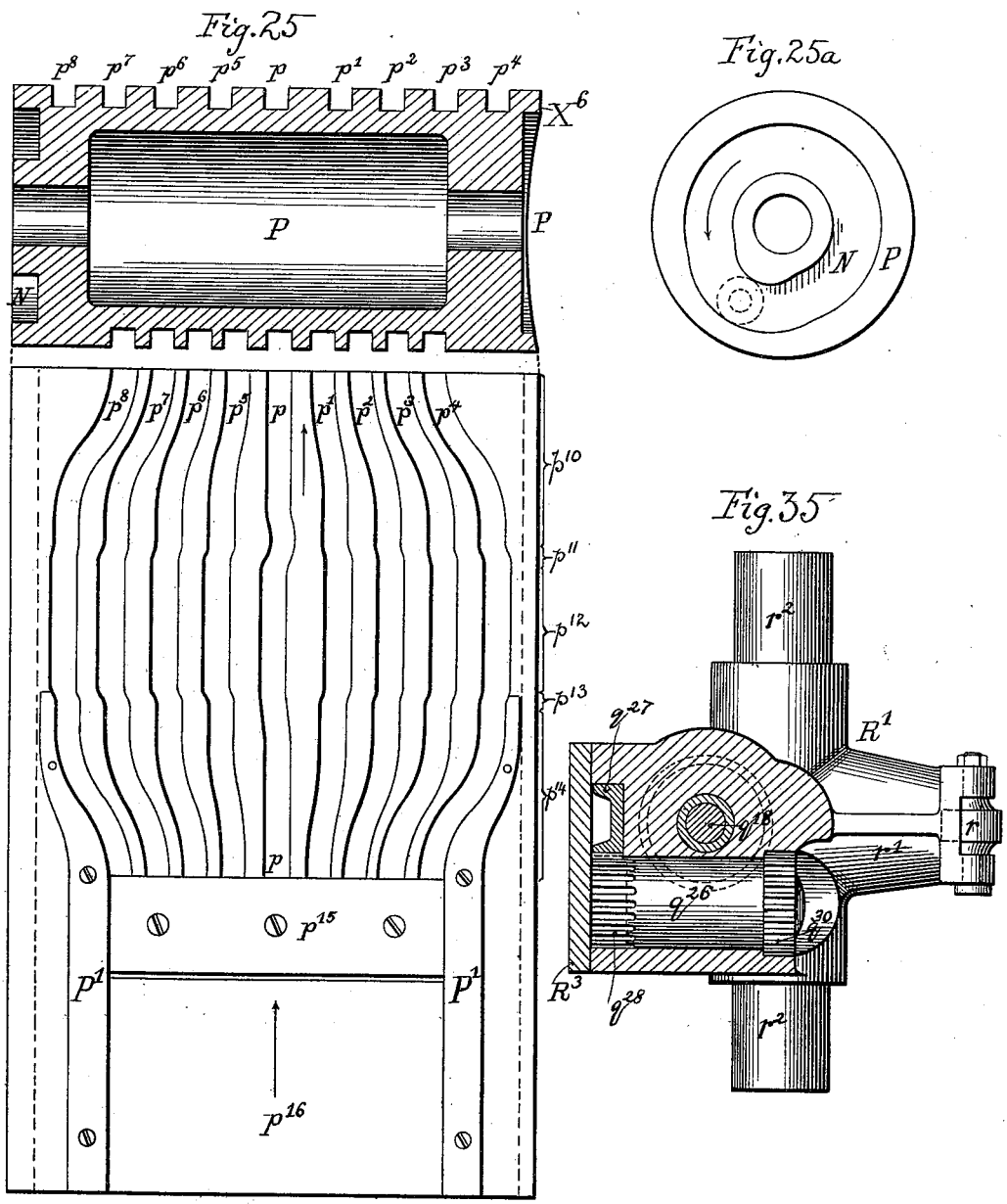

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 25.
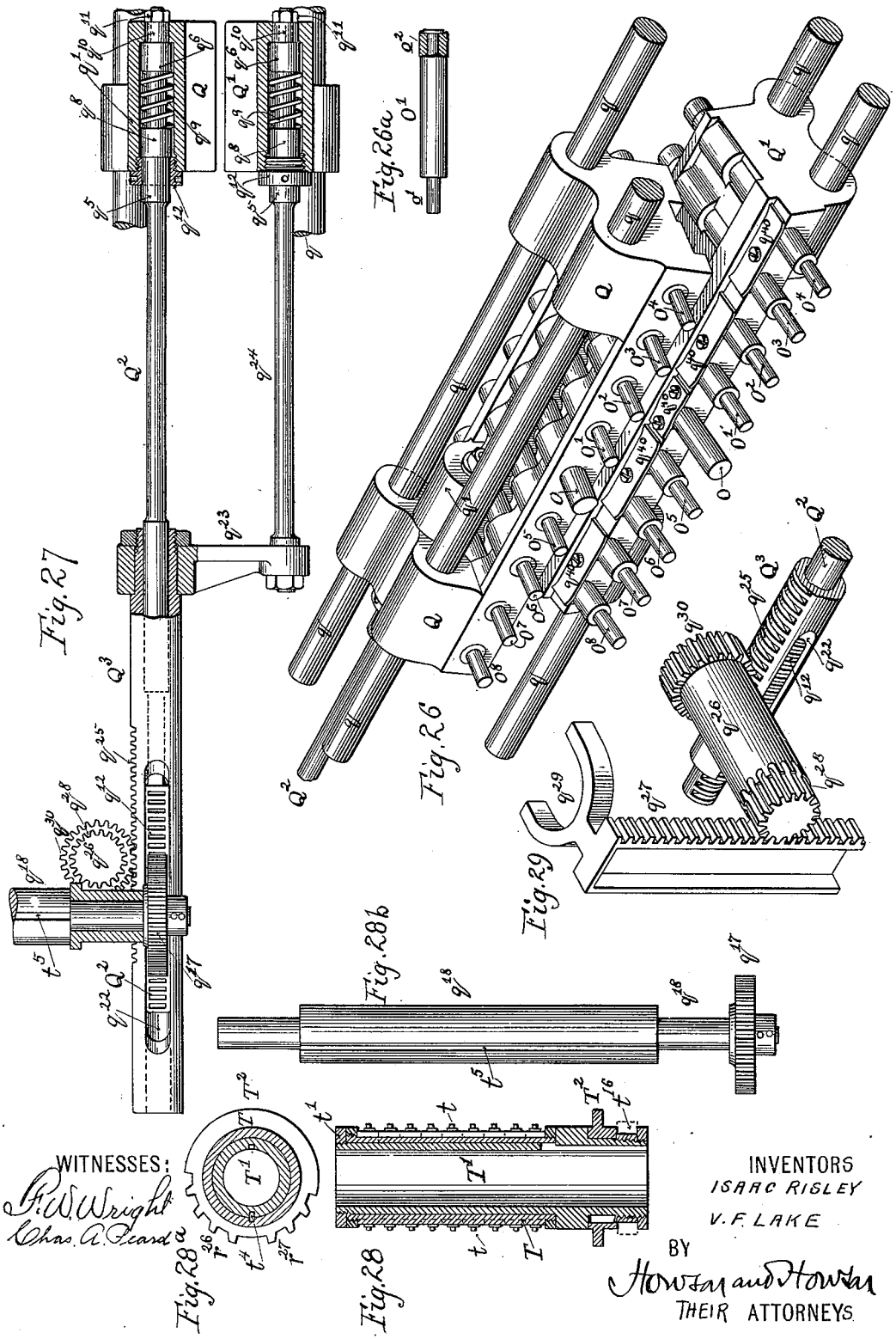
WITNESSES:
F. W. Wright
Chas. A. Peard
INVENTORS
ISAAC RISLEY
V. F. LAKE
BY
Howson and Howson
THEIR ATTORNEYS

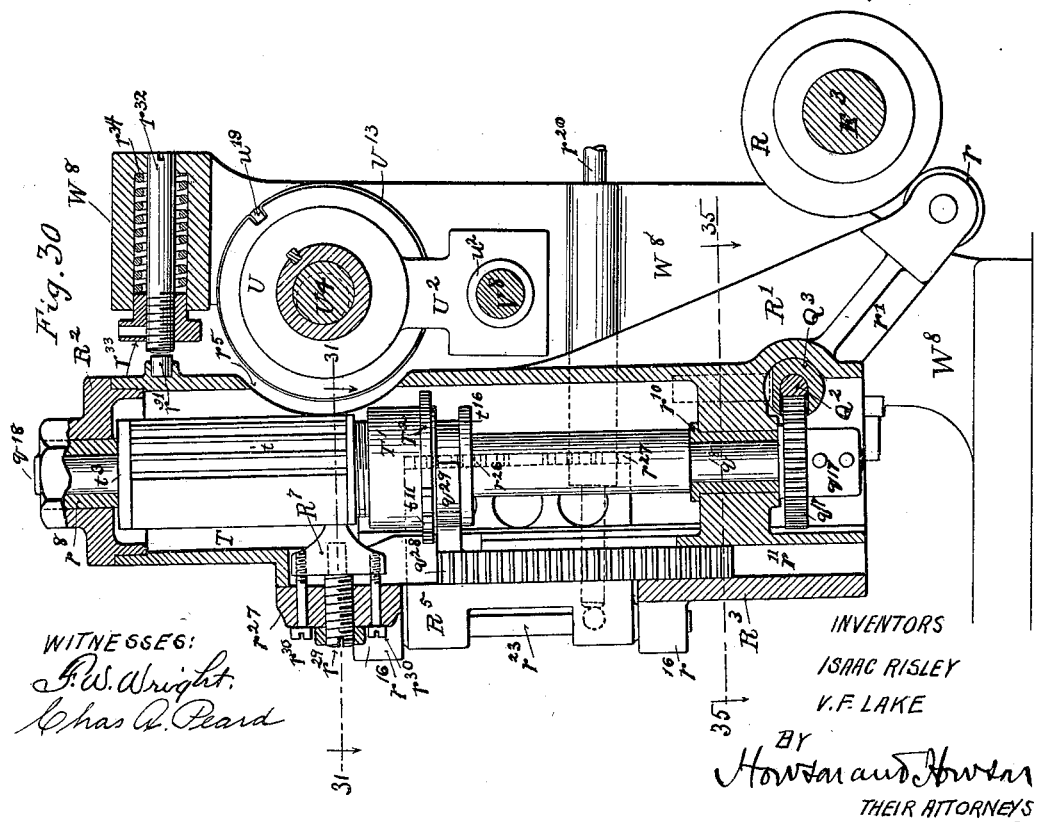

No. 626,098. Patented May 30, 1899.
I. RISLEY & V. F. LAKE.
TYPOGRAPHIC MACHINE.
(Application filed Jan. 27, 1899.)

(No Model.) 35 Sheets—Sheet 27.

WITNESSES:
F. W. Wright
Chas A. Peard

INVENTORS
ISAAC RISLEY
V. F. LAKE
BY
Howson and Howson
THEIR ATTORNEYS

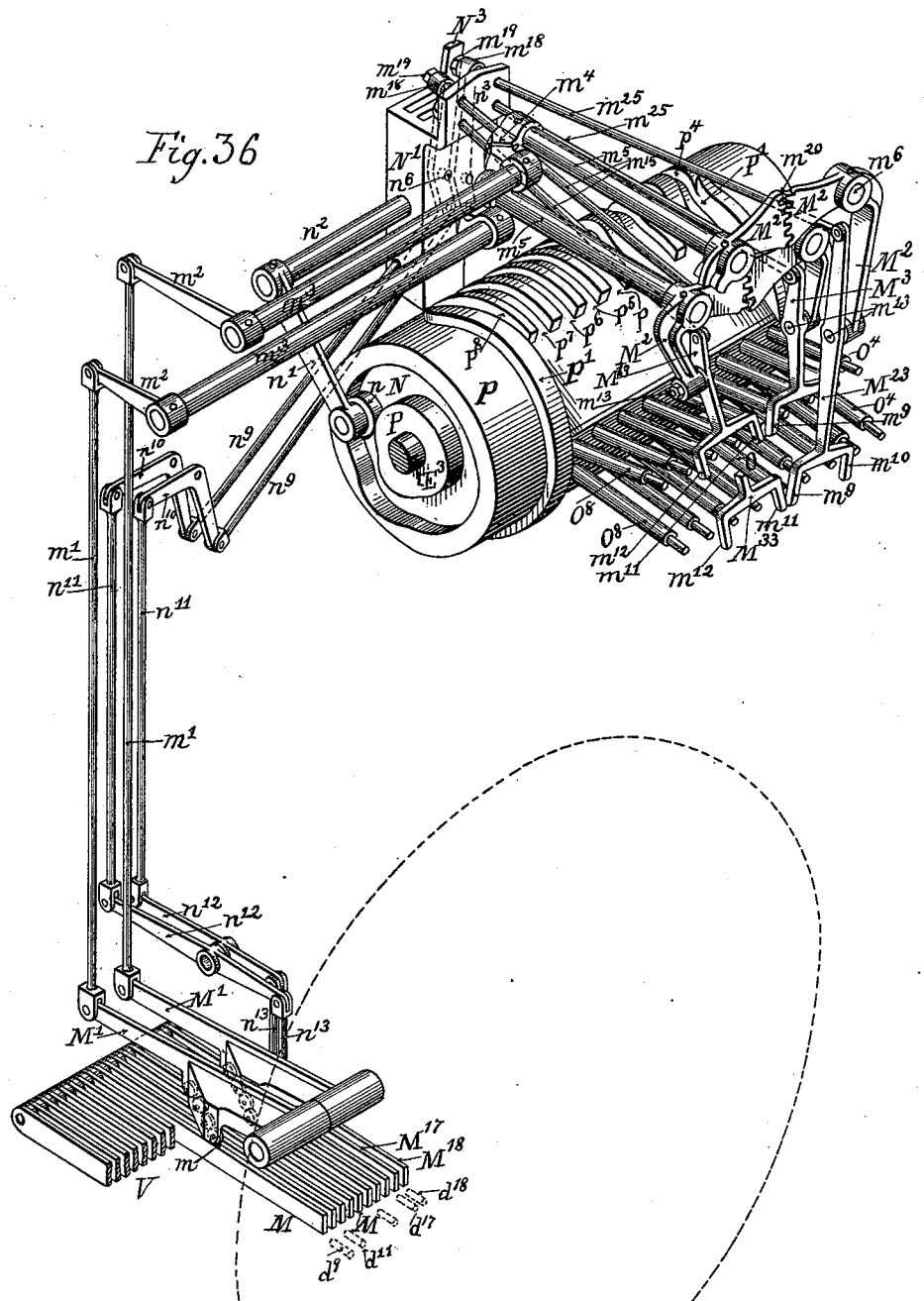

No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 29.
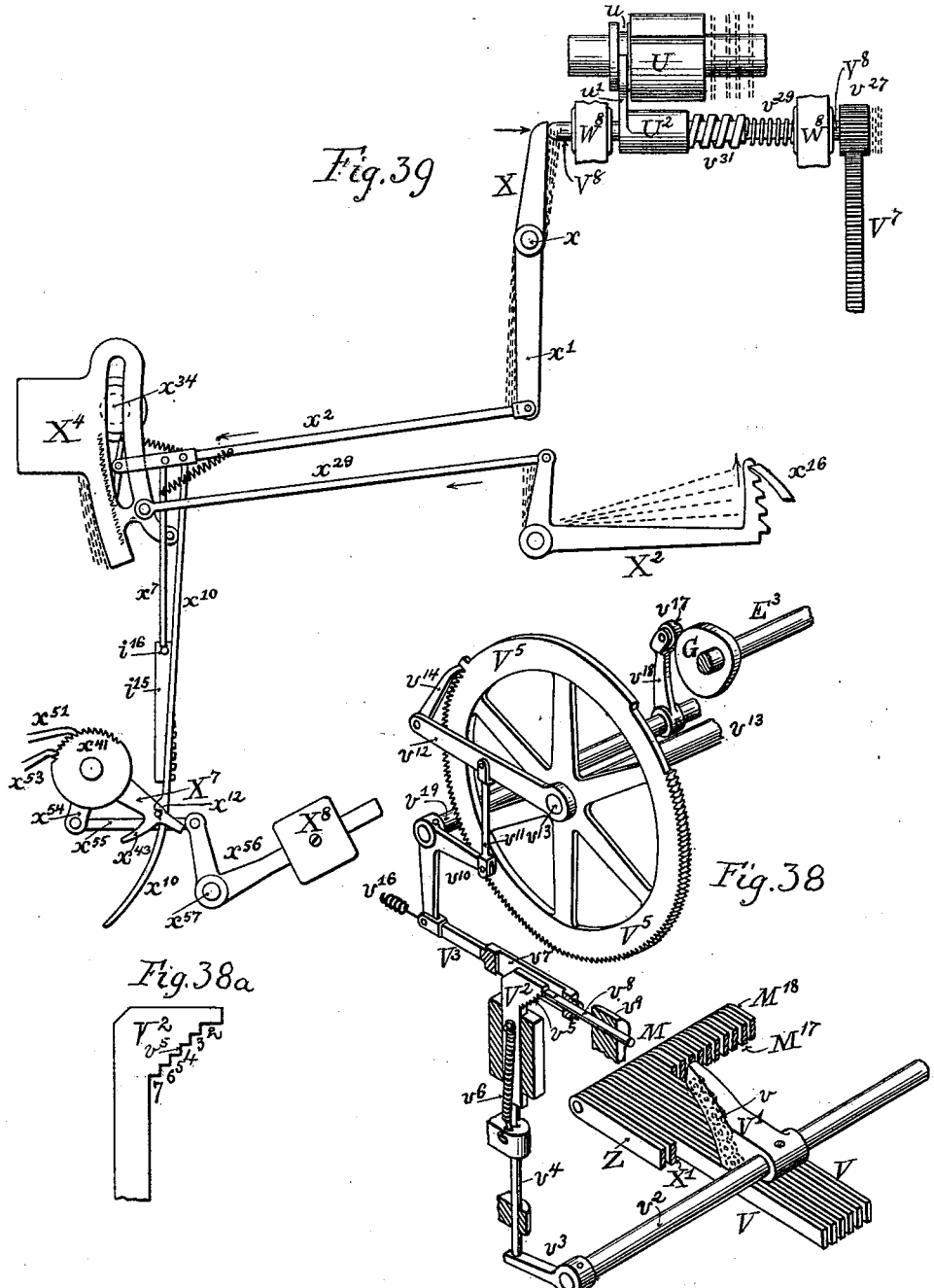
WITNESSES:
F. W. Wright
Chas. A. Peard
INVENTORS
ISAAC RISLEY
V. F. LAKE
BY
Howton and Howton
THEIR ATTORNEYS.

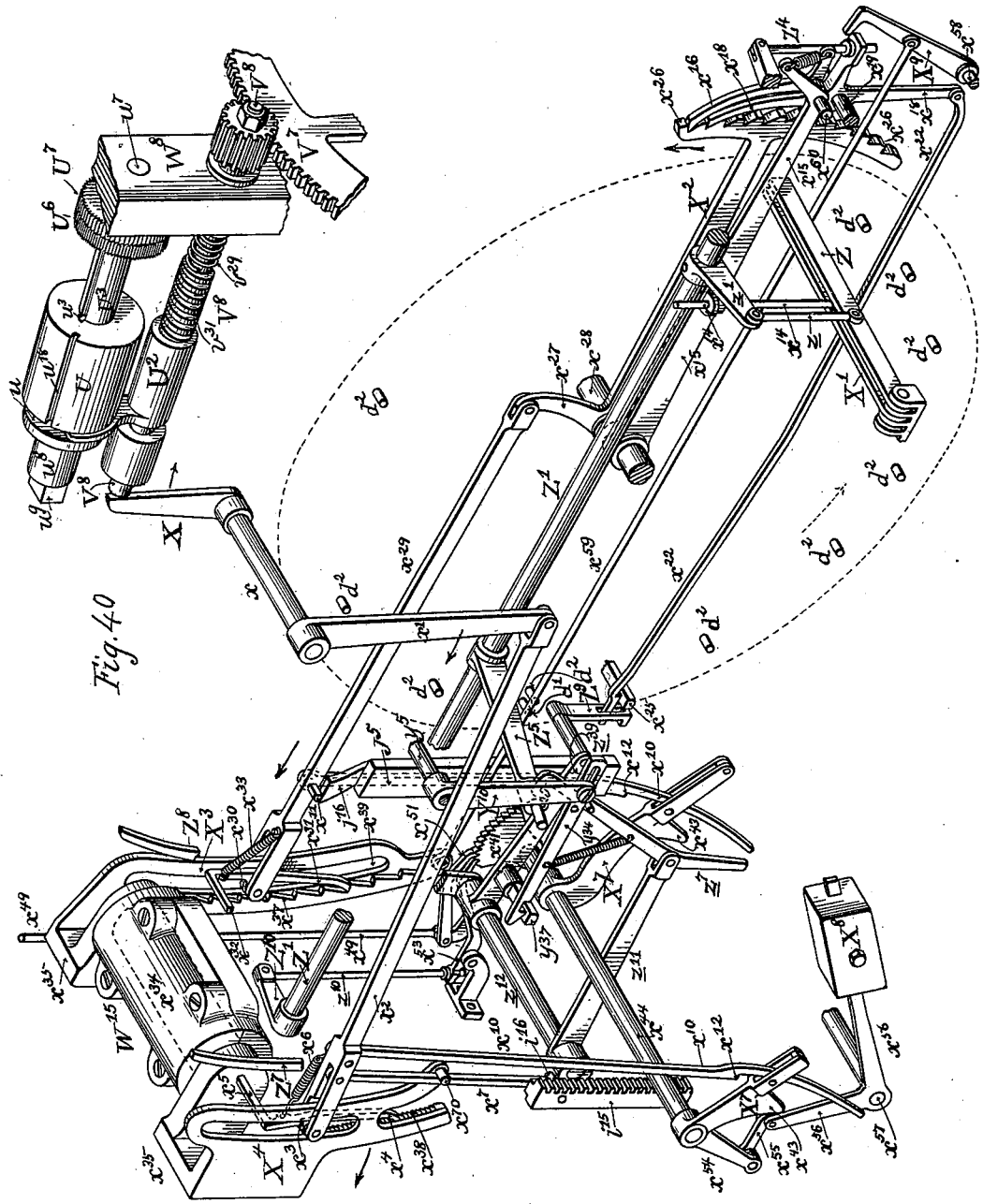

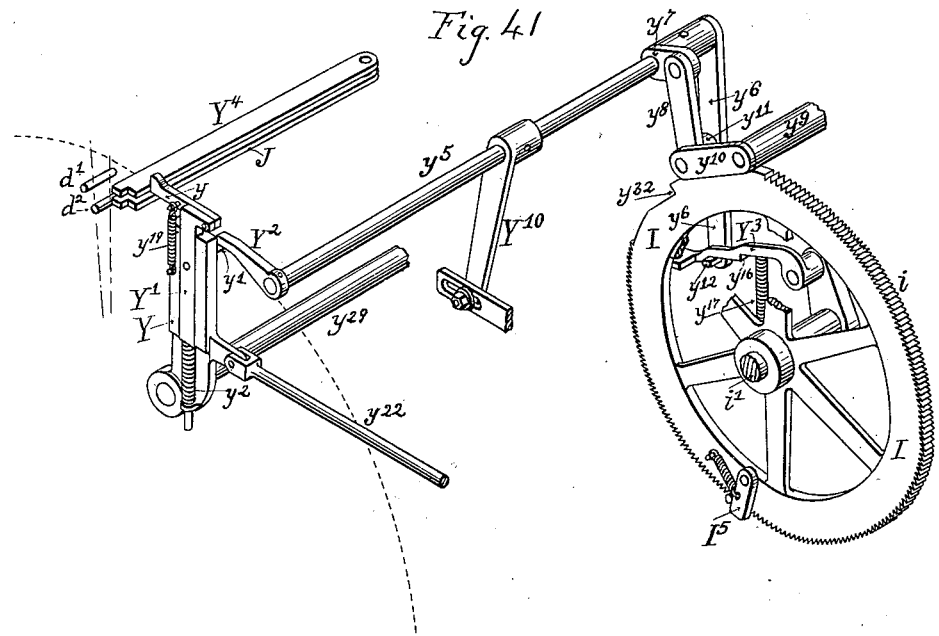
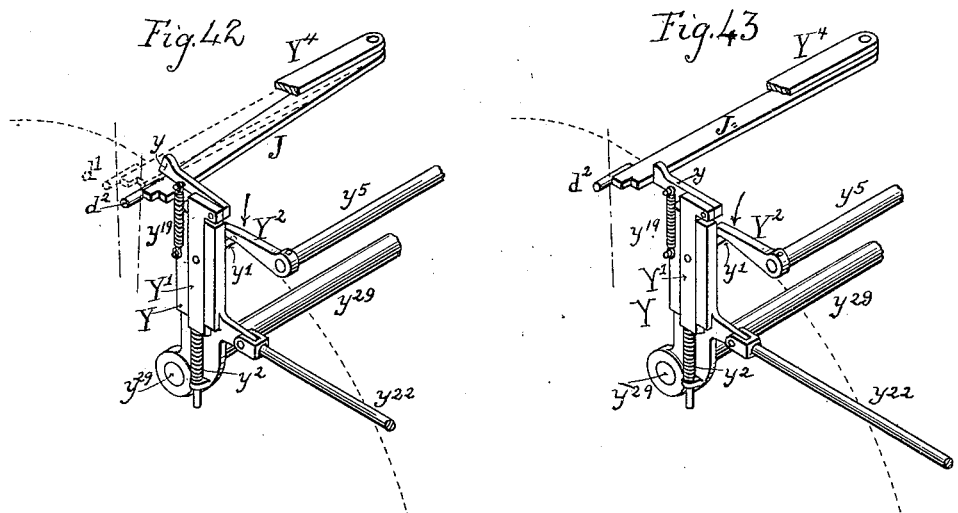

No. 626,098. Patented May 30, 1899.
I. RISLEY & V. F. LAKE.
TYPOGRAPHIC MACHINE.
(Application filed Jan. 27, 1899.)

(No Model.) 35 Sheets—Sheet 32.

WITNESSES:
F. W. Wright
Chas. A. Peard

INVENTORS
ISAAC RISLEY
V. F. LAKE
BY
Howson and Howson
THEIR ATTORNEYS.

No. 626,098.
I. RISLEY & V. F. LAKE.
TYPOGRAPHIC MACHINE.
(Application filed Jan. 27, 1899.)
Patented May 30, 1899.
(No Model.)
35 Sheets—Sheet 33.
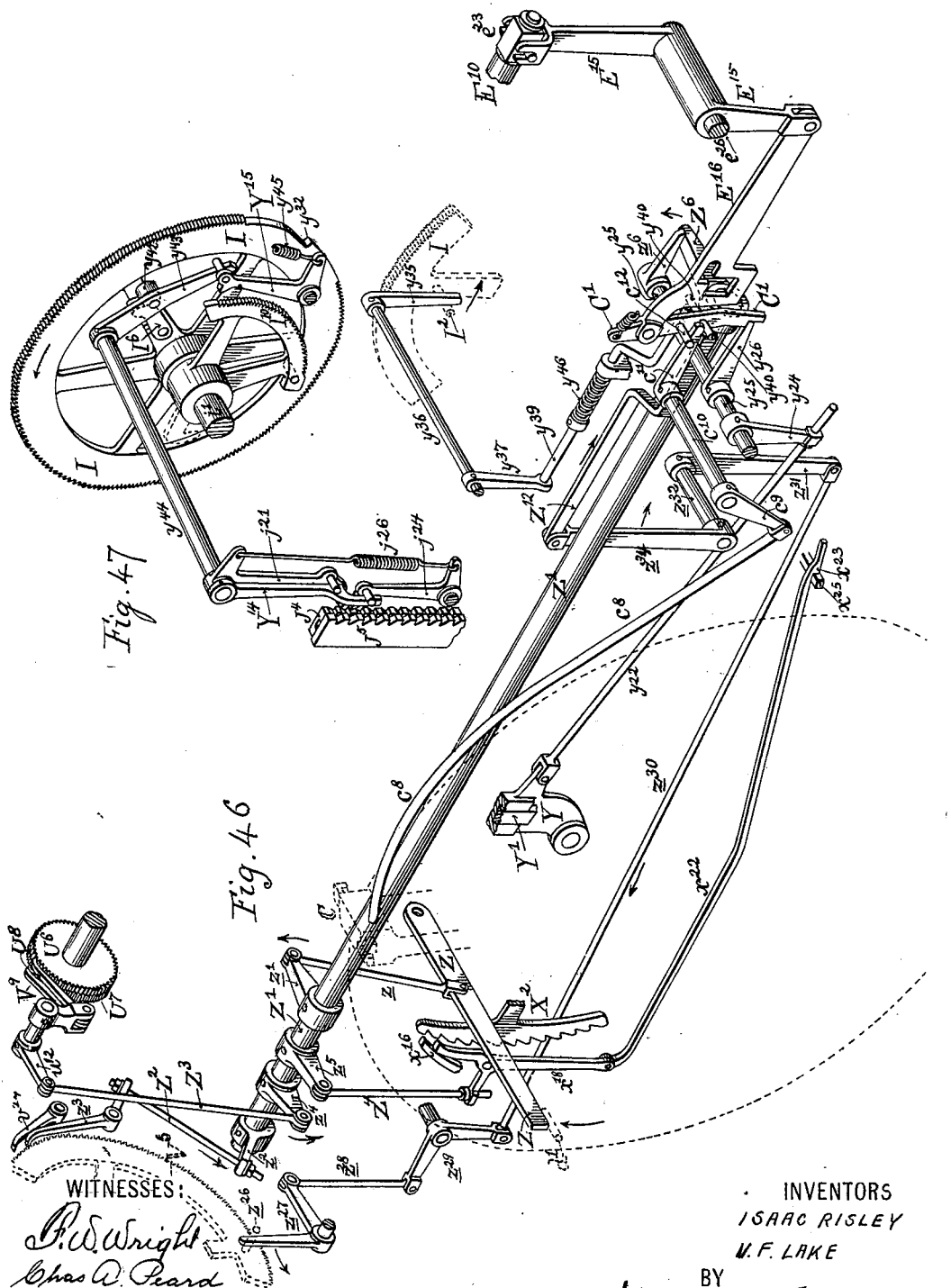
WITNESSES:
P. S. Wright
Chas W. Peard
INVENTORS
ISAAC RISLEY
V. F. LAKE
BY
Howson and Howson
THEIR ATTORNEYS No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 34.
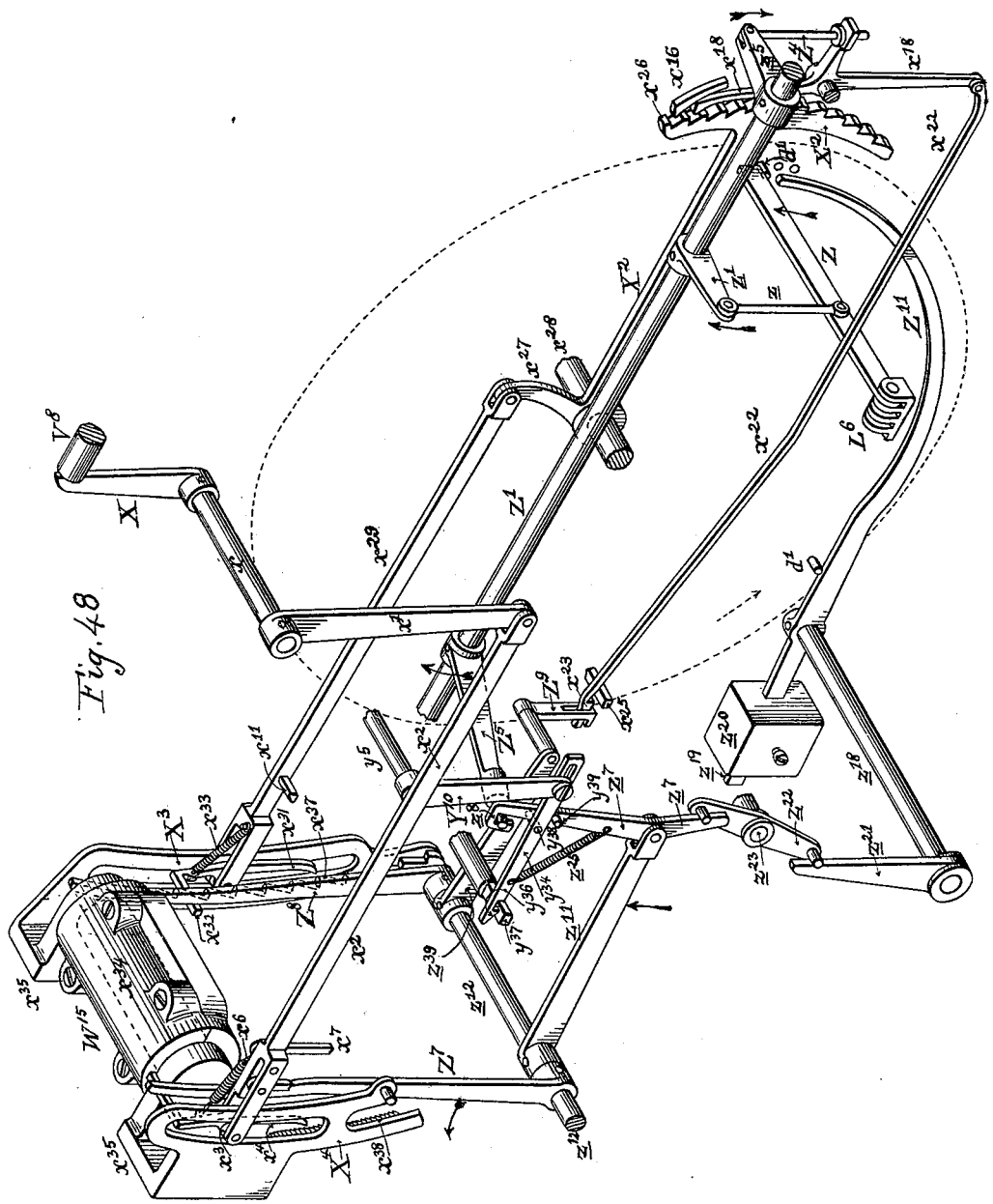
WITNESSES:
INVENTORS
ISAAC RISLEY
V. F. LAKE
BY
THEIR ATTORNEYS No. 626,098. Patented May 30, 1899.
I. RISLEY & V. F. LAKE.
TYPOGRAPHIC MACHINE.
(Application filed Jan. 27, 1899.)
(No Model.) 35 Sheets—Sheet 35.
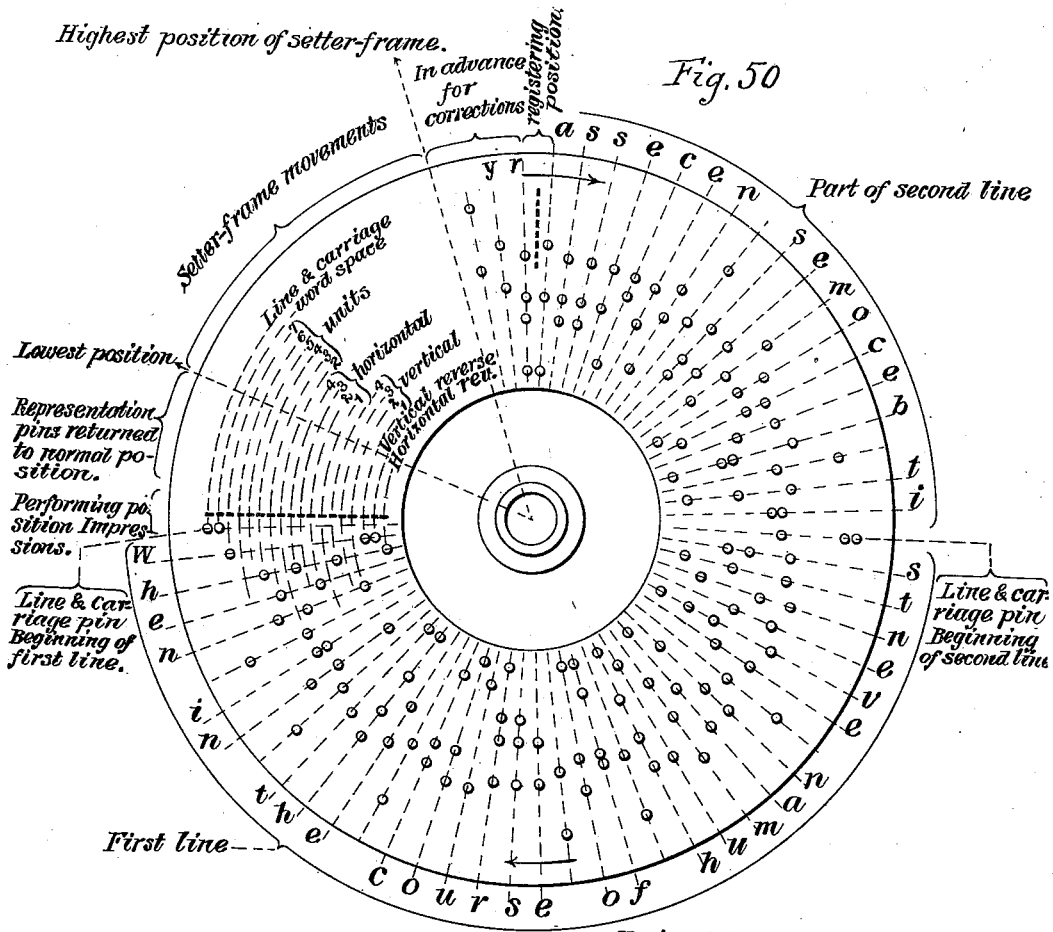
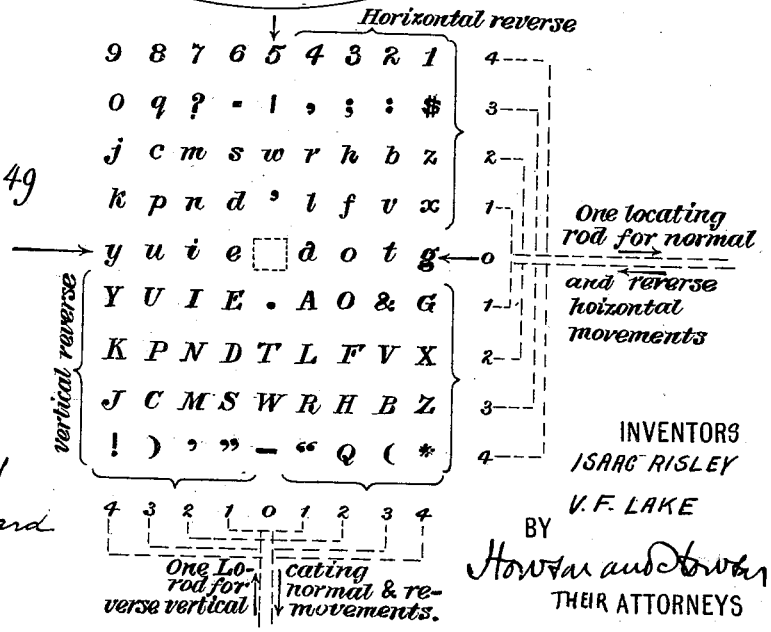
WITNESSES:
INVENTORS
ISAAC RISLEY
V. F. LAKE
BY
THEIR ATTORNEYS

UNITED STATES PATENT OFFICE.

ISAAC RISLEY AND VINCENT F. LAKE, OF PLEASANTVILLE, NEW JERSEY; SAID LAKE ASSIGNOR TO SAID RISLEY.

TYPOGRAPHIC MACHINE.

SPECIFICATION forming part of Letters Patent No. 626,098, dated May 30, 1899.

Application filed January 27, 1899. Serial No. 703,596. (No model.)

*To all whom it may concern:*

Be it known that we, ISAAC RISLEY and VINCENT FRANKLIN LAKE, citizens of the United States of America, and residents of Pleasantville, in the county of Atlantic, State of New Jersey, have invented Improvements in Typographic Machines, of which the following is a specification.

The present invention consists of certain improvements in the construction of matrix-making, type-casting, type-setting, type-writing, and other typographic machines in which a type-carrier is operated from a keyboard and is combined with means for automatically producing justified impressions.

The present machine embodies many of the principal features of the typographic invention for which Isaac Risley obtained United States of America Letters Patent No. 588,087, dated August 10, 1897. One of these principal features is the provision of devices for recording or registering the units and the word-spaces in the line and means whereby these registering devices govern the production of the final justified representation. By the phrase "final justified representation" is meant either the impression made in the matrix-machine or the line of matrices or type in a type-casting or type-setting machine or the printed impression in a type-writing machine.

In the present machine there is also employed a "preliminary-representation" means which is combined with the registers and matrix or other carriage to govern the production of the final justified representation; but it will be understood that many of the features of this invention are applicable to typographic machines in which there is no preliminary representation. It should also be explained that the term "type-carrier" is here used in a sense equally as general as the phrase "final representation," for while in the case of a matrix-making machine the type-carrier will be a surface having a series of type or character punches to be impressed into the matrix material it may in the case of a type-casting machine be a surface carrying a series of dies or matrices in which the characters will be cast, and in the case of a type-setting machine the type-carrier may be a device having a series of chambers any one of which may be brought to a given point to deliver type to the line being set up, or the type-carrier may be a device for ejecting type from type-channels.

In these typographic machines the means for producing preliminary representation may vary in construction from the perforated sheets described in the aforesaid Risley patent to a wheel having a series of movable pins frictionally held therein, certain pins representing letters and other pins representing corresponding letter-spaces. The present machine employs the last-mentioned construction of representation means in which the series of independently-movable pins are prearrangeable from the keyboard for the entire line or more than a line and control the movements of the type-carrier to bring any character thereof to the common point of impression. Others of the pins of the preliminary representation control the feed movement of the carriage for normal spacing for the different characters and word-spaces. This feed movement in a matrix-machine is imparted to the carriage which carries the matrix-sheet, and withth is is combined means controlled from the character-space and word-space registering devices to increase or diminish the normal space-feed between words to automatically justify the line. While the registering devices may be operated directly from the keyboard, it is preferable to operate said registering devices indirectly through the representation device.

An important feature of this invention has reference to the automatic closing of the line of matter composed.

The present invention also embraces many other improved features of construction which will be fully set forth hereinafter.

Figure 2:
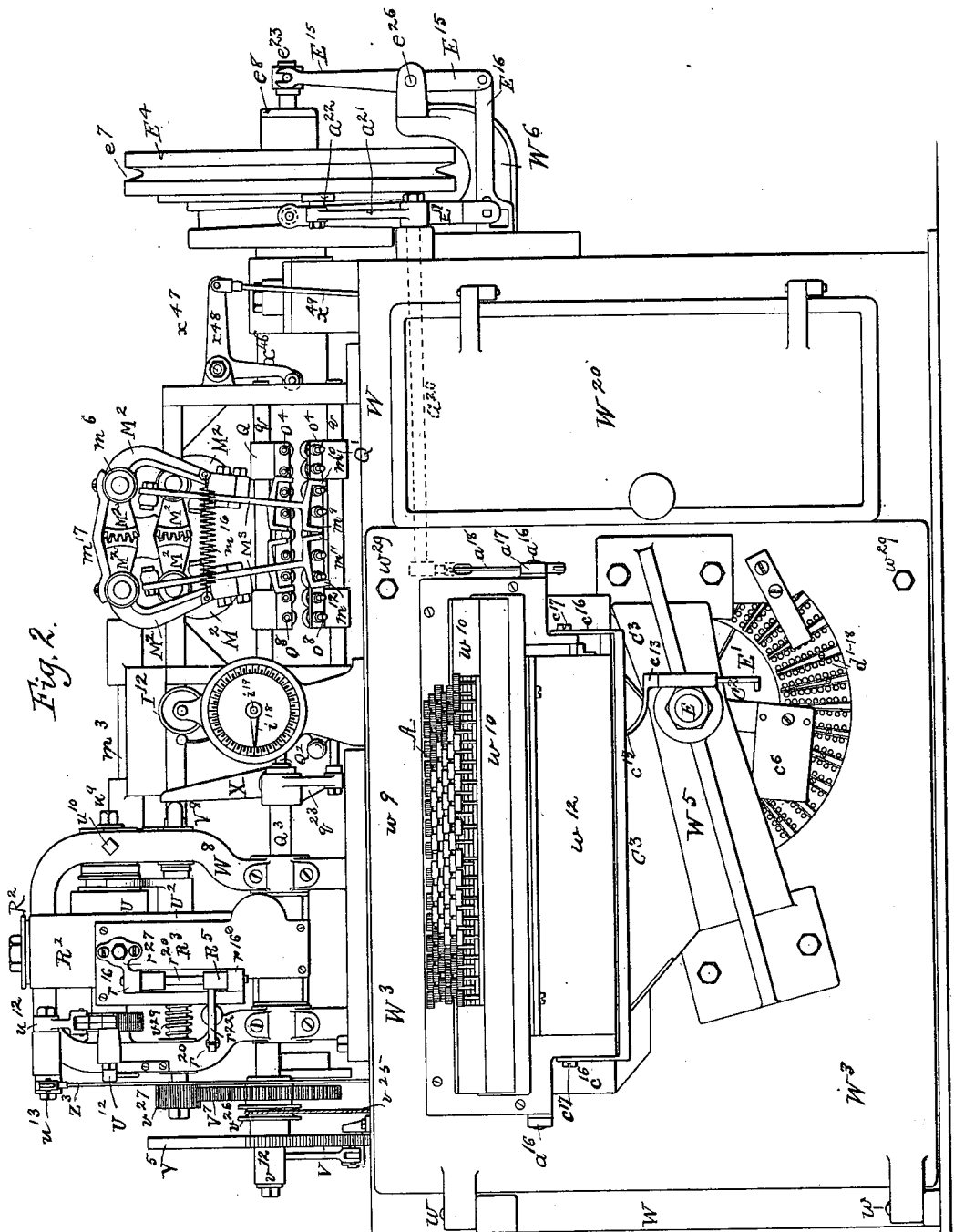
Figure 3:
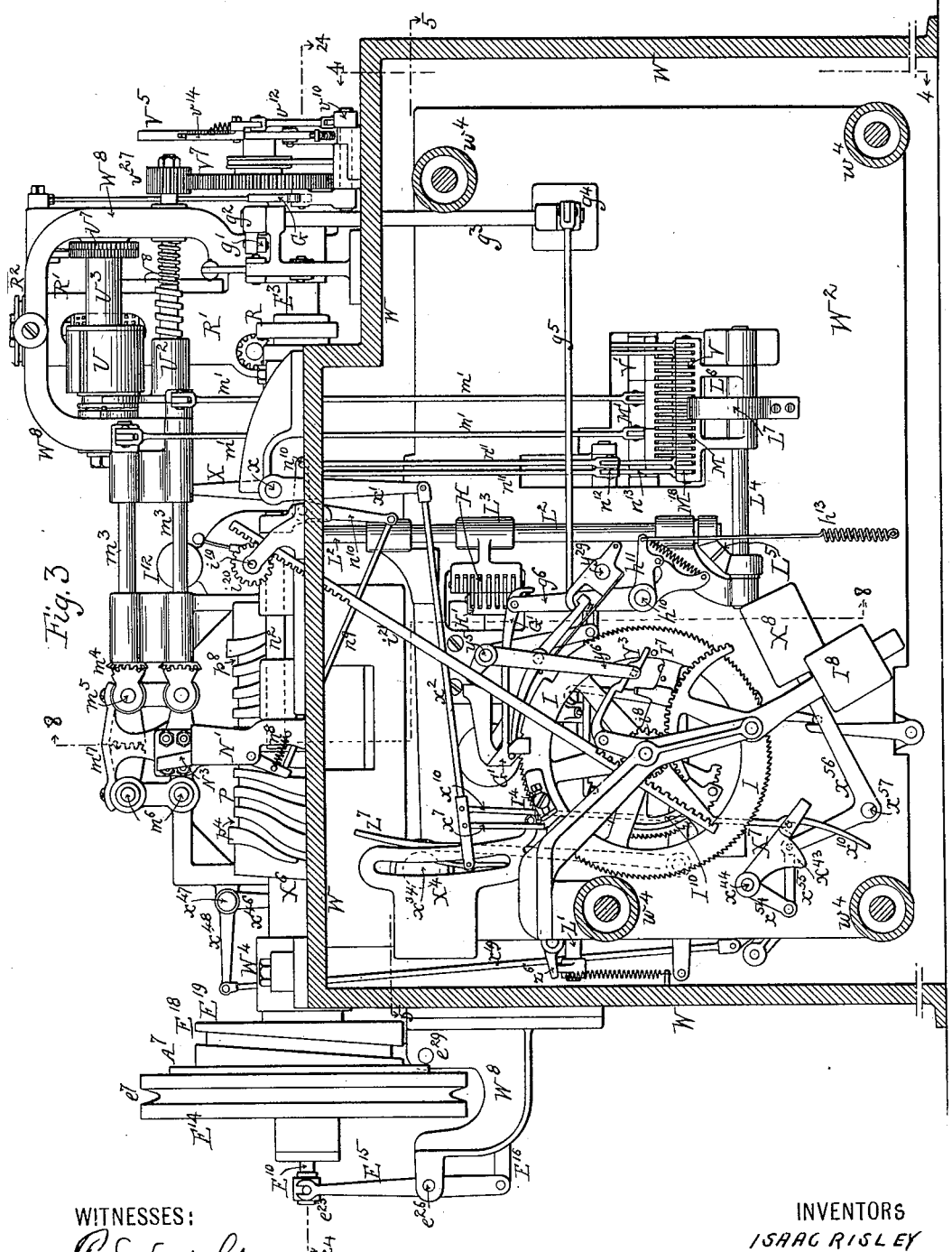
Figure 4:
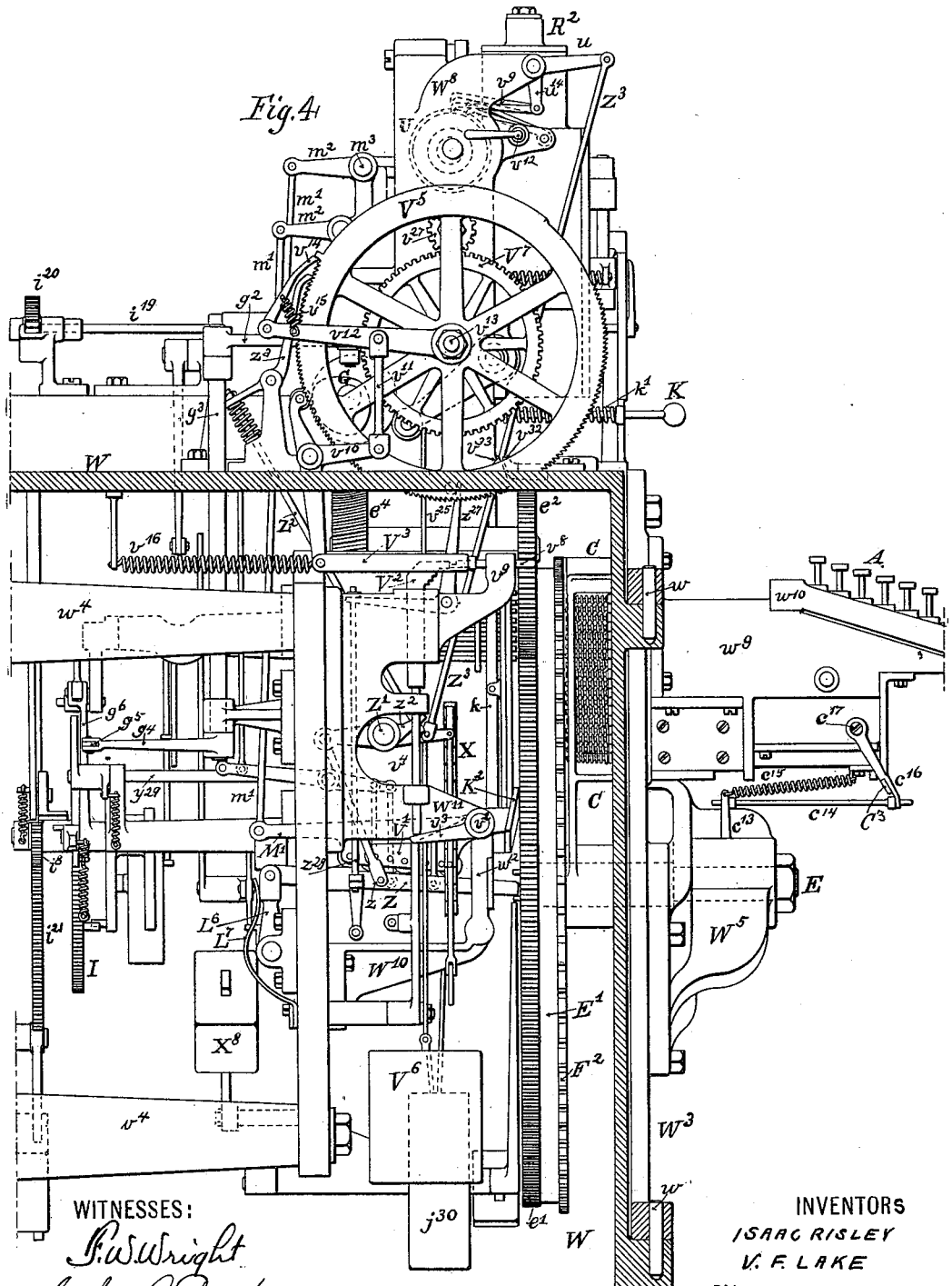

In the accompanying drawings, Figure 1 is a plan view of the complete machine embodying the improvements. Fig. 2 is a front elevation of the same. Fig. 3 is a rear elevation, but with the frame in section. Fig. 4 is a vertical elevation, drawn to a larger scale, of the left-hand end of the machine, with the frame in section. (See line 4 4, Fig. 3.) Fig.

Figure 12:
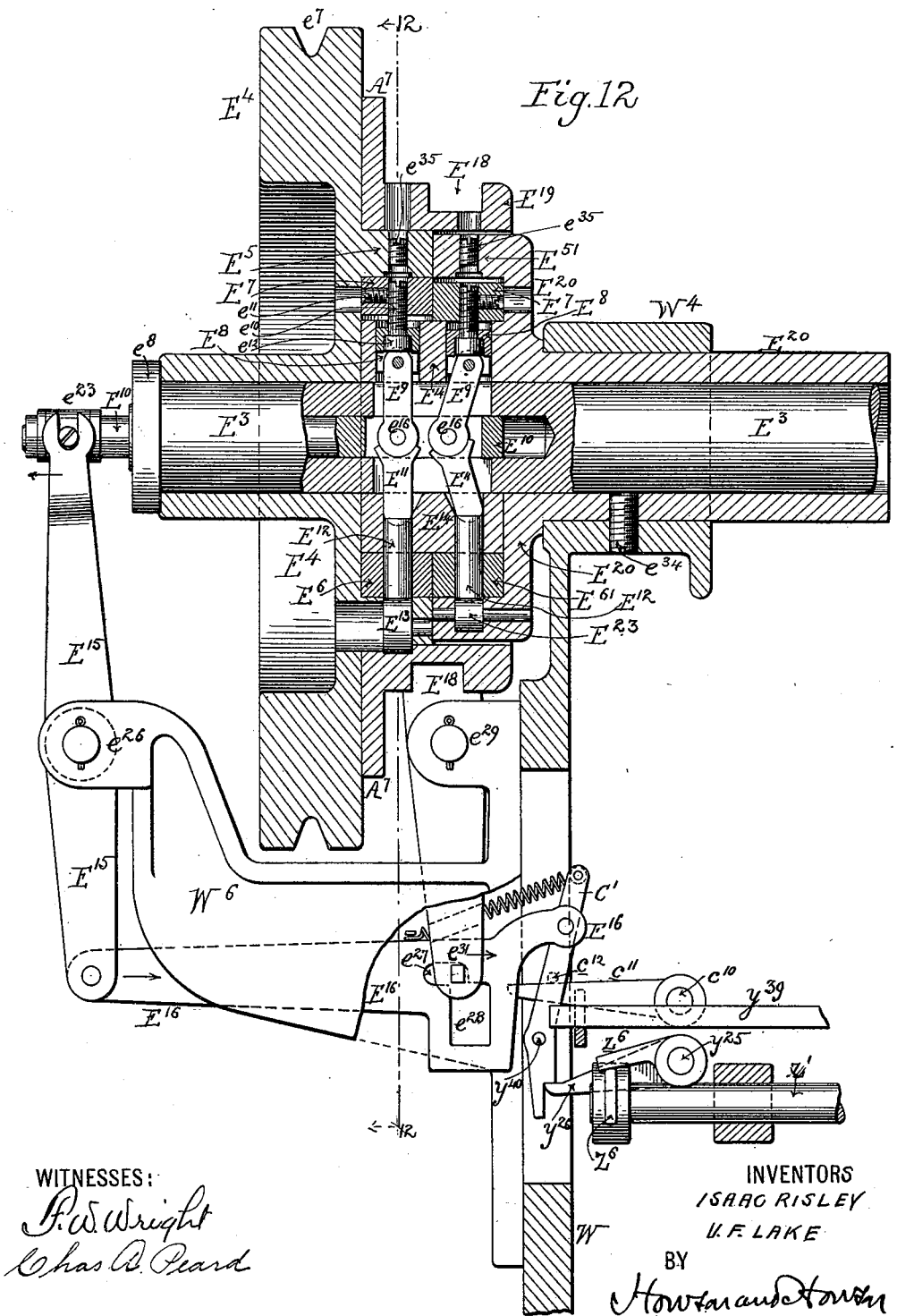
Figure 16:
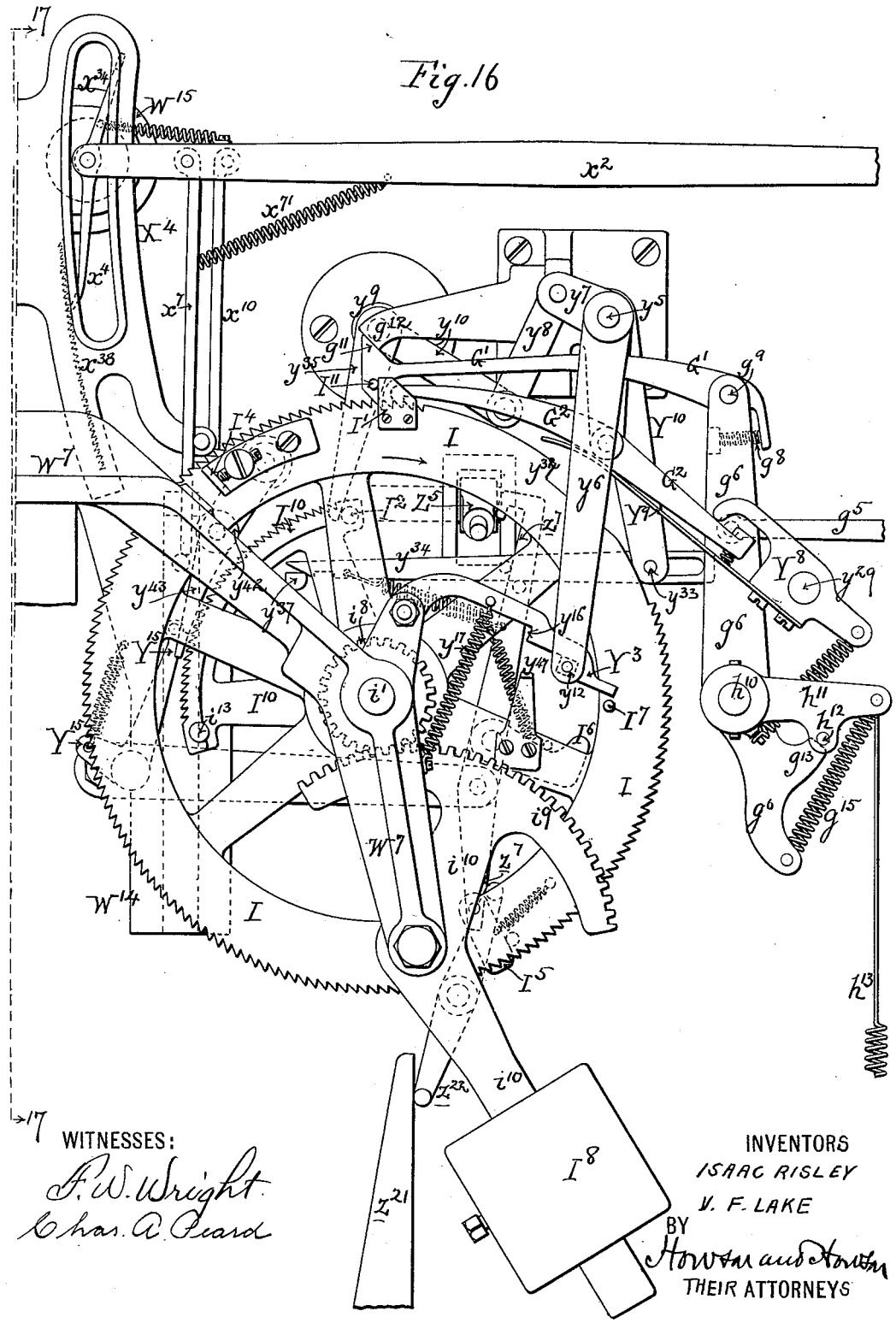
Figure 32:
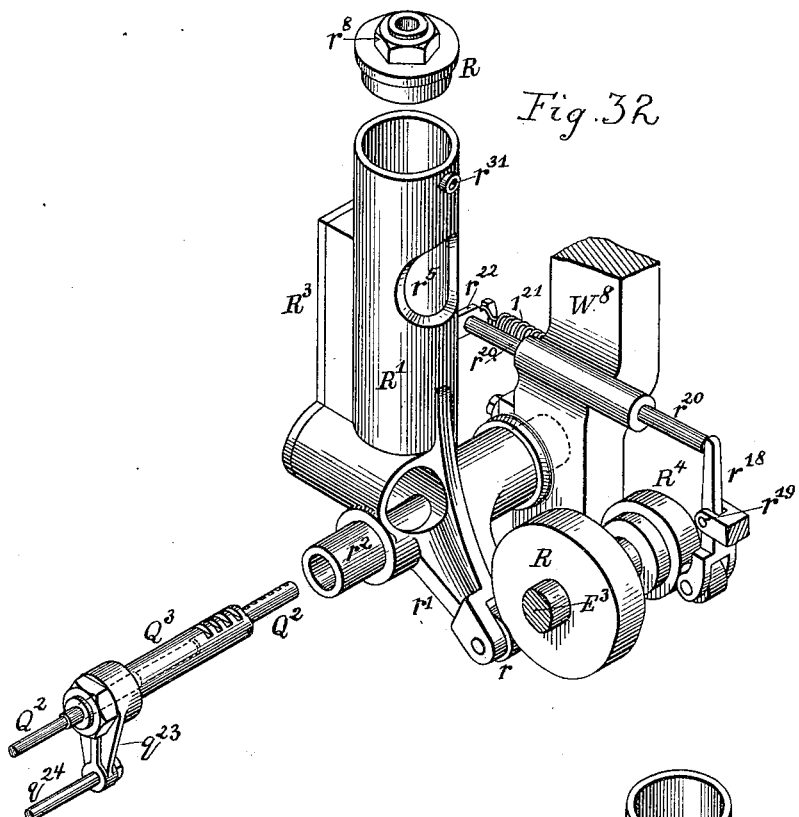
Figure 33:
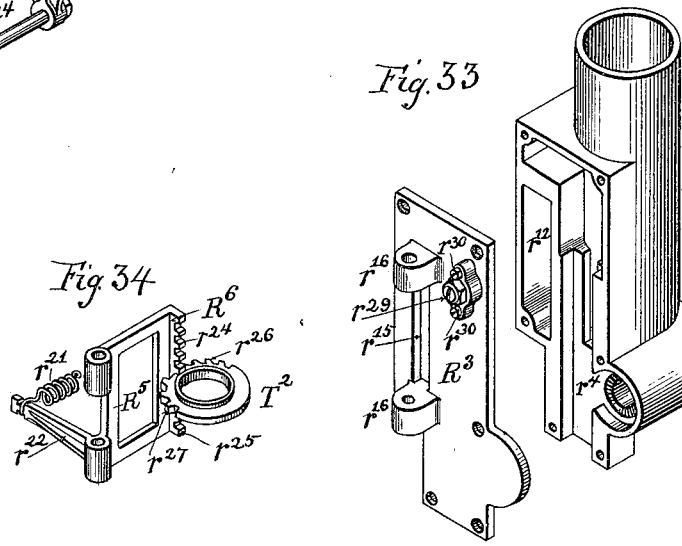
Figure 34:
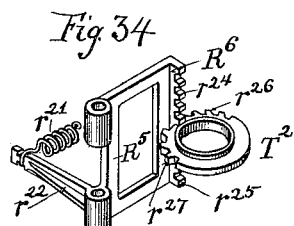

5 is a sectional plan view on the line 5 5, Fig. 4. (See also Figs. 3 and 6.) Fig. 6 is a front elevation of the lower part of the machine, with the casing in section, on the line 6 6, Fig. 5. Fig. 7 is a sectional elevation taken behind the composing-wheel and on the line 7 7, Fig. 5. Fig. 8 is a transverse vertical section on the line 8 8, Fig. 3. Fig. 9 is a transverse sectional view, drawn to a larger scale, through the keyboard on the line 9 9, Fig. 10. Figs. 9$^a$ and 9$^b$ are perspective views of details. Fig. 10 is a sectional plan view of the keyboard on the line 10 10, Fig. 9. Fig. 11 is a sectional elevation of the keyboard on the line 11 11, Fig. 9. Fig. 11$^a$ is a detached view of the striker-comb. Fig. 11$^b$ is a face view of the push-pin plate $b$, and Fig. 11$^c$ is a face view of the push-pin plate $b^2$. Fig. 12 is a vertical section through the fly-wheel and clutch mechanism. Fig. 12$^a$ is a transverse section on the line 12 12, Fig. 12. Fig. 13 is a face view of a part of the composing-wheel and the setting-frame with one of the bow-levers, (that for operating the escapement.) Fig. 14 is a cross-sectional view through the composing-wheel and bow-levers, the setting-frame being shown in side elevation, except at its hub, where it is shown in section. Figs. 14$^a$ and 14$^b$ are detached views of the escapement for the setting-frame. Fig. 15 is a plan view of the system of performing levers. Fig. 16 is a rear view of the unit-registering mechanism. Fig. 17 is a side elevation of the same with the frame sectioned along a line a little to the left of the vertical line 17 17, Fig. 16. Fig. 18 is a sectional elevation of the unit-registering devices, looking in the opposite direction from Fig. 16, the section being taken on the line 18 18, Fig. 17. Figs. 18$^a$, 18$^b$, and 18$^c$ are diagrammatic views of certain details. Fig. 19 is a perspective view of the word-space-registering mechanism. Fig. 20 shows in perspective the two parts of the word-space register detached. Figs. 21, 22, and 23 are views of the parts of the word-space register in different positions. Fig. 24 is a front elevation of the main shaft and its several cams and wheels. Fig. 24$^a$ is a sectional plan view of the same on the line 24 24, Fig. 3. Fig. 25 shows in section and also in diagrammatic extension the cam-grooves of the cylinder controlling the movements of the type-carrier. Fig. 25$^a$ is a view of the end of the cylinder. Fig. 26 is a perspective view of the two slides controlled by the cam-grooved cylinder and in turn controlling the type-carrier. Fig. 26$^a$ is a detached view of one of the selecting-plungers. Fig. 27 is a view, partly in section, showing the connections between the said slides and type-carrier. Figs. 28, 28$^a$, and 28$^b$ show the type-carrier, shell, and spindle; and Fig. 29 is a perspective view of the connecting-gearing. Fig. 30 is a vertical section of the complete type-carrying device and matrix-carriage. Fig. 30$^a$ is a perspective view, drawn to an enlarged scale, of one of the type. Fig. 31 is a sectional plan on the line 31 31, Fig. 30. Figs. 32 and 33 are perspective views of the oscillating casing which carries the type-carrier. Fig. 34 is a perspective view of the alining devices. Fig. 35 is a sectional plan view on the line 35 35, Fig. 30. Fig. 36 is a perspective view of the operating mechanism for the slides for controlling the type-carrier. Fig. 37 is a vertical section showing the means for giving the line-feed. Fig. 37$^a$ is a view, on a larger scale, of the device for changing the line-space feed. Fig. 38 is a perspective view of the normal carriage-feed-operating devices. Fig. 38$^a$ is a detached view of the controlling-stop for the carriage-feed. Fig. 39 is a diagram illustrating in a simple form the justifying mechanism. Fig. 40 is a more complete diagrammatic perspective view of the justifying mechanism apart from adjacent devices in the machine. Fig. 41 is a perspective view illustrating a part of the line-closing devices. Figs. 42, 43, 44, and 45 are other perspective views of the line-closing devices, illustrating their different positions and actions. Figs. 46, 47, and 48 are diagrammatic perspective views illustrating, apart from the machine, the devices for automatically restoring the parts to their normal positions at the end of each line. Fig. 49 is a diagram showing the preferred arrangement of the type on the face of the type-shell; and Fig. 50 is a diagram of the composing-wheel, indicating the representation of an illustrative sentence.

The machine is constructed to operate on the "unit" measurement system. In the machine as hereinafter described it is assumed by way of example that the characters vary in width from two to seven units. For instance, the two-unit characters include such letters as "i" and the several punctuation-marks, while at the other extreme the seven-unit characters are such as "M" and "W."

The normal word-space may be assumed to be of two units. In the automatic justification hereinafter described units or parts of units are subtracted from or added to those normal word-spaces, depending on whether the composed line prior to justification is longer or shorter than the standard line.

In the accompanying drawings the invention is illustrated as embodied in a machine which is more especially adapted to matrix-making or type-writing, one character being impressed at a time. The "type-carrier" T is shown as in the form of an upright cylinder carrying type or character punches in vertical and horizontal rows, the preferred arrangement being indicated in Fig. 49; but it will be understood, as already explained, that the invention is applicable to other typographic machines than matrix-making machines—as, for instance, type-casting or type-setting—and the type-carrier may assume different forms, according to the nature of the machine and the preferences of the constructor. The purpose is to so control the type-carrier as to be able at will to bring any one of the characters to a common point (which may be conveniently termed the "common point of impression") and to return the carrier to its normal position again. This normal position is preferably a central one.

The machine is a power-driven machine subject to the control of a keyboard played by the operator, who can finger the keys continuously while the machine itself automatically produces, closes, and justifies the lines, placing the printed matter in a justified column.

The frame of the machine may assume any suitable form. In the drawings it is illustrated as in the shape of a box-like casing W, with a large front door $W^3$ (carrying the keyboard A on one side and the preliminary-representation wheel $E'$ on the other) and a smaller door $W^{20}$, with doors $W^{21}$ at the back, Figs. 1, 2, and 8. Within this casing is a vertical partition-plate $W^2$, Figs. 3, 4, 5, and 8, on which many of the working parts are mounted and which is itself supported by posts $W^4$ from the back part of the frame.

The main power-driven shaft $E^3$, which carries the operating-cams, Figs. 24 and $24^a$, is arranged horizontally on the upper part of the frame in suitable bearings at $W^4$ and $W^{41}$. It is driven by a wheel $E^4$, Figs. 1, 2, 3, 12, and 24, which in the present instance is shown as grooved at $e^7$ for the reception of a driving-belt and is loose on the shaft $E^3$, being held thereon by a collar $e^8$. It is provided with suitable clutch mechanism, such that while the wheel $E^4$ is driven continuously the shaft may be clutched to or freed from the driving-wheel either by hand or automatically from different operative parts of the machine. This clutching and unclutching is accomplished by the inward and outward movements of a plunger $E^{10}$, sliding in the end of the shaft $E^3$, Fig. 12, under the control of a lever $E^{15}$, pivoted at $e^{26}$ on the bracket $W^6$. The upper end of this lever has a swivel connection with the plunger at $e^{23}$, and to its lower end is pivotally connected a bar $E^{16}$, to the opposite end of which is pivoted a latch $C'$. In this bar $e^{16}$ are offset communicating slots $e^{27}$ $e^{28}$, in which works a pin $e^{31}$, Fig. 12, on the lower end of a lever $E^{17}$, pivoted at $e^{29}$ and having at its upper end an antifriction-roller $e^{30}$, Figs. 1 and 2, running in a cam-groove $E^{18}$ on the flange $E^{19}$ of the driving-wheel $E^4$. Thus a constant vibrating motion is imparted to the lever $E^{17}$, and when the latch-bar $e^{16}$ is dropped to its lower position the pin $e^{31}$ vibrates in the slot $e^{27}$ and, striking the right-hand end thereof, (looking at it in Fig. 12,) moves the lever $E^{15}$ to draw the plunger $E^{10}$ outward and cause the wheel $E^4$ to be clutched to the shaft $E^3$. When, however, the latch-bar $E^{16}$ is raised, the pin $e^{31}$ will enter the slot $e^{28}$, and the vibrating lever $E^{17}$ will then throw the latch-bar $E^{16}$ and the lower end of the lever $E^{15}$ outward and the plunger $E^{10}$ inward, with the effect of unclutching the wheel $E^4$ from the shaft $E^3$ and frictionally locking the shaft to a fixed part of the frame. The raising of the latch-bar $E^{16}$ is effected by devices hereinafter described acting upon the latch $C'$ and constituting automatic stop-motions.

Any suitable form of clutch may be used; but the construction illustrated in Figs. 12, $12^a$, and $24^a$ is preferred. On the wheel $E^4$ is an annular flange $E^5$, within which lies a split friction-ring $E^6$. Opposite this flange $E^5$ there is a flange $E^{51}$ on a sleeve-disk $E^{20}$, fixed to the frame $W^4$ by a screw-pin $e^{84}$ or otherwise. Within this flange $E^{51}$ lies a split friction-ring $E^{61}$, similar to the ring $E^6$. Between the adjacent ends of each of these split rings lies a wedge-piece $E^7$, Fig. $12^a$, which on being pushed outward by the toggle-links $E^9$ and $E^{11}$, as at left of Fig. 12, causes the split ring to be expanded against its adjacent flange. When the toggle-levers are moved to draw the wedge $E^7$ inward, as shown at the right-hand side of Fig. 12, the corresponding split friction-ring will be freed from its flange $E^{51}$ ($E^5$). The toggle-links $E^9$ and $E^{11}$ are pivoted to the plunger-rod $E^{10}$ at $e^{16}$. Their lower ends are rounded and find bearings in pins $E^{12}$, passing through openings in the cylindrical piece $E^{14}$ (secured at $E^{21}$, Fig. $24^a$, to the shaft $E^3$) and through openings in the split rings $E^6$ $E^{61}$. The links $E^9$ and $E^{11}$ are at the other ends pivoted to cups $E^8$ in radial openings in the cylinder $E^{14}$. Through these cups pass screws $e^{10}$, having heads $e^{12}$ and threaded into their respective wedge-blocks $E^7$. These screws can be turned to effect adjustment of the wedges $E^7$ by the insertion of a screw-driver through openings temporarily closed by the plugs $e^{35}$.

To always bring the shaft $E^3$ to a definite stop and to start it again at a certain position, there are employed a hardened roller $E^{13}$, carried by the flange $E^5$, and a hardened roller $E^{23}$, carried by the flange $E^{51}$. The peripheries of these rollers project slightly beyond the inner faces of their respective flanges, so that when in the revolution of the wheel either of these rollers reaches a projected pin $E^{12}$ that pin will come to a stop on the roller. Thus when the left-hand toggles, Fig. 12, are straightened by the outward movement of the plunger $E^{10}$ the shaft $E^3$ will be firmly clutched to the wheel $E^4$, with the pin $E^{12}$ bearing upon the roller $E^{13}$. On the other hand, when the plunger $E^{10}$ is pushed inward the left-hand toggles will be bent to disengage the friction-ring $E^6$ from the flange $E^5$ and, on the other hand, the right-hand toggles will be straightened to expand the friction-ring $E^{61}$ against the flange $E^{51}$ of the fixed disk $E^{20}$, thus frictionally locking the shaft and stopping the machine at a definite point, determined by the position of the roller $E^{23}$.

With this preliminary explanation of the construction of the frame, shaft, and stop-motion the detailed description of the specific machine illustrated in the drawings will now be proceeded with, the several principal groups of mechanisms being taken up in order. These principal groups are, first, the keyboard mechanism; second, the preliminary-representation mechanism, which is controlled from the keyboard; third, the mechanism for registering the units of the characters and of the word-spaces as the line receives its preliminary representation on the composing-wheel; fourth, the mechanism for registering the number of word-spaces in the line as it is composed; fifth, the line-closing mechanism at the composing stage; sixth, the mechanism for operating the type-carrier to bring its different characters successively to the common point of impression; seventh, the mechanism for imparting normal variable feed to the matrix or other carriage for the "final representation;" eighth, the automatic justifying mechanism, and, ninth, devices whereby the parts are returned to their initial positions.

*The keyboard.*—The keyboard and its mechanism are illustrated in exterior view in Figs. 1 and 2 and on a larger scale in section in Figs. 9 to to 11, inclusive. The stems of the several keys $a$ are guided vertically in the top plate $w^{10}$, Fig. 10, which is detachably secured to the keyboard-casing $w^9$, this latter being secured by bolts or otherwise to the front door $W^3$. Each key $a$ rests with a forked lower end $a'$ upon a key-lever $A^2$, pivoted at $a^2$ and guided in a comb-plate $a^3$. In turn each key-lever $A^2$ rests upon the top of a rod $A^4$, which is guided vertically in the horizontal comb-plates $a^9$ $a^9$, the lower one being carried by the part $w^{11}$ of the keyboard-casing. A shield $w^{12}$ lies in front of these vertical rods $A^4$. Springs $a^4$ $a^5$ tend to keep these rods in their upper and rearward position. (Shown in Fig. 9.) In line with each rod $A^4$ is a horizontal "striker-bar" $A^5$, (see also Figs. $9^b$ and 10,) guided in a vertical comb-plate $a^{14}$, and the beveled end $a^{10}$ of each bar normally rests in the lower of the two beveled notches $a^6$ $a^7$ of the corresponding key-rod $A^4$. When a key $a$ is depressed, the corresponding key-rod $A^4$ is depressed until the end $a^{10}$ of its striker-bar $A^5$ enters the notch $a^6$. On the upward return movement of this rod $A^4$ under the action of the spring $a^4$ $a^5$ when the operator lifts his finger the end $a^{10}$ of the striker-bar $A^5$ is elevated to the position shown in full lines in Fig. 9, bringing the shoulder $a^{11}$ into the path of the solid part of the striker-comb $A^6$, Figs. 9, 11, and $11^a$. This striker-comb has a constant vibrating motion imparted to it by any suitable means toward and from the push-pins B and $B^2$ and the preliminary-representation or composing wheel $E'$. In the construction illustrated this comb-plate $A^6$ is carried by arms $a^{15}$ on a horizontal shaft $a^{16}$, which has at its end outside the casing an arm $a^{17}$, connected by a link $a^{18}$ to an arm $a^{19}$ on a horizontal shaft $a^{20}$, Figs. 1, 2, and 6. This latter shaft $a^{20}$ has an arm $a^{21}$, Figs. 2 and $12^a$, with a roller $a^{22}$ bearing against a cam $A^7$ on the constantly-rotating driving-wheel $E^4$. A pull-spring $a^{23}$, Fig. 10, keeps the roller end of the arm $a^{21}$ up against the cam $A^7$. Thus the forward operating movement of the striker-bars $A^5$ in the direction of their arrow, Fig. 9, is power-operated and can take place only at regular intervals in time with the other moving parts of the machine and not with the operator's fingering of the keys.

Behind the projection $a^{11}$ on each striker-bar $A^5$ is a raised portion $a^{12}$, Figs. 9 and $9^b$, which in the case of any bar $A^5$ selected while the striker-comb $A^6$ is forward will bear against the upper end of its slot in the comb $A^6$ and in consequence cause that bar $A^5$ to be held down until the comb has returned to its extreme backward position. Then the comb can engage that selected bar.

Each striker-bar $A^5$ has a T-head $a^{13}$ bearing against a certain number of push-pins B, carried by a fixed cross-plate $b$. The arrangement of these pins in this plate $b$ is shown in Fig. $11^b$, the vertical positions of the T-heads of some of the bars $A^5$ being indicated by dotted lines and the uses of the several pins being indicated by letters and words. Immediately behind these push-pins B are the eighteen universal bars $B'$ and the universal escapement-bar $f$. These several bars are stirrup-shaped, as shown in Fig. 11, and are pivoted so as to have a swinging movement on a horizontal axis $b'$. Immediately back of these universal bars $B'$ are arranged on a diagonal line eighteen corresponding push-pins $B^2$ in a fixed cross-plate $b^2$. Behind the universal escapement-bar $f$ is a nineteenth pin $f'$. The arrangement of these pins and their several uses are indicated clearly in Fig. $11^c$. These eighteen push-pins $B^2$ are adapted to act upon corresponding bow-levers $B^3$, Fig. $9^a$, pivoted to an inclined axis $b^3$, Fig. 11. A nineteenth bow-lever $f^2$, also pivoted to $b^3$, is acted upon by the pin $f'$ to work the escapement hereinafter described. Pull-springs $b^4$, Figs. 9 and 11, return the levers, push-pins, and striker-bars back after each outward operating movement.

The bow-levers $B^3$ act upon corresponding pins $c'$ in the "setting-frame" C, Figs. 4, 6, 13, and 14. This setting-frame is mounted to work in conjunction with the preliminary-representation wheel $E'$.

*Preliminary-representation mechanism.*— The wheel $E'$ will be termed the "composing-wheel," since the pushing out from front to back or "setting" of the selected pins $d'$ $d^2$, &c., to $d^{18}$, which control all the subsequent movements of the machine to produce the final representation, is, in fact, "composition." This composing-wheel $E'$ is mounted to turn upon a fixed axis E, bolted to the diagonal yoke $W^5$ on the front door $W^3$ of the frame, Figs. 2, 4, 8, 11, and 14. An intermittent rotary feed motion is imparted to this composing-wheel by any suitable means. In the case illustrated the main shaft $E^3$ has a feed-worm $E^2$, Fig. 24, engaging with a worm-wheel $e^4$, Fig. 5, transmitting motion to the wheel E' through the shaft $e^3$ and pinion $e^2$, which engages with the gear-teeth $e'$ on the composing-wheel. The spiral portions $e^5$ of the worm $E^2$, Fig. 24, give the intermittent feed motion to the wheel, while the straight portion $e^6$ of the worm holds the composing-wheel locked during a portion of the revolution of the main shaft. As before explained, the composing-wheel is carried by the door $W^3$, so that when the latter is turned back on its hinges $w$ on removal of the fastening-bolts $w^{20}$ the gear $e'$ will simply slide out of engagement with the pinion $e^2$.

The composing-wheel carries a series of independently-movable pins $d'$ $d^2$, &c., to $d^{18}$, free to be pushed in and out therein transversely, with frictional retaining means. These pins are arranged in radial rows of eighteen pins each, and there are in the present instance seventy-two radial rows. The pins of the several radial rows at the same time form eighteen concentric rows, Figs. 6, 14, and 50. The frictional retaining means for the pins may consist of plates $e$ between adjacent rows, Figs. 13 and 14, with spring-lips $e^{40}$ bearing against the pins. In Fig. 50 there is indicated in writing what each one of the eighteen concentric rows of pins is used for. Thus the first pin $d'$ is for the indication of the end of the line and the line-feed to be given to the carriage. The next pin $d^2$ indicates a word-space. The next six pins ($d^3$ to $d^8$, inclusive) severally represent the different units of the feed movement to be imparted to the carriage for the several different characters and the word-space. The remaining ten pins ($d^9$ to $d^{18}$, inclusive) determine the selection of the character at the final representation. In Fig. 14 there are shown two pins of a row projected—namely, $d^2$ and $d^8$—which, as it happens, indicate a word-space, the pin $d^2$ indicating the word-space itself and the pin $d^8$ the two units for the word-space. Some of the characters may require as many as five pins each for the proper representation of the type-carrier movements and the unit-feed. Inasmuch as this composing-wheel is power-driven it becomes necessary to provide between the fingered keyboard and this wheel means to allow for their non-synchronous operation. This is done by means of the arc-shaped levers $B^3$ and $f^2$ and the setting-frame C, which is free to turn with its hub $c$ on the hub of the wheel E', Fig. 14, within an arc sufficient for the purpose. The setting-frame carries a radial row of eighteen pins $c'$, corresponding with the radial rows of pins in the composing-wheel, and the escapement hereinafter described causes the pins $c'$ to successively come into line with the several radial rows of pins on the composing-wheel. Springs $c^2$, Fig. 14, keep the pins $c'$ out of contact with the pins on the wheel E'; but when levers $B^3$ are operated on the depression of a key, as hereinafter described, the corresponding pins $c'$ are pushed outward to in turn cause the projection of the corresponding pins in the row of the wheel E' then opposite the setting-frame C, as indicated at $d^2$ and $d^8$ in Fig. 14.

The setting-frame C has an escapement connection at its outer end with the periphery of the composing-wheel, as shown in Figs. 13, 14, 14$^a$, and 14$^b$. The periphery of the wheel E' has a series of teeth $f^5$, with which may engage in succession the teeth $f^4$ and $f^6$ of an escapement-dog F'. This dog is free to slide transversely in the end of the setting-frame under the control of the escapement-lever $f^2$, which engages a notch $f^3$ in the end of the dog F', Figs. 14 and 14$^a$. The dog, with its offset escapement-teeth $f^4$ and $f^6$, operates in the usual manner of such devices, so that each time a key $a$ is operated the setting-frame C can drop back under its own weight in a direction the opposite of the arrow, Fig. 13, and if the wheel E' is not at the time feeding forward owing to the stoppage of the main shaft $E^3$ or if the operator is working faster than the machine the setting-frame will by intermittent movement go to the position shown by dotted lines in Fig. 13, when its counter-weight $c^6$ will bring a horizontal stop-bar $C^3$ immediately under the key-rods $A^4$ and stop the further fingering of the keys. This stop-bar, Figs. 2 and 9, is carried by pivot-arms $c^{16}$ and is normally held forward out of the way of the key-rods $A^4$ by a pull-spring $c^{15}$ acting upon an arm $c^{13}$ of the lever $C^2$ through a rod $c^{14}$; but when the weight $c^6$ of the setting-frame strikes the lower arm of this lever $C^2$, Fig. 2, the rod $c^{14}$ is moved back to allow bar $C^3$ to drop down under rods $A^4$.

Figure 5:
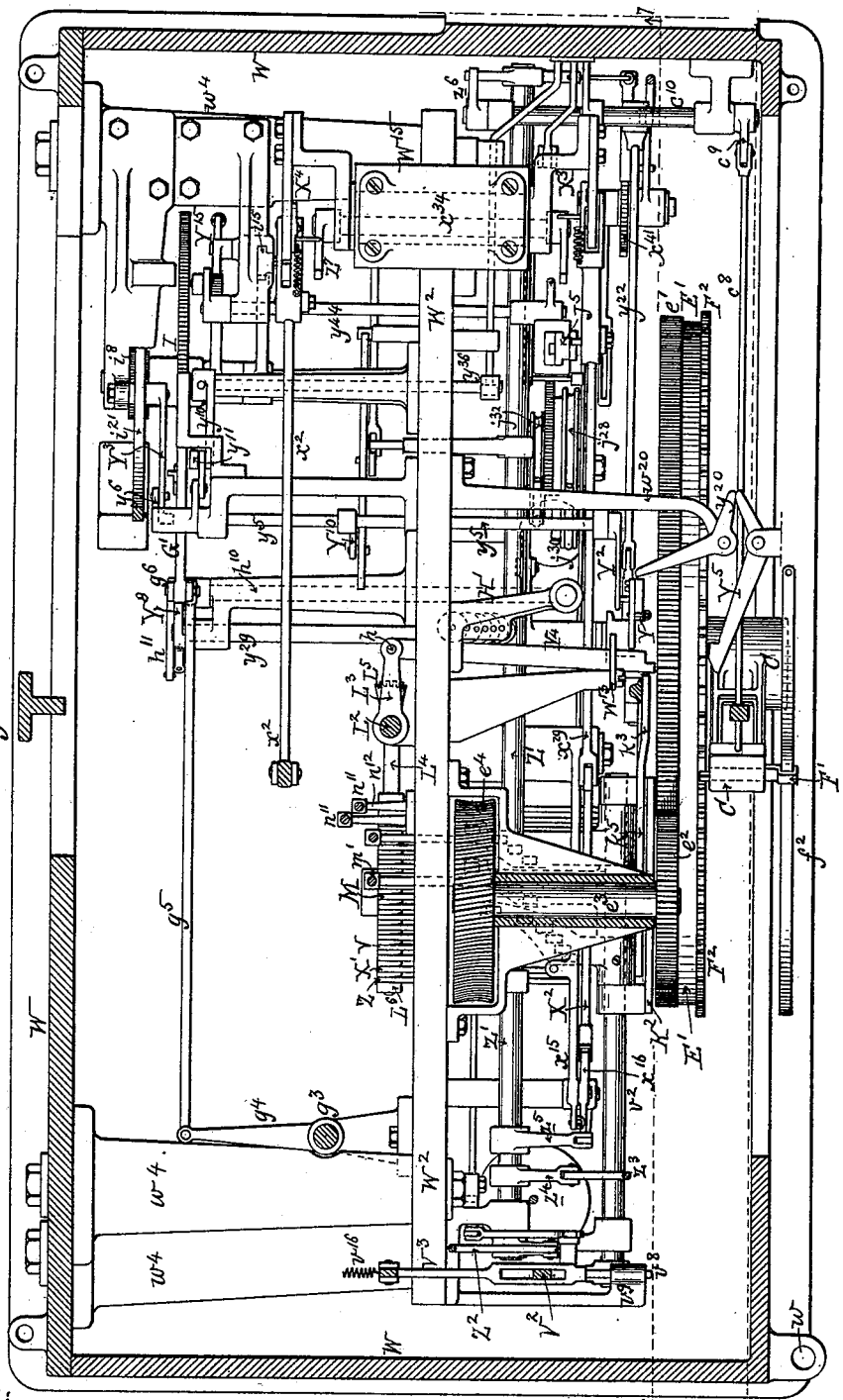
Figure 6:
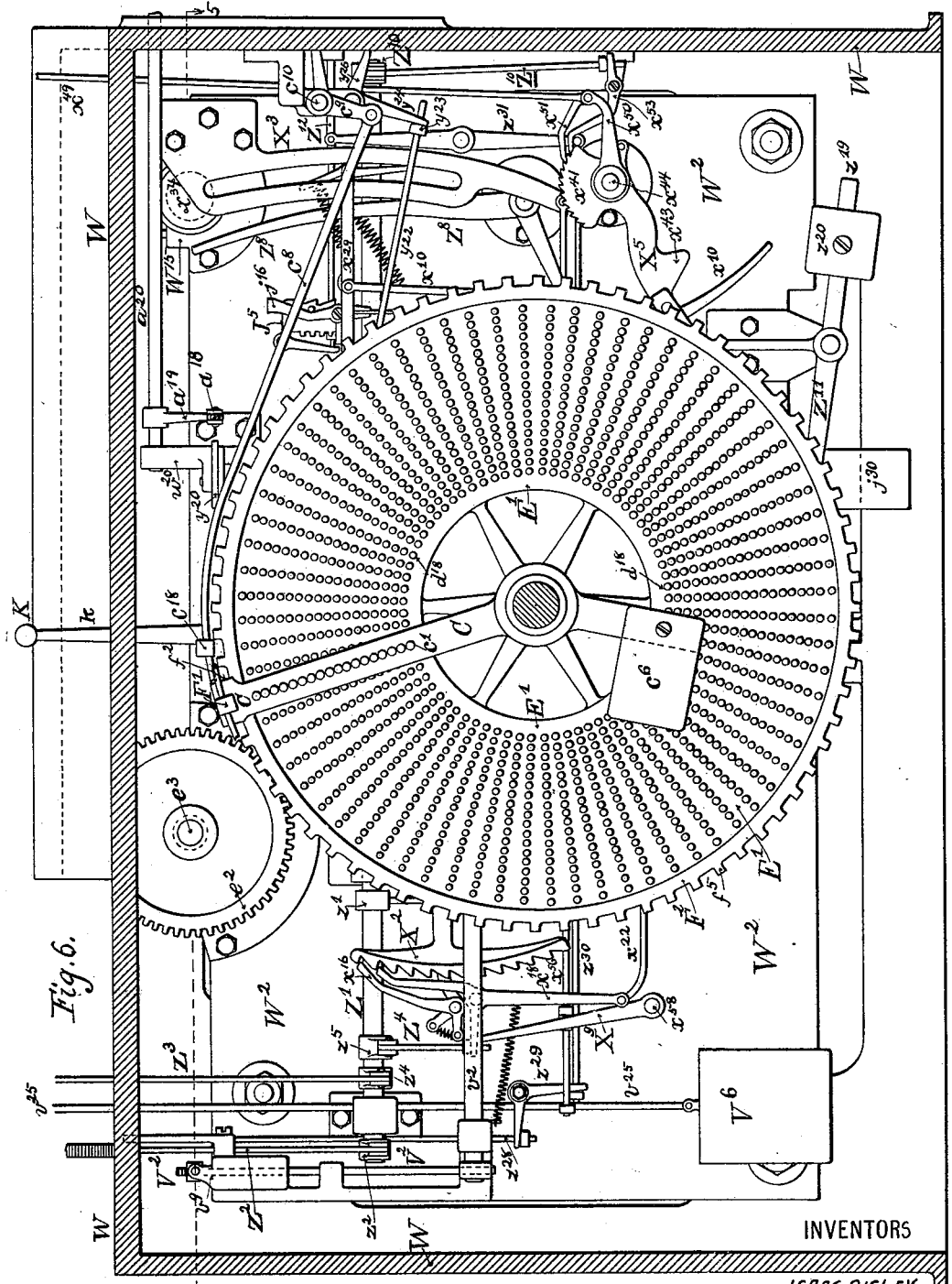

If the operator works more slowly than the machine, the setting-frame will travel forward with the wheel E' until it reaches the position shown in full lines in Fig. 13, when the outer end of the setting-frame C will strike a rod $c^8$, Figs. 5, 6, and 46, which through an arm $c^9$ on an axis $c^{10}$ and an arm $c^{11}$ on the latter will raise the latch C' and bar $E^{16}$ to throw out the clutch and stop the machine temporarily until the bar $E^{16}$ is dropped again.

In order to prevent breakage of the escapement-dog F' by the tooth $f^6$ accidentally striking the outer edge of a tooth $f^5$ on the wheel E', it is preferable to make the tooth $f^6$ yielding, as by having it free to slide backward on the body of the dog against a spring $f^7$, as shown in Fig. 14$^b$.

There has been now fully described the means whereby the pins $d'$ to $d^{18}$ on the composing-wheel are projected or "set" by power, as selected by the operation of the keys, to produce preliminary representation of the matter under composition. Before proceeding with a description of the mechanism which is acted upon by the pins thus projected or set it will be well to refer to Fig. 50, which indicates, diagrammatically, the composing-wheel (looking from the front of the machine) and shows the pins which would be set for the representation of the sentence "When in the course of human events it becomes necessary," and it is supposed that the first line shall close on the word "events." The wheel moves in the direction of the arrows and the pins are projected, as already described, within the limits of the segment marked "Setter-frame movements." Then there is a portion of the movement to the right (equal in this case to the width of three radial rows of the pins) marked "In advance for corrections." During this part of the movement of the wheel the operator may correct an error which he has just made in the fingering of the keys. The projected pins then reach the "registering position," where the units-pins $d^3$ to $d^8$ and the word-space pin $d^2$ act upon the devices for registering the units and the number of word-spaces in the line. These pins and the "line-pin" $d'$ act upon a set of preliminary performing levers, indicated by the heavy dotted line drawn vertically upward from the center of the wheel. The projected pins after certain of them have acted upon these preliminary performing levers are carried around in their projected positions until they reach a second set of performing levers, which may be termed the "final" performing levers. In the present instance there are eighteen of these final performing levers for all of the pins in each radial row on the wheel. The positions of these levers in the present machine are indicated by the heavy dotted line drawn to the left and nearly horizontally from the axis of the wheel. In other words, in the present machine any given radial row of pins on the wheel after passing the vertical row of preliminary performing levers will have to travel nearly three-quarters of a revolution of the wheel $E'$ before reaching the second set of performing levers, which are actuated by the pins $d^9$ to $d^{18}$ to cause the proper type on the type-carrier to be brought to the common point of impression, and by the pins $d^3$ to $d^8$ to give to the matrix or other carriage the variable feed corresponding to the type selected, and by the word-space pin $d^2$ in conjunction with the units-pin to cause such increase or diminution of the word-space feed as will produce automatic justification of the line. A projected line-pin $d'$ will act upon its final performing lever to give the line-feed to the carriage and to cause the several parts to return to their initial positions. The projected pins will then come into contact with a stationary incline $K^2$, Figs. 4, 5, 7, and 15, which pushes the pins back to their normal unprojected positions.

*Correcting-key.*—The correcting-key K, Figs. 1, 2, 4, and 7, is in the present instance shown as arranged horizontally above the keyboard and connected to an upright arm $k$, which is pivoted at $k^2$, Fig. 7, to a bracket $W^{10}$ of the partition $W^2$ of the frame. This arm $k$ carries a plate $k^3$, which when the key K is pulled by the operator against the action of its spring $k'$, Fig. 1, will push back projected representation-pins then opposite to it.

The plate $k^3$ also carries a wing $k^5$ with its face in a plane a little back of the plate $k^3$, Fig. 5. This wing $k^5$ is, as shown in Fig. 7, back of the setting-frame C and limits the projection of the representation-pins.

*The two sets of performing levers.*—The preliminary performing levers are lettered $Y^4$, J, and H and are indicated in plan view in Fig. 5, in end elevation in Fig. 7, side elevation in Fig. 8, and in plan view in Fig. 15. The levers H are for effecting registration of the units, the lever J is for effecting registration of the word-spaces, and the lever $Y^4$ for closing the line. These levers H, J, and $Y^4$ are pivoted at their rear ends at $h$ to an arm $L^3$, Fig. 15, carried by an upright shaft $L^2$, Figs. 3, 5, 8, and 15, and are guided at their front ends, adjacent to the composing-wheel $E'$, in a fixed comb-plate $W^{13}$. The upright shaft has a rocking motion imparted to it by any suitable means to bring the ends of the performing levers into and out of the path of the projected pins. For this purpose the upper end of the shaft $L^2$ carries an arm $L'$, which is acted on by a side cam L on the main shaft $E^3$, Figs. 15 and 24. In Fig. 15 the full lines show the levers $Y^4$, J, and H as in their positions when their ends are in the paths of the projected pins $d'$ $d^2$, &c., on the composing-wheels. The dotted lines show them as being withdrawn to escape from the pins $d'$ $d^2$, &c.

The final or second set of performing levers lie in an approximately horizontal row, Figs. 3, 4, 5, 7, 8, 15, 36, and 38. The several levers and their uses are clearly indicated in Fig. 15, the first lever Z being for the line and carriage pin to give the line-feed to the carriage and to return the parts to their initial positions, while the second lever $X'$ is for the word-space movement in justification. The next six levers V control the units-feed to be imparted to the matrix or other carriage, and the remaining ten levers (marked M $M^{17}$ $M^{18}$) control the type-carrier movements.

The final performing levers are at their front ends guided in a comb-plate $W^{12}$, Fig. 7, and at their rear ends are pivoted to an arm $L^6$ on a horizontal shaft $L^4$, to which a rocking movement is imparted from the upright shaft $L^2$ by the bevel-gear $L^5$, Figs. 3 and 15. A spring $L^7$, Figs. 3 and 4, tends to keep the ends of both performing levers in the paths of the projected pins on the composing-wheel, while the cam L intermittently withdraws them after the said wheel $E'$ has been fed forward one step. This forward movement of the composing-wheel causes its projected pins to swing their corresponding performing levers on their respective axes, as shown, for instance, in the case of lever H in Fig. 15. There will now be described the operation of these several levers H on the units-registering mechanism.

The term "register" is not to be understood in the limited sense of a "graduated scale," although there may be a graduated scale for the operator's observation. The units and word spaces are "registered" in the sense that the machine itself ascertains or registers them by the varying extents of movement of certain of its moving parts, which varying extents of movement are then employed to control the carriage-feed and the automatic justification accordingly.

There is at the back of the machine a ratchet-wheel I, which may be termed the "units-register" wheel, Figs. 3, 4, 5, 16, 17, and 18. It turns on an axis $i'$ and receives its feed movement from the several performing levers H through suitable devices now to be described. There lies at the back of the levers H an arm $H'$ on an upright shaft $h'$ free to turn in suitable bearings in the frame, Figs. 8 and 15. This arm $H'$ carries a series of antifriction-rollers $h^2$ $h^3$ $h^4$ $h^5$ $h^6$ $h^7$, each bearing upon a separate lever H at a different distance from the axis $h$ of the levers H. In the case illustrated a given movement of the lowest of the levers H, Fig. 8, would give the least movement to the shaft $h'$, while at the other extreme the uppermost lever H, acting on the roller $h^7$, would give it the greatest movement, and these variations are arranged to correspond with the varying numbers of units (from two to seven) for the different characters. The varying extents of the rotary movement thus imparted by the different levers H H to the upright shaft $h'$, Fig. 8, are transmitted by bevel-gears $h^8$ $h^9$, Fig. 15, to a horizontal shaft $h^{10}$, which has at its outer end an arm $h^{11}$, Figs. 16 and 18, provided with a projection $h^{12}$, bearing against a nose $g^{13}$ on the lower arm of a lever $g^6$, which is free to turn upon the shaft $h^{10}$. A connecting pull-spring $g^{15}$ tends to keep these parts $g^{12}$ and $g^{13}$ in contact with each other. A pull-spring $h^{13}$, Figs. 3 and 16, acts through the described connections to keep the rollers $h^2$, &c., of the arm $H'$ up against the levers H. The lever $g^6$ carries at its upper end a pivoted feed-pawl $G'$, acted upon by a spring $g^8$, Fig. 18. The tooth of this pawl engages with the ratchet-teeth of the wheel I, Figs. 16 and 18. The extent of movement of the lever $H'$ by the units performing levers H determines how many ratchet-teeth shall be taken at each feed movement of the pawl $G'$. Feed movement is imparted to the pawl $G'$ from a cam G, Figs. 1 and 24, on the main shaft. This cam G has a side cam $g$, adapted to act upon a roller $g'$ on an arm $g^2$, Fig. 1, upon an upright shaft $g^3$, Figs. 3, 4, 5, and 8, which carries at its lower end an arm $g^4$, connected by a rod $g^5$ to the pawl-carrying lever $g^6$.

The spring $h^{13}$, before referred to, normally keeps the arm $g^2$, with its roller, out of the path of the cam $g$, Fig. 3, so that no movement will be imparted to the pawl $G'$. When, however, one of the levers H is acted upon by a representation-pin, ($d^3$ to $d^8$,) the shaft $h^{10}$ will be correspondingly turned to raise the arm $h^{11}$, Fig. 16, and by the spring $g^{15}$ will move the arm $g^6$ and the pawl $G'$ over a number of teeth of the ratchet, depending upon the extent to which the arm $H'$ and shaft $h'$ have been rocked by the operated lever H. By the same movement the arm $g^2$ has been allowed to come into the path of the cam $g$, which then moves the arm $g^2$ back and through the described connections draws the feed-pawl $G'$ back to turn the register-wheel I correspondingly.

A check-pawl $G^2$ holds the register in the position to which it may be turned until it is released or thrown out automatically, as hereinafter described. To prevent overthrowing of the register-wheel, a fixed stop $g^{12}$, Figs. 16 and 18$^a$, is provided on the frame of the machine to act in conjunction with a projection $g^{11}$ on the pawl, one or both of these parts being beveled in such a way as to force the nose of the pawl down into the ratchet-teeth as the pawl reaches the end of its backward or feeding stroke. This locks the wheel securely at the end of each feed movement.

The units-register wheel is provided with a back-stop $I^4$, Fig. 16, to come against the arm $W^7$ of the frame when the wheel is released from the pawls $G'$ and $G^2$ and flies back to the starting-point under the action of a spring or counterweight, such as the weight $I^8$ upon the arm $i^{10}$, which has a toothed quadrant gearing with the pinion $i^8$ on the wheel I. The pawls $G'$ and $G^2$ are released by the arm $Y^8$ on the end of the rock-shaft $y^{29}$, Figs. 16, 18, and 44, which arm can press upon the rear end of the check-pawl $G^2$ to lift both pawls out of engagement with the ratchet-wheel. This arm $Y^8$ also carries a spring-plate $Y^9$, which when the released wheel I reaches the end of its return movement will temporarily enter the notch $y^{32}$ of the wheel and stop rebound of the latter.

To insure the feed movement of the units-register I being started on the proper unit, a projection $I^{11}$, Fig. 16, is provided on the side of the pawl to engage with a projection $I'$ on the wheel.

In order that the machine may be operated more than a line in advance and that the units of the second line may be registered in composition while the first line is being justified and is receiving its final representation, the units-registering mechanism is in two parts. There is combined with the wheel I a supplementary register $I^{10}$ in the form of a segmental ratchet-wheel, which is brought into operation toward the end of each line of composition. This supplementary register $I^{10}$ turns on the same axis $i'$ as the wheel I and has a pin or projection $i^{13}$, with which a pin or projection $I^2$ on the wheel I comes into contact near the closing limits of a line of composition. Thus as the wheel I is intermittently fed forward in the direction of the arrow, Fig. 16, after the pin $I^2$ reaches the pin $i^{13}$ the supplementary register $I^{10}$ is moved with it until the end of the line is reached, and the registers I and $I^{10}$ have thus ascertained the number of units the line is short or in excess of the assumed standard. A check-pawl Y$^{15}$, Figs. 16, 17, and 18, acted on by a pull-spring y$^{47}$, holds the register I$^{10}$ so that the wheel I may be released to return to its starting-point again for the next line of composition, while the ratchet I$^{10}$ keeps the registry to control the justification of the composed line. This register I$^{10}$ controls the position of a slide or rack i$^{15}$, vertically adjustable in a fixed guide W$^{14}$ in the frame, Figs. 16, 17, and 18. In the present instance this connection is through a segmental rack I$^9$, attached to and moving with the ratchet I$^{10}$ and gearing into teeth on the side of the slide or rack i$^{15}$. The position of this slide i$^{15}$ determines the amount of units to be added to or subtracted from the normal word-space feed in the automatic justification, as will be hereinafter described.

The supplementary register I$^{10}$ is released and allowed to return to its initial position when the forward movement of the register-wheel I in registering a succeeding line of composition brings projection I$^6$, Fig. 18, into contact with a roller y$^{42}$ on an arm y$^{43}$, carried by a shaft y$^{44}$, Figs. 16, 17, 18, and 47. This arm y$^{43}$ acts on a pin on the check-pawl Y$^{15}$ to disengage the wheel I$^{10}$. The projection I$^6$ is, as shown in Fig. 18, pivoted and provided with a suitable spring i$^{60}$, so that on the return movement of the wheel I the projection I$^6$ can slip past the roller y$^{42}$ without releasing the check-pawl Y$^{15}$. The wheel I also carries a projection I$^5$, Figs. 16, 17, and 18, which within the closing limits of the line being composed causes the shaft y$^5$, Fig. 41, to rock for purposes hereinafter described. This projection I$^5$, which, like the projection I$^6$, is unyielding in the forward movement, but yielding on the return movement of the wheel I, Fig. 18, is adapted to come into contact with a roller y$^{11}$, Fig. 17, at the junction of a pair of links y$^8$ and y$^{10}$, the latter being supported on a bracket y$^9$ and the former being connected to an arm y$^7$, fast on the rock-shaft y$^5$. This rock-shaft y$^5$ has fixed to it a pendent arm y$^6$, carrying a projection y$^{12}$, Figs. 16, 18, and 41, which may engage with either of the notches y$^{15}$ y$^{16}$ of the pivoted latch y$^3$, normally held in engagement with said arm y$^6$ by a spring y$^{17}$.

While not essential it may be a convenience, as where the line is to be closed on a hyphen or in composing tabulated matter, to have a visible indicator and also an audible signal to indicate the closing limits. Such an indicator is shown at i$^{18}$, Fig. 2, the movable pointer thereof being carried by a horizontal spindle i$^{19}$ with a pinion i$^{20}$, Fig. 1, receiving motion from the pinion i$^8$, Fig. 3, of the register-wheel I through the medium of a rack-rod i$^{21}$. The audible signal I$^{12}$ may be operated from the same spindle i$^{19}$.

*Word-space register.*—The pins d$^2$ of the second concentric row in the composing-wheel are for the word-spaces. When one of these pins is set, it first comes into contact with the performing-lever J, Figs. 19 and 44. This in turn acts upon an arm j, carried by a hub j', which turns freely upon the shaft y$^{29}$ and carries an arm j$^2$, provided with a feed-pawl j$^3$ to engage with the ratchet-teeth of a wheel J'. Turning independently on the same axis as the wheel J' is another wheel or segmental gear J$^3$. The wheel J$^3$ has attached to it a pulley j$^{28}$, Fig. 19, and the wheel J' has a similar pulley j$^{32}$, Fig. 5. To these two pulleys are connected the two ends of the cord j$^{29}$, Fig. 19, in the loop of which is suspended a weight j$^{30}$, so as to tend at all times to turn the wheels J' and J$^3$ in a direction the contrary of that pointed out by the arrow in Fig. 19. The wheel J' carries a pin or projection j$^{10}$, which can come into contact with a pin or projection j$^{11}$, carried by the wheel J$^3$. The wheel J' has a check-pawl j$^7$, which is normally held in engagement with the wheel by a spring j$^8$, but which can be lifted out and at the same time lift out the feed-pawl j$^3$, Fig. 44, by an arm Y$^{23}$, carried by the rock-shaft y$^{29}$. The gear-wheel J$^3$ engages with a "word-space" rack free to slide vertically in guides in the frame. This rack is in two parts J$^4$ and J$^5$, the former gearing with the wheel J$^3$, while the supplementary rack J$^5$ does not. The upward movement of the rack J$^4$ is limited by a fixed stop j$^5$, Fig. 20. The downward movement of the rack J$^5$ is limited by a projection, such as the end of pin j$^{17}$, reaching the bottom of a slot j$^{14}$ in rack J$^4$. The rack J$^5$ is provided with a stop-piece j$^{16}$, which at the proper time supports a rod x$^{29}$, Figs. 21 and 40, in a certain position vertically, dependent upon the number of word-spaces registered, to distribute the justification through those word-spaces of the line, as hereinafter described. This support j$^{16}$ is made yielding in one direction, so that if projection x$^{11}$ on rod x$^{29}$, Fig. 21, strikes the stop j$^{16}$ on other than its downward movement said stop will yield. For this purpose the stop is pivoted at j$^{17}$ and acted on by spring j$^{18}$, which keeps it normally against stop j$^{20}$.

When the feed motion of the ratchet-wheel J' brings the pin j$^{10}$, Fig. 19, against the pin j$^{11}$, the gear-wheel J$^3$ will move with the wheel J' and carry with it downward the rack J$^4$. A loosely-pivoted pawl j$^{21}$, engaging with its ratchet-teeth j$^4$, will hold the said rack and gear-wheel in the positions to which they are fed downward, dependent on the number of word-spaces in the line. A pivoted pawl j$^{24}$, engaging teeth j$^{15}$ on the rack J$^5$, normally holds the latter in any position to which it may be raised. A common spring j$^{26}$ may be used to keep these pawls in engagement with their respective racks. Both pawls can be thrown out by the arm Y$^{14}$, secured to the rock-shaft y$^{44}$, Figs. 22 and 47, acting upon pins j$^{23}$ and j$^{27}$ on the pawls when the movement of the register-wheel I brings the projection I$^6$ against the arm y$^{43}$ on the same shaft y$^{44}$.

In Fig. 21 the supplementary word-space rack $J^5$ is shown as left in position from a previously-composed line, (which is being justified,) as with six word-spaces; but in the succeeding line under composition it is shown how the primary rack $J^4$ has been moved down ten spaces. In Fig. 22 the shaft $y^{44}$ has been rocked, (near the closing limits of the line being composed,) and both pawls $j^{21}$ and $j^{24}$ have been thrown out, and supplementary rack $J^5$ has dropped back into normal relation to the rack $J^4$ by pin $j^{17}$ reaching bottom of slot $j^{14}$, Fig. 20. The rack $J^4$, however, maintains its down position, registering ten word-spaces, because the pawls $j^3$ and $j^7$ have not yet been released, the line under composition not yet being closed, and consequently pin $j^{10}$ on wheel $J'$ bears against pin $j^{11}$ on gear-wheel $J^3$ to hold rack $J^4$ down. Immediately after reëngagement of the pawls $j^{21}$ and $j^{24}$, Fig. 23, the closing of the line causes the raising of the pawls $j^7$ and $j^3$, when the weight $j^{30}$, Fig. 19, causes the wheel $J'$ to fly back to its starting-point. The register-rack $J^5$ will now support the justifying-rod $x^{29}$ at a proper low position to distribute the justification through the ten spaces of the line, as hereinafter described.

When the units-register wheel I comes near the closing limits of the next line being composed, the projection $I^6$, Fig. 47, will cause the shaft $y^{44}$ to rock again and throw out the pawls $j^{21}$ and $j^{24}$. If there are fewer word-spaces in this new line than in the preceding one, the wheel $J^3$ will fly back, elevating both racks to a higher position, such as shown in Fig. 19, for instance. This position may be determined either by the rack reaching its stop $j^5$, Fig. 20, or by the pin $j^{11}$ on wheel $J^3$ coming into contact with pin $j^{10}$ on wheel $J'$.

The division of the word-space-registering mechanism into two parts at $j^{10}$ and $j^{11}$ permits the machine to compose more than a line in advance of the final representation, the ratchet $J'$ going back to begin registering on a new line, while the wheel $J^3$ and racks hold the registration for the subsequent justification of the composed line. The division of the word-space rack into two parts $J^4$ and $J^5$, overlapping each other in their work, allows for the variation in the number of word-spaces in successive lines—that is, it permits the part $J^4$ to be used with the gear-wheel $J^3$ for the registration of a line with more word-spaces than are in the previously-composed line which is being justified, while its word-space registration is being maintained by the supplementary rack $J^5$, as illustrated in Fig. 21.

Figure 44:
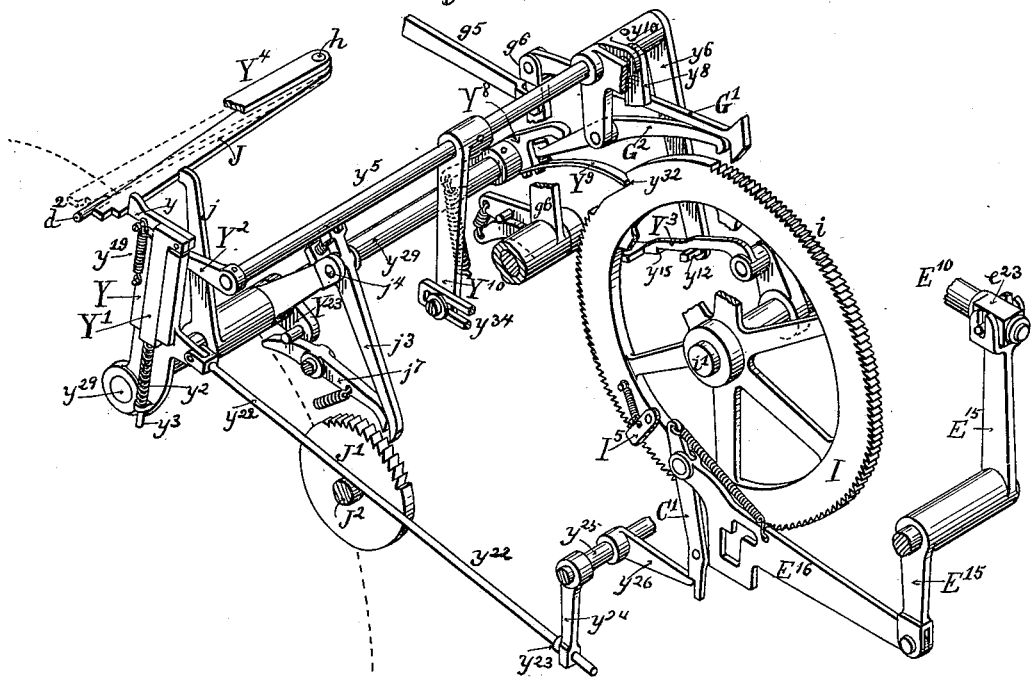
Figure 45:
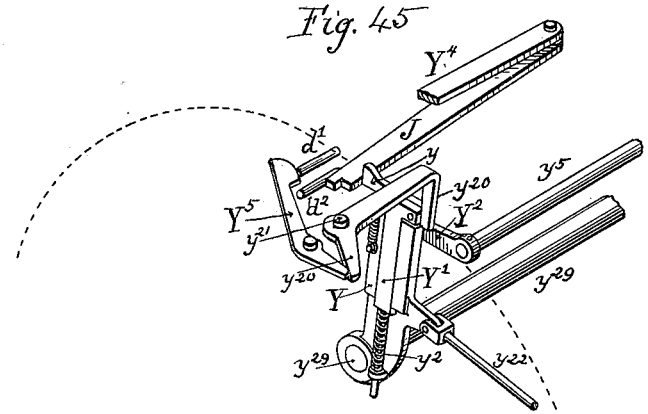

*Line-closing at the composing stage.*—There now remains to be described at the composing stage or preliminary performing part of the machine the mechanism controlled by the line-closing pin $d'$ and its performing-lever $Y^4$, Figs. 7, 41, 42, 43, 44, and 45. There is secured to the front end of the rock-shaft $y^{29}$, before mentioned, an arm Y, Fig. 41, which carries at its upper end a projection $y$, normally opposite the outer end of the lever $Y^4$ and in such a position that the said lever when operated by a line-closing pin $d'$ will strike the projection $y$ on lever Y and rock the shaft $y^{29}$. As already described and as shown in Figs. 16, 18, and 44, this shaft $y^{29}$ carries an arm $Y^{23}$ and at its other end an arm $Y^8$. On the described movement of the lever Y the arm $Y^{23}$ will release the word-space-register wheel $J'$ from its pawls $j^3$ and $j^7$, and the arm $Y^8$ will release the units-register wheel I, allowing these parts of the two registers to return to their initial positions for the registration of another line. The lever Y also has a connection with the stop motion for the main shaft $E^3$ such that when the said lever Y is moved over by the line-closing lever $Y^4$ the wheel $E^4$ will be unclutched from the main shaft and the machine stopped to permit the register-wheels I and $J'$ to return to their starting positions for the new registration. This connection consists in the present instance of a rod $y^{32}$, having a shoulder $y^{23}$, Figs. 7 and 44, bearing against an arm $y^{24}$ on a spindle $y^{25}$, which has a finger $y^{26}$ supporting the latch $C'$, Fig. 12, of the bar $E^{16}$. Thus when the lever Y is moved by a line-closing pin the free end of the bar $E^{16}$ will be raised, so that the pin $e^{31}$ on the constantly-vibrating lever $E^{17}$ will enter the slot $e^{28}$ and will thrust the plunger $E^{10}$ inward to free the wheel $E^4$ from the shaft $E^3$ and frictionally lock the latter to the frame $E^{20}$, Fig. 12.

Provision is made for starting the machine again automatically as soon as the released parts have fully returned to their initial positions. For this purpose the pin $I^2$ on the register-wheel is availed of to strike at the end of the return movement an arm $y^{35}$, Figs. 16, 17, 18, and 46, on the end of spindle $y^{36}$, which at its opposite end has an arm $y^{37}$ bearing against a rod $y^{39}$. The front end of this rod is opposite a pin $y^{40}$ on the latch $C'$, Figs. 12 and 46, when the latch-bar $E^{16}$ is raised, and since the latch-bar remains raised, because the machine has stopped so quickly that the lever J remains in the position shown in Fig. 44, the striking of the pin $I^2$ against the arm $y^{35}$, Fig. 46, will push the rod $y^{39}$ forward, and with it the latch $C'$ and disengage the latter from the finger $y^{26}$. The bar $E^{16}$ then drops and the machine starts again automatically.

*Automatic line-closing.*—The main object of this feature of the invention is to increase the speed of operation of typographic machines by enabling the operator of the typographic machine to which the invention is applied to finger or operate the keyboard continuously without having to give any of his time to the separation and closing of the composed matter into lines. This result is accomplished by combining with the space key or bar and with line-closing devices and the register (or other device which measures the length of or number of units in the matter being composed) a device or devices or mechanism whereby the operation of the said space-key when the composed matter reaches the "closing limits" of the line shall automatically operate the line-closing mechanism.

Between the line-closing mechanism and the above-mentioned space-key there is provided, according to this invention, suitable mechanism for connecting and disconnecting those parts at the proper times in order that the movement of the space-key near the end of the line, and only then, will throw the line-closing mechanism into action. At all other times the space-key and the line-closing mechanism will be so far free of each other that the space-key can perform its normal duty of making spaces between words without affecting the line-closing mechanism. The operation of the connecting devices is controlled by the register or other moving part which indicates the length of or the number of units in the line being composed in order that when said line has reached a length within so many units of the standard length of line (or, in other words, the closing limits) the register or measuring part will then connect the space-key with the line-closing mechanism. When the space-key is next operated at the end of the word then being composed, this movement of the space-key will throw the line-closing mechanism into action and the line will be closed automatically, so that the operator can proceed with his composition continuously. A hyphen-key may in the same way and by substantially the same means be automatically connected with the line-closing mechanism by the measuring device when the matter being composed reaches the closing limits of the desired length of line, so that where there happens to be a very long word within these closing limits that word may be hyphenated and the line closed on the hyphen. After the line has been closed automatically, as described, suitable means provided for the purpose disconnect the space-key automatically from the line-closing mechanism in order that through the main part of this next line such key may perform only its ordinary duty of word-spacing without affecting or acting upon the line-closing mechanism; but when the closing limits of this next line are reached, as indicated by the register, the latter will again automatically connect the said key with the line-closing mechanism to make the line-closing automatic.

This invention may be applied to various kinds of typographic machines. It may be applied to typographic machines of the class in which the type are supplied from magazines and set or pushed out in a continuous line, and in such case this composed matter will be separated into lines of the desired length by introducing line-spaces automatically on the operation of the space-key or hyphen-key when connected up with the line-closing mechanism.

The invention may also be applied to that class of typographic machines in which the lines are moved into galleys. Such lines are automatically separated. The invention may be similarly applied to machines in which the types are cast and set.

This invention may also be applied to line-bar or linotype machines, in which matrices are assembled and a line cast therefrom. The closing of the line of matrices has heretofore been effected by hand by the operation of a line-key or line-lever by the operator. According to the present invention this closing of the line of matrices is effected automatically by combining with the space-key and line-closing mechanism devices whereby those parts may be automatically connected by the register when the line of matrices reaches the closing limits, so that on the next operation of the space-key (or it may be a hyphen-key) the line-closing mechanism will be operated automatically. In any of the classes of typographical machines described for assembling types or dies the line of types or dies may themselves constitute the register or measuring means.

In a matrix-forming machine the feed of the matrix-carriage is effected with each operation of a character-key or space-key and mechanism is provided for moving the matrix-sheet from one line to the next. Combined with this line-movement mechanism and with the space-key are devices whereby those parts will be automatically connected by the register when the given line reaches its closing limits. This invention is similarly applicable to type-writing machines.

For the purpose of carrying out this invention in the machine shown in the drawings the projection $y$ of the lever Y instead of being fixed thereon is carried by a slide Y', which can have a limited movement lengthwise of said lever and is normally held in its upward position by a push-spring $y^2$, Fig. 41. The slide can, however, be pushed down to bring the projection $y$ out of line with the line-closing lever Y$^4$ and into line with the word-space lever J, Fig. 45. This is effected by an arm Y$^2$ on the rock-shaft $y^5$ acting upon a pin $y'$ on the back of the slide Y'. As already explained, the projection I$^5$ on the units-register wheel I when the latter reaches the closing limits of the line being composed acts upon the roller $y^{11}$ and through the link $y^8$ and arm $y^7$ rocks the shaft $y^5$, Fig. 41, and presses down the slide Y' to bring its projection opposite the lever J, as shown in Fig. 43. It is now held in this position by the pendent arm $y^6$, Figs. 41, 16, and 18, engaging its pin $y^{12}$ by the same movement with the inner notch $y^{16}$ of the latch Y$^3$. This is afterward released and the rock-shaft $y^5$ allowed to return by the pin I$^7$, Fig. 16, on the return movement of the register-wheel striking the end $y^{41}$ of latch Y$^3$. It is preferable to hold the rock-shaft $y^5$, however, until the wheel I has been moved forward again to its starting position, (shown in Fig. 16,) and therefore there is provided on the wheel I a projection $y^{47}$, which comes in front of the pin $y^{12}$ on the arm $y^6$ as said pin is released from notch $y^{16}$ of the latch $Y^3$, and this projection $y^{47}$ holds back the arm $y^6$ until the wheel is fed forward again to the position shown in Fig. 16. When the projection $y$ has been pushed down, as described, within the closing limits of the line in composition, it is evident that a word-space pin $d^2$, set within such closing limits and acting upon its lever J, will through the latter move the arm Y over and through the rock-shaft $y^{29}$, Fig. 44, automatically release the units-register wheel I and the word-space wheel J', and through rod $y^{22}$ temporarily stop the machine. At the same time it will automatically project in the same radial row of the composing-wheel E' a line-pin $d'$, ready to do its work when it gets around to the final performing position, where it will act upon its lever Z. This automatic projection of the pin $d'$ in the composing-wheel is effected by the devices shown in Fig. 45 and also in the plan view, Fig. 5. The rear side of the slide Y' acts against one arm of a lever $y^{20}$, pivoted at $y^{21}$ to a bracket $w^{20}$, Fig. 5, while the other arm of the lever acts upon a pivoted lever $Y^5$, and this latter pushes out the pin $d'$ in the same radial row with that word-space pin $d^2$ which has actuated the lever J and lever Y.

To avoid possible breakage of the projection $y$, should it happen that the slide Y' is pushed down while the word-space lever J is projected, this projection $y$ is pivoted to the slide Y' at its rear end and is held down by a pull-spring $y^{19}$, which will, however, yield, when required, as illustrated in Fig. 42, until the lever J returns, as shown in Fig. 43.

It may be added that the rock-shaft $y^5$ also carries an arm $Y^{10}$, Figs. 16, 17, 44, and 48, which on the operation of the said rock-shaft within the line-closing limits of a line being composed throws into operative position certain parts for release of the justifying devices, as hereinafter described.

We now pass to the description of the mechanisms which are controlled by the final performing-levers Z, X', V, M, $M^{17}$, and $M^{18}$. First there will be described the character-locating mechanism. The principal parts of this mechanism comprise a movable type-carrier T, slides controlling the movements of the carrier, and a rotary grooved cam-cylinder P on the main shaft, the slides having plungers to be projected into the cam-grooves to cause the slides to move the type-carrier to bring the desired characters in succession to the common point of impression and to return the carrier to its normal central position. The projected pins upon the composing-wheel determine the selection of the plungers in the said slides and accordingly also the characters to be brought to the point of impression.

As heretofore stated, the type-carrier itself may vary greatly in construction. One in the form of a cylinder, as shown at T in Figs. 28, 30, and 31, is preferred. It is so mounted that it can have a longitudinal (in this case vertical) movement and a rotary movement and so that these movements may be in different directions from a normal central position. This type-cylinder has the type $t$ arranged on the cylinder in rows horizontally and vertically, with the normal central point indicated by the dotted square in the diagram Fig. 49, which shows the preferred arrangement of the several characters. Any character on the central vertical row can be "located" or brought to the common point by a vertical movement of the type-cylinder upward or downward, and any character on the central horizontal row can be brought to a common point by a horizontal or rotary movement to the right or left, while all the other characters are located by combined vertical and horizontal movements, as will be readily understood. The cams by which these movements are produced are in the form of grooves $p'\ p^2\ p^3$, &c., on the single cam-cylinder P on the main shaft, Fig. 24. The forms of these several cam-grooves are shown extended in the diagram Fig. 25. In front of this cam-groove cylinder are mounted two slides Q and Q', Figs. 2, $24^a$, and 26, which are free to slide horizontally on guide-rods $q\ q$, mounted in standards $W^9$ on the frame of the machine. Each of these slides Q Q' is provided with a series of plungers O O' $O^2$ $O^3$, &c., corresponding in number with the grooves in the cylinder P and movable transversely in the slide and held by friction-springs $q^{40}$, Fig. 26. When the slides are in their normal central positions, as shown in Figs. 2 and $24^a$, the inner ends of these plungers O' $O^2$, &c., which may be termed "selecting-plungers," are directly in line with the closely-adjacent or entering portions of the cam-grooves, so that then any selected plunger of either slide at that point in the revolution of the cam-cylinder may be projected into engagement with its corresponding cam-groove $p'\ p^2\ p^3$, &c., and as the cam-cylinder rotates that groove will cause the plunger-slide to move horizontally to the right or to the left and to a distance depending on the cam-groove selected.

In addition to the cam-grooves there is provided a centralizing-groove $p$, which in the present instance is shown midway between the right and left hand sets of cams. To further effect with certainty the centralization of the slides while the selecting-plungers are opposite the cut-away portion $p^{16}$ of the cam-cylinder, projections $p'$ are provided, against which the projecting lugs on the slides Q and Q' can bear as the cam-cylinder rotates, Fig. $24^a$. The series of grooves $p'\ p^2\ p^3\ p^4$ on the right can move either slide Q Q' to the right and return the slide to its normal position, while the cam-grooves $p^5\ p^6\ p^7\ p^8$ on the left can move either slide to the left and return at each revolution of the cam-cylinder. The two series of cam-grooves may act on the plunger-slides separately or either series may act on both slides at once, so that all the desired movements of the type-carrier are obtained from a single cam-cylinder. In the diagram Fig. 25 the direction of movement of the cylinder is indicated by arrows. At the back of the grooves there is a transverse incline $p^{15}$, which, as shown in Fig. 8, will push back into the slides the plungers which have been projected. The two slides are so connected up by any suitable means to the type-carrier T that one slide—say the upper slide Q—will impart rotary motion in one direction or the other to the carrier, while the other slide Q' will impart vertical motion to it up or down, according to the direction and extent to which the slides Q and Q' are moved by the cam-grooves through the selected plungers.

In the specific construction shown the type-carrier is composed of a sleeve T', on which is detachably held a shell T by means of a screw-ring $t'$, Fig. 28. In the shell T are vertical grooves for the reception of the type or punches $t$, Figs. 28, 30, 30$^a$, and 31; but these types occupy only about one half the circumference of the cylindrical type-carrier, the other half of such circumference being left free to bear against the support $R^7$, Figs. 30 and 31, as hereinafter referred to. The type-sleeve T' is mounted on a spindle $q^{18}$, so as to turn therewith, but free to slide longitudinally thereon, as by means of a key moving in a longitudinal keyway $t^5$, Fig. 28$^b$. The spindle $q^{18}$ turns in suitable bearings, one $r^{10}$ at the lower part of the vibrating frame R' and the other at $r^8$ in the detachable cap $R^2$. To rotate the spindle $q^{18}$, and consequently the type-carrier, in one direction or the other, there is mounted on the lower end of this spindle a gear-wheel $q^{17}$, gearing with teeth $q^{12}$ in a horizontal rod $Q^2$, connected at its opposite end to the slide Q.

To impart vertical motion to the type-carrier from the slide Q', the type-sleeve T' has an annular groove $t^{16}$ for the reception of the forked upper end $q^{29}$, Figs. 29 and 30, of the vertical rack $q^{27}$, into which meshes the pinion $q^{28}$ on the horizontal shaft $q^{26}$, having at its opposite end the pinion $q^{30}$, meshing into a rack $q^{25}$ on a tubular rod $Q^3$. The rod $Q^2$ passes centrally through the tubular rod $Q^3$, and the latter has a slot $q^{22}$ for the passage through it of the gear-wheel $q^{17}$. The tubular rod $Q^3$ is connected to the lower slide Q' through an arm $q^{23}$ and rod $q^{24}$, Fig. 27.

The vibrating frame R', which carries the movable type-carrier and its spindle, is pivoted by journals $r^2$, Figs. 32 and 35, to bearings in the arched part $W^8$ of the frame, Figs. 3 and 30. The connecting-rods $Q^2 Q^3$ pass concentrically through hollow journals, Figs. 30 and 32. The upper portion of the frame R' is somewhat in the form of a vertical cylinder with an opening $r^5$, through which the type on the type-shell can project, while the lower part of the frame has an arm $r'$, with an antifriction-roller $r$ bearing against a cam R, Figs. 24 and 32, on the main shaft $E^3$, this cam being such as to vibrate the upper part of the type-carrier frame toward and from the matrix cylinder or carriage U, Fig. 30, at each revolution of the shaft. In the upper part of the arched frame $W^8$ there is provided a back-stop $r^{32}$, with an adjustable nut $r^{33}$ and a spring $r^{34}$, while on the upper part of the vibrating cylinder R' is a projection $r^{31}$ to make contact with the back-stop $r^{32}$ at each stroke. This determines an accurate depth of impression into the matrix-paper on the carriage U.

At the back of the type-carrier T, directly opposite the point of impression, there is an adjustable support $R^7$, against which the back of the type-carrier T rests. This support is adjustable by screws $r^{29}$ and $r^{30}$ in the plate $R^3$ of the vibrating frame, Figs. 30, 31, and 33.

In order to secure perfect alinement of successive impressions, additional alining devices are provided, as will now be described. On the type-sleeve T' there is secured a flange $T^2$, with right and left hand notches or stops $r^{26}$ and $r^{27}$, Figs. 28$^a$ and 34. To work in conjunction with these alining stops, there is provided a plate $R^5$, mounted on vertical pivots at $r^{16}$ and passing through the vertical slot $r^{15}$ of the plate $R^3$, Fig. 33. At the outer end of this pivoted plate $R^5$ there is a flange $R^6$, which has, as shown in Fig. 34, two sets of alining notches or stops $r^{24}$ and $r^{25}$ to coöperate with the flange $T^2$ on the type-carrier. The plate $R^5$ has an arm $r^{22}$, Figs. 32 and 34, with a spring $r^{21}$, which tends to keep the notched flanges $R^6$ and $T^2$ in engagement with each other. They are by means of a cam $R^4$ on the main shaft, Fig. 32, held out of engagement with each other except at the time when the slides Q Q', under the action of the cam-cylinder P, are holding the type-carrier, with the desired type or punch, in the impressing position. On referring to the diagram Fig. 25 it will be seen that the portion $p^{10}$ of the revolution of the cam marks the locating stage, the portion $p^{11}$ marks the alining stage, the portion $p^{12}$ marks the impressing stage, the portion $p^{13}$ marks the freeing of the alinement, and $p^{14}$ marks the return of the slide. Just before the selected plunger of a slide reaches the portion $p^{11}$ of its groove $p'$ $p^2$, &c., the flanges $R^6$ and $T^2$ of the alining devices are allowed to come into engagement and immediately the said cammed portion $p^{11}$ will bring the adjacent stop on one of said flanges firmly against the edge of the other flange to make the alinement perfect. Thus any stop $r^{25}$ of the flange on the type-sleeve will abut against the right side, Fig. 34, of flange $R^6$, while any stop $r^{27}$ will abut against the left side of said flange $R^6$. On the other hand, the upper stops $r^{24}$ of flange $R^6$ will abut against the upper side of flange $T^2$, while the lower stops $r^{25}$ will abut against the lower side thereof. In order to make this alinement possible, a yielding connection is provided between the slides and the type-carrier. In the present instance this is provided where the rods $Q^2$ and $q^{24}$ make connection with the slides Q and Q' in boxes $q'$, Fig. 27. The end of each rod is provided with a shoulder $q^5$. Against this and also against the inner end of a collar $q^{12}$ bears a loose ring $q^8$. At the outer end of each rod a nut $q^{11}$ holds a collar $q^{10}$ in place. Against this collar and an internal flange in the box $q'$ bears a loose collar $q^6$. Between the two loose collars $q^6$ and $q^8$ is provided a spring $q^9$. This construction will permit a slight yield in either direction of movement of either slide at the time of alinement.

The selection of the plungers $O' O^2 O^3$, &c., of either slide Q Q' and their movement into engagement with the corresponding cam-grooves are controlled from the keyboard through the medium of the pins $d^9$ to $d^{18}$, inclusive, of each radial row on the composing-wheel. These pins come into operation at the final performing-levers M, $M^{17}$, and $M^{18}$, Figs. 15 and 36. The plungers are operated by two pairs of strikers $M^3$, $M^{23}$, $M^{13}$, and $M^{33}$, each pivoted at $m^{13}$ to its arm $M^2$. The strikers $M^3$ and $M^{13}$ control the plungers of the upper slide Q, while the strikers $M^{23}$ and $M^{33}$ control the plungers of the lower slide Q'. Two of the arms $M^2$—namely, those which carry the strikers $M^{13}$ and $M^{33}$—are mounted on the ends of shafts $m^5$. These shafts can receive a rocking motion from the performing-levers M through the medium of the levers M', (loosely pivoted on shaft $v$,) connecting-rods $m'$, arms $m^2$, shafts $m^3$, and bevel-gears $m^4$. The extent of this rocking motion will depend on which one of the performing-levers M is acted upon by its projected pin in the composing-wheel. Each of these levers M' has four rollers $m$, Figs. 15 and 36, set at different distances from the axes of the levers M' and from the axes of the levers M, so that the first four levers M, Fig. 36, acting upon the first lever M', rock the corresponding shaft $m^5$, and consequently its arm $M^2$ and the striker $M^{13}$, different distances, depending upon which of the pins $d^9$ $d^{10}$ $d^{11}$ $d^{12}$ has come into action. This striker $M^{13}$ is thus brought with one of its fingers $m^{11}$ $m^{12}$ opposite one of the plungers $O^5$ to $O^8$ of the upper slide. In like manner the pins $d^{13}$, $d^{14}$, $d^{15}$, and $d^{16}$ will operate to move the striker $M^{33}$ to different positions in front of the set of plungers $O^5$ to $O^8$ of the lower slide.

The arms $M^2$, which carry the strikers $M^3$ and $M^{23}$, rock on axes $m^6$, Figs. 1, 2, and 36, and through gears $m^{20}$ move simultaneously with and to the same extent away from their normal central positions as the corresponding strikers $M^{13}$ and $M^{33}$.

Each striker $M^3$ $M^{23}$ has two fingers $m^9$ and $m^{10}$, while the strikers $M^{13}$ and $M^{33}$ have similar fingers $m^{11}$ $m^{12}$, the purpose being by duplicating the fingers on each striker to reduce the extent of movement required to bring the striker into position to act on the several plungers. Normally the finger $m^9$ of the striker $M^3$ and the finger $m^{11}$ of the striker $M^{13}$ are opposite the central plunger O of the upper slide. Similarly the corresponding fingers of the strikers $M^{23}$ and $M^{33}$ are opposite the central plunger O of the lower slide. At such time the outer fingers $m^{10}$ and $m^{12}$ of the respective strikers are not opposite any plungers, but between two adjacent plungers. A single movement of either set of strikers to the right or left from the action of a pin $d^{12}$ or a pin $d^{16}$ will bring the fingers $m^9$ $m^{11}$ midway between the respective central plungers O and the two adjacent plungers and will bring the fingers $m^{10}$ and $m^{12}$ opposite the next to the end plunger of the slide. Similarly the action of any other of these pins of the composing-wheel from their respective performing-levers will move only one or other of the fingers of a striker into position to act on a plunger.

To push the plungers in to engage with their respective cam-grooves after the strikers have been moved into the selected position, the strikers are rocked upon their pivots $m^{13}$ through suitable mechanism. In the present case the upper end of each striker $M^3$ and $M^{23}$ has a connecting-rod $m^{25}$, passing at its rear end through an opening in the flange $n^3$ of a striker-block N', which rocks on the axis $n^2$, Figs. 8 and 36. The strikers $M^{13}$ and $M^{33}$ have similar push-rods $m^{15}$. Rocking motion is imparted to the striker-block N' once at each revolution of the main shaft by a cam-groove N in the end of the cam-cylinder P acting upon a roller $n$ on an arm $n'$, carried by the axis $n^2$. This block N' has pivoted to it at $n^6$ at right angles to its axis two striker-bars $N^2$ and $N^3$, which are normally held by springs $n^8$, Fig. 3, with the end of bar $N^2$ opposite that rod $m^{25}$ which acts upon the striker $M^3$ and with the striker-bar $N^3$ opposite that rod $m^{25}$ which controls the striker $M^{23}$. So long as these striker-bars are left in their normal positions only the strikers $M^3$ and $M^{23}$ will be operated at each revolution of the shaft. If the arms $M^2$ have not been moved to carry the strikers away from their normal positions, (shown in Fig. 36,) the central plungers only will be projected, and the type-carrier will accordingly be held in its normal central position. If the arms $M^2$ carrying the upper strikers have been moved to bring a finger of each of those strikers opposite the selected plunger, that plunger of the upper slide will be projected to enter its groove, while the central plunger of the lower slide will be projected to maintain the lower slide in its normal position while the upper slide is moved sidewise. When the plungers $O^5$ $O^6$ $O^7$ $O^8$ on the left have to come into action on either slide, one or other of the striker-bars $N^2$ $N^3$ will have to be thrown over into position behind the rod or rods $m^{15}$, which control the strikers $M^{13}$ and $M^{33}$. This is effected through a pin $d^{17}$ or $d^{18}$ on the composing-wheel acting upon a corresponding performing-lever $M^{17}$ or $M^{18}$. Each of these levers $M^{17}$ $M^{18}$ is in the present instance connected through a rod $n^{13}$ to a lever $n^{12}$, which in turn is connected by a rod $n^{11}$ to a bell-crank lever $n^{10}$. To the other arm of this lever is pivoted a push-rod $n^9$, whose free end passes through a guide in the striker-block N' and bears against the lower end of the striker-bar $N^2$ or $N^3$, as the case may be. The movement of this push-rod will throw the corresponding striker-bar into position behind the corresponding rod $m^{15}$.

Springs $m^{18}$ are provided between nuts $m^{19}$, Fig. 8, on the rods $m^{15}$ and $m^{25}$ and the flange $n^3$ of the striker-block in order to prevent the unoperated striker from moving forward into the way of the plungers. Back-stops $m^{17}$, Figs. 2 and 3, are provided over the gears $m^{20}$ to determine the correct central position of the striker. It is preferred to construct each plunger, as shown in Fig. 26$^a$, with a reduced outer end $o'$ (except in the case of the central plungers) and an antifriction-roller $o^2$ at its opposite end, where it engages with the cam-groove.

*Matrix-carriage.*—In the present machine, which is a matrix-machine, the carriage is a platen on which the matrix-sheet is mounted. This carriage is in the form of a cylinder U, Figs. 2, 3, 30, and 40, mounted upon a hollow shaft $U^3$, which in turn is mounted upon a fixed, but adjustable, journal $U^4$. This journal $U^4$ has at its opposite ends eccentric portions $u^7$ $u^8$, Fig. 40, the eccentricity being indicated by dotted lines in Figs. 30 and 4. This journal $U^4$ has a squared outer end $u^9$, to which a tool may be applied to turn the journal in its bearings in the frame $W^8$, and a set-screw $u^{10}$, Figs. 1 and 2, is provided to lock the journal in the frame in the position to which it may be adjusted. By this rotary adjustment of this eccentric-journal $U^4$ the edge of the platen adjacent to the type-carrier can be brought nearer to or farther from the latter to get varying depths of impression, as will be understood on reference to Fig. 30. To secure the matrix-sheet upon the carriage or platen, the latter is provided with a longitudinal channel $u^{18}$, into which the ends of the matrix-sheet, after being drawn taut around the cylinder, are frictionally fastened by driving in a key $u^{19}$, Fig. 30.

The carriage U can slide longitudinally upon the shaft $U^3$, but must turn with the latter, because of the key $u^3$ sliding in the keyway $u^4$. The longitudinal movement of this carriage on the shaft $U^3$ gives the feed for the characters and word-spaces, the line being printed or impressed longitudinally of the cylinder character by character and the extent of feed movement varying with the units required by each character when being impressed. The rotary movement of the carriage gives the "line-feed."

*Normal carriage-feed.*—Longitudinal movement is imparted to the carriage U from a screw-feed shaft $V^8$, mounted in bearings in the arched frame $W^8$. This shaft has a screw-threaded portion $v^{31}$, engaging with a correspondingly-threaded sleeve $U^2$, having a yoke $u'$ engaging with an annular groove in the end of the carriage. On the outer end of this feed-shaft $V^8$ is an elongated pinion $v^{27}$, engaging with a gear-wheel $V^7$, Figs. 1, 2, 3, and 4. On the same shaft $v^{13}$ with this gear-wheel $V^7$ is a feed-ratchet $V^5$, Fig. 38. With the teeth of this wheel engages a feed-pawl $v^{14}$ on an arm $v^{12}$ and held in gear by a spring $v^{15}$, Fig. 4. This pawl-carrying arm $v^{12}$ receives its feed movement from a cam G on the main shaft $E^3$. This cam acts on a roller $v^{17}$ on an arm $v^{18}$ on a shaft $v^{19}$, which carries the bell-crank lever $v^{10}$, one arm of which is connected by a rod $v^{11}$ with the arm $v^{12}$. This cam G is arranged to act upon these feed-pawl devices to different extents, dependent upon the character being impressed, and this is determined by the units feed-pins projected into the composing-wheel coming into contact with the performing-levers V, Figs. 15 and 38. Over the set of levers V lies a lever-arm V', having six rollers $v$, set at different distances from the shaft $v^2$, to which the arm V' is attached, and at different distances from the axis of the performing-levers V, so that the operation of these several performing-levers will give different extents of rocking motion to the shaft $v^2$. This rock-shaft $v^2$ controls the position of a variable stop $V^2$, Figs. 38 and 38$^a$, through an arm $v^3$, supporting the stem $v^4$ of said variable stop, which is vertically adjustable in the frame, but is normally pulled down to its lowest position (shown in Fig. 38) by a pull-spring $v^6$. At the upper end of this stop $V^2$ are a number of steps $v^5$, (marked 2 3 4 5 6 7,) indicating corresponding units of feed allowed to be given to the ratchet-wheel $V^5$ and thence to the matrix-carriage. This stepped upper end of the variable stop $V^2$ lies in a slot $v^7$ of a rod $V^3$, connected to the lower arm of the bell-crank lever $v^{10}$. Against the stepped side of this variable stop-rod bears an adjustable rod $v^8$, guided in a part $v^9$ of the frame. A pull-spring $v^{16}$ normally keeps this back-stop against that one of the steps $v^5$ which is opposite to it, and this is dependent upon the vertical position of the stop $V^2$. When the stop-rod $v^8$ is against the uppermost step of the stop $V^2$, as shown in Fig. 38, the roller $v^{19}$ on the arm $v^{18}$ will not be moved by the cam G, and therefore no feed motion will be imparted to the ratchet-wheel. When, however, one of the performing-levers V is elevated by a projected pin $d^3$ to $d^8$ of the moving composing-wheel, the arm V' of the rock-shaft $v^2$ will be moved to an extent dependent upon which pin has operated the lever and the stop $V^2$ will be elevated a corresponding distance. If the pin $d^3$ is the one which has come into action, the greatest throw will be given to the arm $v'$ and the stop $V^2$ will be raised until the step 7 is opposite the stop-rod $v^8$, so that then the roller is allowed to come into engagement with the cam-groove throughout its entire revolution, and the pawl $v^{14}$ will be moved the largest number of teeth (seven) of the ratchet-wheel $V^5$, and a correspondingly long feed motion will be imparted to the matrix-carriage.

*Line-feed.*—To give the necessary rotary motion to the matrix-cylinder U to feed at intervals from one line to the next, the hollow shaft $U^3$ carries two ratchet-wheels $U^6$ $U^7$, with different numbers of teeth to give different line-spacing, as may be desired, Figs. 37 and 40. Into one of these ratchet-wheels $U^6$ engages a feed-pawl $U^8$ and under it a check-pawl $U^{10}$. Into the other ratchet-wheel $U^7$ can engage a feed-pawl $U^9$ and a check-pawl $U^{11}$. Below the two pivoted check-pawls is a rotary lifting device $U^{12}$, which can be turned by an arm $u^{15}$, so that the projection $u^{16}$, Fig. 37$^a$, can lift the check-pawl $U^{11}$ and feed-pawl $U^9$ out of engagement with the ratchet-feed $U^7$, while the check-pawl $U^{10}$ and feed-pawl $U^8$ are brought into engagement with the ratchet $U^6$. By giving a half-turn to this lifting device $U^{12}$ the projection $u^{17}$ will raise the pawls $U^8$ and $U^{10}$ and allow the pawls $U^9$ and $U^{11}$ to come into action. The lifting device $U^{12}$ can be held in either position by a spring-stop $u^{20}$, Fig. 37$^a$.

The feed-pawls $U^8$ and $U^9$ are both carried by an arm $u^{14}$ on a shaft $u^{13}$, which at its opposite end has an arm $u^{12}$, to which an operating-rod $Z^3$ is connected, Figs. 4 and 46. This rod $Z^3$ is connected to an arm $z^4$, Fig. 46, on the release-shaft $Z'$, which extends longitudinally of the machine. On this release-shaft $Z'$ is an arm connected by a link $z$ with a performing-lever Z, Fig. 15. Each time that a projected line-pin $d'$ on the composing-wheel comes around to the final performing position it will act on this lever Z to rock the release-shaft $Z'$ and through the devices just described impart a line-feed movement to the matrix-carriage U at the same time the rock-shaft $Z'$ releases the several parts to be restored to their initial positions, as hereinafter described.

*Automatic justifying mechanism.*—One of the features of the present invention is the automatic justifying mechanism, in which there is combined with the matrix or other feed-carriage a mechanism for giving to the carriage that variable space-feed which is required by the varying units widths of the different characters or letters and the units-widths of the normal word-spaces, and with such feed mechanism is combined supplementary mechanism controlled by the units-register and, preferably, also by the word-space register to modify the normal feed in the word-spaces, increasing or diminishing that normal feed to the extent that may be necessary to automatically justify the line in such word-spaces.

The detailed mechanism preferred to be employed is fully illustrated in Figs. 3, 5, 7, 18$^b$, 18$^c$, 40, and 48; but the essential elements of this part of the invention and the operation of the same will be best understood by reference to the diagram Fig. 39. In this diagram U indicates the carriage, to which the justifying feed motion is to be imparted. The normal variable feed may be imparted to the carriage by any suitable mechanism, this normal feed varying with the different widths of the different letters or characters and with the widths normally allowed for word-spaces. In the diagram Fig. 39 there has been shown the same normal feed mechanism which has already been fully described, except that it has not been explained heretofore that the screw-shaft $V^8$ can be moved longitudinally in its bearings, being normally pressed to the left by a spiral spring $v^{29}$. The pinion $v^{27}$, which engages with the gear-wheel $V^7$, is elongated to permit of its longitudinal movement, without interfering with the rotary motion imparted to the shaft by the normal feed. Against the left-hand end, Fig. 39, of the feed-shaft $V^8$ bears the end of a lever X on a shaft $x$, which has an arm $x'$ connected to a radius-rod $x^2$. This latter at its opposite end is guided in a curved slot in the segmental lever $X^4$, which has its fulcrum at $x^{34}$. The position of the outer end of this radius-rod $x^2$ in the slotted lever $X^4$ is determined or controlled by the units-register. For this purpose a pendent leg $x^7$ on this radius-rod $x^2$ can come to rest upon a projection $i^{16}$ on the vertically-adjustable units-register rack $i^{15}$. The lever $X^4$ is moved upon its fulcrum by mechanism dependent in its action upon the number of word-spaces in which justification of the line is to take place.

In some classes of work—as, for instance, in newspapers—it may suffice to provide for justification in the same number of word-spaces for all lines. Thus it may be provided to justify all lines in four word-spaces, it being assumed that there will be at least four word-spaces in every line. In such case it will be sufficient to give to the lever $X^4$ four movements on its pivot by suitable means at the times when the four word-spaces in which justification is to take place are successively reached. In the diagram we have indicated a connecting-rod $x^{29}$ joined at one end to the lever $X^4$ at a proper distance from the fulcrum of the latter. The rod $x^{29}$ is shown connected at the other end to a bell-crank lever $X^2$, controlled from the word-space representations in the composing-wheel.

Some suitable means is provided for raising the outer end of the radius-rod $x^2$ in the curved slot of the segmental lever $X^4$. In the diagram a pendent rod $x^{10}$ is shown pivoted to the rod $x^2$ and having near its lower end a toe $x^{12}$, which can rest upon a projection on the lever $X^7$. This lever $X^7$ is pivoted at $x^{41}$ and is during part of the operation of the machine intermittently fed downward by suitable pawls $x^{51}$ $x^{53}$ against the action of a suitable counterweight or spring. In the present instance the counterweight is shown as a weight $X^8$ on a bell-crank lever $x^{56}$, pivoted at $x^{57}$ and connected by a link $x^{55}$ to an arm $x^{54}$ on the axis of the ratchet $x^{41}$. The operation is this: The radius-rod $x^2$ is raised to the highest position in the slotted lever $X^4$ by the counterweight $X^8$ when the pawls $x^{53}$ and $x^{51}$ are thrown out. By the time the radius-rod $x^2$ has reached its highest position, however, the nose $x^{12}$ of the rod $x^{10}$ will have been forced off the lifting projection on the arm $X^7$ by the heel $x^{43}$ on the said arm acting on the extended end of the rod $x'$. The radius-rod drops again at once until its pendent leg comes to rest upon the projection $i^{16}$ of the rack $i^{15}$, which thus locates or determines the position which the outer end of the radius-rod $x^2$ shall occupy in the slot of the lever $X^4$. According as that connection is near to or farther from the fulcrum of the lever $X^4$ will the end movement given to the part $V^8$ of the feed-shaft, and hence to the carriage U, be less or greater when the rod $x^{29}$ moves the lever $X^4$ on its fulcrum at each justifying word-space. If the word-space rod $x^{29}$ be moved in the direction of its arrow at the word-spaces, as by a feed-pawl $x^{16}$, acting upon the ratchet-teeth of the lever $X^2$, and the units-register gives to the radius-rod $x^2$ a point of connection to the lever $X^4$ below the pivot of the latter, the normal feed of the carriage will be increased at the word-spaces, as indicated by the dotted lines, while if the units-register gives to the radius-rod $x^2$ a position in the lever $X^4$ above its pivot the normal feed of the carriage will be diminished at the word-spaces. The increase or diminution being dependent upon the error shown by the units-register, the result will be automatic justification of the line by the action of the devices described. If the composed line happens to be of the standard length, the units-register will locate the rod $x^2$ in line with the fulcrum of the lever $X^4$, and the motion imparted to the word-space rod $x^{29}$ and the lever $X^4$ will consequently impart no end motion to the feed-shaft $V^8$ and carriage.

In the foregoing explanation of the elemental features of this part of the invention, in connection with Fig. 39, it has been assumed for the sake of simplicity that the justification is distributed through the same number of word-spaces in all the lines, four word-spaces being provided for in the lever $X^2$. In practice, however, it is preferable to construct the machine so that the justification has to be distributed over more or fewer word-spaces in different lines, according to the number of such spaces in those lines. For this purpose the lever $X^2$, as shown in Figs. 7, 40, and 48, is provided with a greater number of ratchet-teeth $x^{26}$ for engagement of the feed-pawl $x^{16}$, and the word-space rod $x^{29}$ is connected to a curved slot in the lever $X^3$ in the same way as the radius-rod $x^2$ is connected to the segmental lever $X^4$, and the position of the end of the rod $x^{29}$ in the lever $X^3$ is determined by the word-space register. The two levers $X^3$ and $X^4$ are secured to a common shaft or fulcrum $x^{34}$ through brackets $x^{35}$, and this shaft $x^{34}$ turns in a bearing $W^{15}$ in the frame. The manner of connecting each of these radius-rods $x^2$ and $x^{29}$ to its segmental lever is illustrated more clearly in Figs. 18$^b$ and 48. Each rod has a roller $x^3$ $x^{30}$ working in a slot in its segmental lever. The rod $x^2$ has pivoted to it a pawl $x^4$, with a tailpiece $x^5$ and a spring $x^6$, to cause its lower end to engage with ratchet-teeth $x^{38}$ on the segmental lever $X^4$ except when the upright arm $Z^7$, acting upon the tailpiece $x^5$, throws the said pawl out of engagement with its ratchet, Figs. 17, 18$^b$, 40, and 48. In like manner the word-space rod $x^{29}$ has pivoted to it a pawl $x^{31}$, with a tailpiece $x^{32}$ to be acted on by the upright lever $Z^8$ and a spring $x^{33}$ to throw the pawl into engagement with a ratchet $x^{37}$ on the segmental lever $X^3$ when the lever $Z^8$ does not hold the pawl out. The end of the radius-rod $x^2$ is connected to the arm $x'$, secured to the shaft $x$, which has the arm X to bear against the end of the feed-shaft $V^8$, Figs. 40 and 48. The end of the word-space rod $x^{29}$ is connected to the arm $x^{27}$ of the lever $X^2$, which can turn on the shaft $x^{28}$. The pawl $x^{16}$, which engages with the teeth $x^{26}$ of the lever $X^2$, Fig. 40, is pivoted to a lever $x^{15}$, turning on the same shaft $x^{28}$, and this pawl-carrying lever $x^{15}$ is connected by a rod $x^{14}$ to the performing-lever $X'$. Each time a word-space pin $d^2$ comes around to the final performing position it lifts the lever $X'$, and through the connections described causes the pawl $x^{16}$ to raise the lever $X^2$ one tooth, and a check-pawl $x^{18}$ holds the lever in its raised position. Each of the radius-rods $x^2$ $x^{29}$ has a pendent lifting-rod $x^{10}$, with its toe $x^{12}$ to be acted on by the lifting-lever $X^7$ on the shaft $x^{44}$ and counterweight devices, such as already described with reference to Fig. 39. The lifting of the counterweight $X^8$ for a new operation is effected by the action of a pawl $x^{51}$, carried by an arm $x^{50}$, Fig. 7, free to turn upon the shaft $x^{44}$. This pawl-carrying arm $x^{50}$ may be actuated from the main shaft in any suitable way, as by means of a cam $X^6$, Fig. 24, on the end of the cylinder P acting against a roller on an arm $x^{46}$ of a bell-crank lever pivoted at $x^{47}$ to the part $W^9$ of the frame and having its other arm $x^{48}$, Fig. 2, connected by a rod $x^{49}$ to the arm and pawl $x^{50}$ and $x^{51}$, Figs. 7 and 40. A check-pawl $x^{53}$, pivoted to a bracket on the frame, will hold the segmental ratchet $x^{41}$ and connected parts in the positions to which fed by the pawl $x^{51}$ until, through the arm $Z^{10}$ and rod $z^{10}$ on the rocking of the release-shaft $Z'$, the check-pawl $x^{53}$ is lifted and the overlying feed-pawl is lifted with it. On such release of the pawls from the ratchet $x^{41}$ the counterweight $X^8$ will cause the arms $X^7$, acting upon the toes $x^{12}$ of the lifting-rods $x^{10}$, to raise the two radius-rods $x^2$ and $x^{29}$ in the slots of the curved levers $X^3$ and $X^4$. By the time the ends of these radius-rods reach the tops of the slots the toes $x^{12}$ will have been pushed off the lifting projections of levers $X^7$ by the heels $x^{43}$, Fig. 40, and the radius-rods $x^2$ and $x^{29}$ will at once fall again until the leg $x^7$ of the rod $x^2$ comes to rest upon the projection $i^{16}$ of the units-register rack $i^{15}$ and the projection $x^{11}$ of the word-space rod $x^{29}$ comes to rest upon the projection $j^{16}$ of the word-space rack $J^5$, as shown in Fig. 40. During this downward movement of the radius-rods the pawls $x^4$ and $x^{31}$ will have been held out of their respective ratchets $x^{38}$ and $x^{37}$ by the upright arms $Z^7$ and $Z^8$, Figs. 40 and 48. Immediately thereafter the arms $Z^7$ and $Z^8$ are moved to allow the pawls $x^4$ and $x^{31}$ to engage with the teeth of their respective ratchets corresponding with the positions in which the radius-rods are then held by the units-register rack and the word-space-register rack. These ratchets $x^{38}$ and $x^{37}$ thus maintain the registration of both the units error and the number of word-spaces in the line until justification is completed.

By way of illustration there will be now described the justification of a line having an error of sixteen units short of the standard line and seven word-spaces in which to justify. Fig. 40 may be taken as representing the positions which the radius-rods $x^2$ and $x^{29}$ would then occupy in the slotted levers $X^4$ and $X^3$ as determined by the units-register rack $i^{15}$ and the word-space-register rack $J^5$, the said radius-rods being then locked in those positions by their respective pawls $x^4$ and $x^{31}$. Each time the word-space pin $d^2$ in the composing-wheel revolving in the direction of the dotted arrow, Fig. 40, reaches the final performing-lever $X'$ the bell-crank lever $X^2$ will be raised one tooth of its ratchet and held by its check-pawl $x^{18}$. This movement of the arm $X^2$ is conveyed to the word-space rod $x^{29}$, which pushes the lever $X^3$, and consequently the lever $X^4$, one-seventh of its full sweep in the direction of the arrow, Fig. 40, thus accomplishing one-seventh of the justification of the represented line. The units radius-rod $x^2$ being located in its lever $x^4$ at a distance from the fulcrum $x^{34}$ equal to sixteen units is moved to the left one-seventh of the sixteen units with the lever $X^4$. This movement of the radius-rod $x^2$ causes a corresponding forward movement of the feed-shaft $V^8$ and carriage U, Fig. 39, adding to the normal two-units word-space an additional space equal to one-seventh of sixteen units. At each word-space a like addition is given to the normal word-space feed, so that when the end of the line is reached automatic justification will be complete. When the line composed is found to be some units longer than the standard, the units-register rack $i^{15}$ will have been fed to such a high position that then the radius-rod $x^2$ will come to rest thereon with its end in the slot of the lever $X^4$ at a point above the fulcrum of the lever. Consequently each movement of the pair of levers $X^3$ $X^4$ at the word-space will move the arm X backward, and owing to the spring $v^{29}$ the normal word-space feed will be proportionally diminished the requisite amount to bring the line at its close to the standard length. When the word-space devices move the pair of slotted levers $X^3$ and $X^4$ upon their common fulcrum $x^{34}$, a pin $x^{70}$ on the lever $X^4$, Fig. 18$^b$, will push the supporting-leg $x^7$ (against the action of a spring $x^{71}$) off the supporting projection $i^{16}$ of the units-rack $i^{15}$, which is thus freed to receive the registration of the succeeding line. In said Fig. 18$^b$ the rack $i^{15}$ is shown as fed upward for registration of a subsequent line a fewer number of units short of the standard than was the preceding line, whose registration is still kept by the pawl $x^4$ of the radius-rod $x^2$. Fig. 18$^c$ shows how thereafter the radius-rod $x^2$ has been elevated by the devices heretofore described and then dropped until its leg $x^7$ is supported on the adjusted register-rack $i^{15}$. The spring $x^{71}$ by keeping the pivoted leg $x^7$ against the pin $x^{70}$ brings the said leg into proper position to come down onto the projection $i^{16}$ of the rack, because meantime the lever $X^4$ has resumed its initial position.

If for any reason the radius-rod $x^{29}$ when intended to drop in lever $X^3$—say ten spaces—should catch and stop at a less number—say four word-spaces—the justifying devices would nevertheless attempt to continue to feed for the ten spaces and then some part would break, because the lever $X^3$ would have been given its full sweep by the time the fourth word-space had been reached. To prevent such accident, the safety-catch $X^9$, Fig. 40, is provided. It is pivoted at $x^{58}$ and is connected to the lever $X^3$ by a rod $x^{59}$, so as to throw the catch $X^9$ under the projection $x^{60}$ of the pawl $x^{15}$ when raised and lock it in its raised position and so prevent its descent for another tooth whenever and as soon as the lever $X^5$ has reached its full sweep.

*Release movements.*—It has been already described how at the close of a line the rocking of the release-shaft $Z'$ by the line-pin $d'$, Fig. 46, coming into contact with the performing-lever Z causes the line-feed to be imparted to the carriage through the rod $Z^3$ and connections to the pawls $U^8$ and $U^9$. The same movement of the release-shaft $Z'$ releases a number of other parts and devices to restore them to their initial positions, and at the same time causes the machine to stop by the throwing of the clutch, the machine being, however, restarted automatically as soon as the parts released have reached their initial positions. At the right-hand end of the shaft $Z'$ is secured an arm $Z^6$, which controls the automatic stop-motion mechanism. This arm acts upon a finger $z^6$, secured to a cross-shaft $y^{25}$, Fig. 46. This cross-shaft $y^{25}$ carries a finger $y^{26}$, supporting the latch $C'$, Figs. 12 and 46, of the latch-bar $E^{16}$, so that the rocking of the shaft $Z'$ raises the latch-bar $E^{16}$ through the connections described, so as to bring the pin $e^{31}$ of the vibrating lever $E^{17}$ into the slot $e^{28}$, with the result of pulling out the plunger $E^{10}$ to stop the machine. Another arm $Z^{10}$, Fig. 10, adjacent to the arm $Z^6$, is connected by a rod $z^{10}$, Figs. 6, 7, and 40, to the rear arm of the check-pawl $x^{53}$, so that on the rocking of the release-shaft this pawl and the feed-pawl $x^{51}$ are both thrown out of engagement with the ratchet $x^{41}$, and the arms $X^7$ will raise the radius-levers $x^2$ and $x^{29}$ and allow them to drop again onto the newly-set register-racks $i^{15}$ and $J^5$. Another arm $z^5$, Figs. 5, 6, 7, and 48, on the release-shaft $Z'$ is connected by a rod $Z^4$ to an arm on the check-pawl $x^{18}$ of the word-space devices, and when the release-shaft $Z'$ is rocked this check-pawl is disengaged from the ratchet-teeth of the lever $X^2$, and at the same time it lifts up the feed-pawl $x^{16}$, so that this lever $X^2$ can then drop down again to its starting-point and draw back the pair of slotted levers $X^3$ and $X^4$ to their initial position prior to the beginning of a new justifying action. At the left-hand end of the release-shaft $Z'$ is an arm $z^2$, connected by a link $Z^2$ to the rear arm of the check-pawl $z^3$ of the carriage-feed ratchet-wheel $V^5$, Fig. 46. When the release-shaft $Z'$ is rocked, as described, this check-pawl $z^3$ will be lifted out of engagement with the wheel $V^5$ and the feed-pawl $v^{14}$ will be lifted out at the same time, so that then under the action of a suitable spring or counterweight, such as the weight $V^6$ on the cord $v^{25}$, passing around a pulley $v^{26}$, Figs. 3, 4, and 6, the said wheel $V^5$ can return to its starting-point, which is reached when the stop $v^{33}$ on the wheel comes against a fixed stop $v^{32}$ on the frame, Figs. 1, 2, and 4. The return movement of this wheel $V^5$ is availed of to restart the machine through the following connections to the clutch mechanism. As shown in Fig. 46, a projection $z^{26}$ on the wheel $V^5$ when the latter reaches its initial position comes into contact with one arm of the bell-crank lever $z^{27}$, connected by a link $z^{28}$ to a bell-crank lever $z^{29}$, which in turn is connected by a rod $z^{30}$ to an arm $z^{31}$ on a shaft $z^{32}$, which also carries an arm $z^{34}$. The upper end of this arm $z^{34}$ is connected to a bent push-rod $Z^{12}$, whose outer end is opposite a pin or projection $y^{10}$ on the latch $C'$ of the bar $E^{16}$. Through the connections described or other suitable connections the return of the wheel $V^5$ pushes the latch $C'$ off the end of the supporting-arm $y^{26}$, so that immediately the bar $E^{16}$ will drop, and thereupon the vibrating lever $E^{17}$ will draw out the plunger $E^{10}$ and clutch the driving-wheel to the shaft. The release rock-shaft $Z'$ has still another arm $Z^5$, Fig. 48, through which the locking-pawls $x^4$ and $x^{31}$ of the radius-rods $x^2$ and $x^{29}$ are released from the slotted levers $X^3$ and $X^4$ for a resetting of the radius-rods for the justification of the next line. For this purpose the arms $Z^7$ and $Z^8$, which are to act on the tails of the pawls $x^4$ and $x^{31}$, are secured to a rock-shaft $Z^{12}$, having an arm $Z^{11}$, to which is pivoted the lever $Z^7$, whose upper hooked end $Z^8$ engages with the arm $Z^5$, Fig. 48.

The release-shaft $Z'$ is operated by every "set" line-pin $d'$ as it comes to the final performing position, whether that line-pin has been set automatically for a full-length line requiring justification or has been set by hand for a short line which is not to be justified. In order to prevent such a "short-line" pin from operating the justifying mechanism and attempting to justify such short line, the following devices are employed: To the lower arm of the check-pawl $x^{18}$ of the word-space lever $X^2$ is connected a catch-rod $x^{22}$, Figs. 7, 40, 46, and 48, which when the pawls $x^{16}$ and $x^{18}$ are thrown out, Fig. 48, by the rocking of the release-shaft will hook its nose $x^{23}$ over a fixed keeper $x^{25}$ and prevent said pawls from operating on the ratchet-teeth of the word-space lever $X^2$ unless the supporting-link $Z^9$, carried by the arm $z^{39}$ on the rock-shaft $z^{12}$, has lifted the catch-rod $x^{22}$ clear of the keeper $x^{25}$. Provision is made for normally keeping the hooked upper end of the lever $z^7$ out of engagement with the arm $Z^5$ of the release-rod, as shown in Figs. 16, 17, and 40, and throwing the said lever into engagement with said arm only during the latter part of each line of final impression. For this purpose the shaft $y^5$, which is rocked within the closing limits of each line in composition, Fig. 41, is provided with an arm $Y^{10}$. This arm has a pin $y^{33}$, Fig. 16, working in a slot $y^{35}$ in a horizontal latch $y^{34}$, whose opposite end is hooked at $y^{36}$ to engage with a fixed keeper $y^{37}$ when pushed forward. A pull-spring $z^{25}$ connects this latch $y^{34}$ with the lever $z^7$ and tends to keep the projection $y^{38}$, Figs. 17 and 48, against the said lever $z^7$. The latch also rests upon a projection $y^{39}$ on the lever $z^7$.

When the closing limits of a line in composition is reached, and therefore when the preceding line, which is receiving its final representation, is about half completed, the rocking of the shaft $y^5$ and consequent movement of its arm $Y^{10}$ pushes the latch $y^{34}$ forward until its end $y^{36}$ hooks over the fixed keeper $y^{37}$. Through the spring $z^{25}$ the hooked upper end $z^8$ of the lever $z^7$ is pulled over into the path of the arm $Z^5$ and remains there ready for the movement of the latter, Fig. 48, unless the short-line devices, now to be described, prevent it. On a shaft $z^{18}$ is fixed a long curved lever $Z^{11}$, Figs. 6, 7, and 48, which through the action of its counterweight $z^{20}$ on the arm $z^{19}$ lies just within the line of the outermost concentric row of pins $d'$ on the composing-wheel. If a projected one of these line-pins $d'$ should at this stage reach the lever $Z^{11}$, it would act on the latter to rock the shaft $z^{18}$ and through the arm $z^{21}$ act on the lever $z^{22}$, which is pivoted at $z^{23}$ and acts on the lower arm of the lever $z^7$. Such a line-pin $d'$ reaching the lever $Z^{11}$ at this stage would be a pin set by hand for a short line, and through the connections described the upper hooked end of the lever $z^7$ would be held out of the way of the arm $Z^5$, and therefore the rocking of the release-shaft $Z'$ will have no effect upon the rock-shaft $z^{12}$, and the arm $z^{39}$ will not through the link $Z^9$ lift the latch $x^{22}$, but the hooked end of the latter will catch over the keeper $x^{25}$, and consequently the pawls $x^{18}$ and $x^{16}$ will be kept out of engagement with the teeth of the word-space lever $X^2$ and no movement of the justifying devices can take place for this short line.

When the lever $z^7$ engages with the arm $Z^5$ of the release-shaft $Z'$, the same lifting motion which rocks the shaft $z^{12}$ to throw out the pawls $x^4$ and $x^{31}$ and disengage the latch-rod $x^{22}$ from its keeper also lifts the latch $y^{34}$ by the projection $y^{39}$ on the lever $z^7$ acting on the under side of the latch $y^{34}$ to disengage it from the keeper $y^{37}$, the tension of the spring $z^{25}$ then drawing the latch back sufficiently to keep it out.

*General operation.*—The operator should begin by "setting" a line-pin $d'$ in the composing-wheel, in order to insure the return of the moving parts to their initial positions from the positions in which they may have been left by a previous use of the machine. The driving-wheel having been started, the operator now fingers the keys as he would the keys of a type-writing machine, but he can do this continuously, as the machine automatically closes the lines, justifies them, and arranges the matter in a justified column. This fingering of the keys causes the corresponding striker-bars $A^5$ to be lifted into the path of the power-operated and constantly-moving striker $A^6$ as the keys are released by the operator. As the striker can engage the bars to move them forward only at a certain point in its stroke, the selecting-pins and universal bars are operated at the proper time to project or set the desired preliminary-representation pins in the composing-wheel. By the action of the selected representation-pins upon their preliminary performing levers the units-registering devices register or ascertain the number of units in the matter being composed, and at the same time the word-space register ascertains the number of word-spaces in the line. If for the sake of illustration the standard line be assumed to be one of one hundred and thirty units, the matter being composed will have its line-closing limits ranging from, say, one hundred and five to one hundred and forty units. When the units-register reaches such line-closing limits, the word-space key will be connected up (indirectly through its projected word-space pin $d^2$ on the composing-wheel) with the line-closing mechanism by the downward movement of the slide $Y'$ to bring its projection $y$ opposite the lever $J$, Figs. 41 and 43, and thereupon the next word-space pin will close the line automatically and release the units and word-space registers or the parts I and $J'$ thereof to return for registration of the next line. At the time of this release of these registers the automatic stop-motion will be actuated to momentarily stop the composing-wheel and other parts of the machine until the released parts of the registers have reached their initial positions, and then the machine is automatically restarted. As illustrated in Fig. 50, the representation of a complete line in the particular arrangement shown in the drawings will occupy about one-half the composing-wheel, and about one-half of the second line will have been composed or have its preliminary representation set before the final representation of the first line begins. This final representation begins when the first set pins come around to the final performing levers, where the selection of the character on the type-carrier and the movement of the latter are determined by the selected levers M, $M^{17}$, and $M^{18}$. At the same time the selected levers V impart such units-feed to the matrix or other carriage as will correspond with the widths of the characters being impressed. In the meanwhile the units-register rack $i^{15}$ has been set in a position determined by the ascertained number of units which the composed line is longer or shorter than the predetermined standard. The word-space rack $J^5$ has also been set in a position determined by the automatically-ascertained number of word-spaces in the line composed. Accordingly the radius-rods $x^2$ and $x^{29}$ are set by these racks in corresponding positions in their respective segmental levers $X^4$ and $X^3$, with the result of modifying the normal word-space feed of the carriage to increase or diminish such word-space feed, so that by the time the end of the line is reached it will have been automatically justified, as heretofore described in detail. When the end of the line is reached at the final performing lever, the set line-closing pin $d'$ will so operate the release-rod $Z'$ as to cause the necessary line-feed to be given to the carriage and to cause the several moved parts controlled thereby to be restored to their initial positions and the machine to be automatically stopped until such parts do reach their initial positions and to be then automatically restarted on the succeeding line.

Having now particularly described and ascertained the nature of this said invention and in what manner the same is to be performed, what is claimed is—

1. In a typographic machine the combination of a keyboard with a preliminary-representation device having movable pins and constantly-moving power-operated means for setting said pins as selected by the keys.

2. In a typographic machine, the combination of a keyboard with a preliminary-representation device having movable pins, striker-bars to set said pins and a constantly-moving power-operated means to engage said striker-bars when selected by the keys.

3. In a typographic machine, the combination of a keyboard with a preliminary-representation device having movable pins, striker-bars to be selected by the keys, power-operated means to act on the said striker-bars and selecting-pins and universal bars between the striker-bars and the representation-pins, substantially as described.

4. In a typographic machine, the combination of a preliminary-representation device having movable pins with striker-bars controlled by the keys and selecting-pins and universal bars between the striker-bars and representation-pins, substantially as described.

5. In a typographic machine, the combination of a keyboard with a series of striker-bars and a power-operated device to act on said striker-bars as selected by the keys and means whereby said power-operated device can engage the striker-bars only after the release of the keys by the operator.

6. In a typographic machine, the combination of a preliminary-representation device and a keyboard with a series of striker-bars controlling the preliminary representation and a power-operated device to act on said striker-bars as selected by the keys and means whereby said power-operated device can engage the striker-bars only at a certain point in its movement.

7. In a typographic machine, the combination of a keyboard with a series of striker-bars and a power-operated striker to act on said bars as selected by the keys and means whereby said striker can engage the bars to move them only at a certain point in the movement of the striker, and after the release of the keys by the operator.

8. In a typographic machine, the combination of the keyboard and a series of striker-bars having projections, with a power-operated striker to act on said projections of the bars as selected by the keys, but only after the release of the keys by the operator.

9. In a typographic machine, the combination of a keyboard with a series of striker-bars and a power-operated striker to act on said bars as selected by the keys, after the release of the keys by the operator.

10. In a typographic machine, the combination of a preliminary-representation device and a keyboard with a series of striker-bars controlling said preliminary-representation device, and a power-operated striker to act on said striker-bars as selected by the keys after the release of the keys by the operator.

11. In a typographic machine, the combination of a keyboard and a series of striker-bars having projections and raised portions such as $a^{12}$, with a power-operated striker to act on said projections and raised portions of the bars as selected by the keys.

12. In a typographic machine, the combination of a keyboard and spring-actuated key-rods, with a series of striker-bars, each key-rod having means to engage its striker-bar on the downward stroke of the key-rod and to lift the bar on its upward stroke, and a power-operated striker to act upon the lifted striker-bar.

13. In a typographic machine, the combination of a keyboard and striker-bars controlled thereby, with a power-operated device to act on the striker-bars, with two sets of selecting-pins, universal bars between the two and levers acted on by the second set of selecting-pins.

14. In a typographic machine, the combination of a preliminary-representation device having movable pins, a keyboard and striker-bars controlled by the keys, with a power-operated striker to act on said bars, two sets of selecting-pins, universal bars between the two sets of selecting-pins, and levers acted on by the second set of selecting-pins to project the pins in the preliminary-representation device.

15. In a typographic machine, the combination of a composing-wheel having movable pins, with a setting-frame having an escapement connection with the composing-wheel and having a row of pins to act on the pins of the composing-wheel, with a keyboard and a series of bow-levers controlled from the keyboard to act on the pins of the setting-frame.

16. In a typographic machine, the combination of a composing-wheel and a setting-frame having an escapement connection therewith and a keyboard, with a stop device for the keyboard to be brought into action when the setting-frame passes beyond a prescribed limit of movement.

17. A typographic machine, provided with line-closing means and an automatic stop-motion operated by the said line-closing means.

18. A typographic machine provided with an automatic stop-motion and a units-registering device and means whereby the release of the units-registering device at the close of a line throws the stop-motion into action.

19. A typographic machine provided with stopping and restarting mechanism and a units-registering device and means whereby the release of the units-registering device, at the close of a line, actuates the stop-motion, and on the return of the units-registering device, to its initial position actuates the restarting mechanism.

20. A typographic machine provided with automatic line-closing mechanism and a stop-motion controlled by said automatic line-closing mechanism.

21. A typographic machine provided with a feed-carriage and a stop-motion, means for imparting line-feed to the carriage and devices whereby the stop-motion is actuated at the line-feed.

22. A typographic machine provided with a feed-carriage, stopping and restarting mechanism, means for imparting line-feed to the carriage and devices whereby the stop-motion is actuated at the beginning of the line-feed and the restarting mechanism is actuated at the close of the line-feed.

23. A typographic machine provided with a main shaft, an automatic stop-motion therefor and a release-shaft adapted to return the parts to their initial positions and to actuate the said stop-motion.

24. A typographic machine having a representation device, a feed-motion therefor, a units-register and means whereby the release of the units-register to return to its initial position at the close of a line stops the feed of the representation device.

25. A typographic machine provided with a composing-wheel and feed-motion therefor, a units-register and means whereby the release of the units-register to return to its initial position at the close of a line automatically stops the said wheel-feed, and on the return of the units-register, restarts the said wheel-feed, substantially as described.

26. In a typographic machine the combination of the main shaft carrying actuating-cams, with a driving-wheel and intermediate clutch mechanism and line-closing devices controlling said clutch mechanism.

27. In a typographic machine the combination of a main shaft carrying actuating-cams with a driving-wheel, intermediate clutch mechanism and a units-register controlling said clutch mechanism.

28. In a typographic machine, the combination of the main shaft carrying actuating-cams, with a driving-wheel, intermediate clutch mechanism on said shaft, a release-shaft adapted to return the moving parts of the machine to their initial positions and controlling said clutch, as and for the purpose set forth.

29. A typographic machine having a main shaft and a clutch mechanism on said shaft provided with means whereby it is thrown into and out of action at a fixed point in the revolution, as and for the purpose set forth.

30. In a typographic machine having a representation device the combination of a units-register and a word-space register with an automatic stop-motion controlled by the units-register to stop the feed of the representation device during the return of the units and word-space registers to their initial positions.

31. A typographic machine provided with a representation device having movable pins and a correcting-key to return wrongly-set pins.

32. A typographic machine provided with a representation device and a units-register operated from said representation device.

33. A typographic machine provided with a composing-wheel having representation-pins with a units-register operated by units-pins on said wheel.

34. In a typographic machine, the combination of a composing-wheel having representation-pins, units performing levers to be actuated by said pins, means for moving said levers into and out of the path of the pins and a units-register controlled by said levers.

35. A typographic machine provided with a units-register, feeding devices therefor and means to positively lock the register at the end of each feed movement to prevent overthrow.

36. A typographic machine provided with a registering ratchet-wheel, a feed-pawl therefor and means for locking the pawl into the teeth of the ratchet at the close of each feed movement to prevent overthrow of the register.

37. A typographic machine provided with a registering ratchet-wheel, a feed-pawl therefor, a projection on the pawl and a fixed stop to force the nose of the pawl into the ratchet-teeth at the end of the feeding stroke.

38. A typographic machine provided with a registering ratchet-wheel and a feed-pawl therefor, with a projection on the wheel and a projection on the pawl to engage with each other to cause the register to start from a normal position.

39. In a typographic machine the combination of a composing-wheel having movable pins with a units-registering device, a feed-pawl for the latter, a series of units performing levers controlled by said pins, an arm adapted to be moved to different extents by the different performing levers and controlling the said pawl and a cam to give feed movement to the pawl.

40. A typographic machine provided with justifying mechanism a representation device and a units-register in two parts, one of which can return to its initial position for registry of a new line, while the other holds the registry of the first line and means for maintaining the units registration in the justifying mechanism.

41. In a typographic machine, the combination of an automatic justifying mechanism, with a units-registering device in two parts to control the said justifying mechanism and adapted to receive and maintain the units registration of more than one line at a time and means for maintaining the units registration in the justifying mechanism.

42. In a typographic machine, the combination of a representation device and automatic justifying devices with a units-register in two parts controlling said justifying devices and additional means for maintaining the unit registration in the justifying devices.

43. A typographic machine provided with a units-register in two parts with means for holding the second part to maintain the registration and devices on the first part to release the second part near the closing limits of the line.

44. In a typographic machine, the combination of a units-register and means for releasing the same at the closing of a line to return to its initial position, with a catch to temporarily hold said line-closing means and a device on the units-register to release said catch.

45. A typographic machine provided with a representation device and a word-space register operated from said representation device.

46. A typographic machine having a composing-wheel with movable pins and a word-space register controlled from said pins.

47. In a typographic machine, the combination of a word-space register with a composing-wheel having word-space representation-pins with a performing lever to be operated thereby and adapted to act on said word-space register.

48. A typographic machine provided with justifying mechanism and a word-space register in two parts, one to hold the registration while the other returns to its initial position for the registry of the word-spaces in the next line and means for maintaining the registration in the justifying mechanism.

49. A typographic machine having a word-space register comprising a ratchet-wheel and a word-space rack, the latter being in two parts, the first of the two parts being fed by the ratchet-wheel.

50. In a typographic machine, the combination of justifying mechanism, with a word-space register in two parts, one of which holds the registry to control the justifying mechanism, while the other returns to its initial position to register the word-spaces in a new line and means for maintaining the registration in the justifying mechanism.

51. In a typographic machine, the combination of automatic justifying mechanism with a word-space register in two parts and means to maintain the word-space registration in the justifying devices after the said register has been released for the registry of a new line.

52. In a typographic machine, the combination of a preliminary representation device and automatic justifying mechanism with a word-space register in two parts and means to maintain the word-space registration in a justifying device after the said register has been released for the registry of a new line.

53. In a typographic machine, the combination of justifying mechanism with a word-space register in parts adapted to receive and simultaneously hold the word-space record of more than one line, means for releasing the primary registry for the registration of a succeeding line, means for maintaining the registration in the justifying mechanism and means for subsequently releasing the secondary registers, substantially as described.

54. In a typographic machine, the combination of a type-carrier, slides having plungers and controlling the type-carrier and operating-cams for the slides, with selecting-strikers each having two prongs spaced so that when one prong is opposite a plunger the other will be between the plungers, as and for the purpose set forth.

55. In a typographic machine, the combination of a type-carrier and alining devices therefor, with slides controlling the type-carrier, and having plungers, a cam-grooved cylinder to operate the slides, each groove having a locating and an alining section preceding the impression-section.

56. In a typographic machine, the combination of a type-carrier, of alining devices with slides controlling the type-carrier and having plungers, a cam-grooved cylinder to operate the slides, each groove having a locating and an alining section followed by an impression-section and a section for freeing the alinement.

57. In a typographic machine, the combination of a type-carrier and alining devices with slides controlling the movements of the type-carrier, and spring connections between the type-carrier and slides adapted to yield in both directions.

58. In a typographic machine, the combination of a type-shell having an alining-flange provided with stops facing in opposite directions and an alining-plate having a flange with like stops to operate with the flange on the type-carrier, slides to move the type-carrier in different directions and yielding connections between the type-carrier and slides, as and for the purpose described.

59. In a typographic machine, the combination of a vibrating casing and a type-carrier therein with rods to operate the type-carrier in different directions and passing through the trunnions of the vibrating casing.

60. In a typographic machine, the combination of the feed-carriage and means for imparting to it normal feed with justifying mechanism controlling the carriage in one direction, and a spring controlling it in the other.

61. In a typographic machine, the combination of a feed-carriage, a feed-screw shaft therefor and feed mechanism for rotating the said shaft, with a spring controlling the end movement of the shaft in one direction, and justifying devices controlling it in the other direction.

62. In a typographic machine, the combination of a feed-carriage and a pawl-and-ratchet feeding device, with a cam controlling the latter, a stepped stop device controlling the action of the cam, with a preliminary representation device controlling said stop device.

63. In a typographic machine, the combination of a feed-carriage and feed mechanism therefor, with a segmental lever and word-space devices controlling the movement of said segmental lever, a radius-rod having an adjustable connection with the said segmental lever and controlling said feed mechanism.

64. In a typographic machine, the combination of a feed-carriage and feed mechanism therefor, with a units-register, a segmental lever, word-space devices controlling the movement of said segmental lever, a radius-rod having an adjustable connection with the said segmental lever and controlling the feed mechanism, and devices whereby the units-register determines the point of connection of the radius-rod and the segmental lever.

65. In a typographic machine, the combination of preliminary-representation mechanism, a feed-carriage and feed mechanism therefor, with a segmental lever, a radius-rod having an adjustable connection with said segmental lever and controlling the feed mechanism and devices whereby the units representation controls the point of connection of the radius-rod with the segmental lever.

66. In a typographic machine, the combination of a feed-carriage and feed mechanism therefor, with a segmental lever, a radius-arm having an adjustable connection with the said segmental lever and controlling said feed mechanism, word-space devices controlling the movement of the segmental lever and devices for automatically determining the point of connection of the radius-rod with the segmental lever according to the units error of the line being composed.

67. In a typographic machine, the combination of a feed-carriage and feed mechanism therefor, with a pair of segmental levers, radius-rods having adjustable connections with said segmental levers, one radius-rod controlling the feed mechanism and with word-space devices controlling the movement of the other radius-rod, and means for automatically determining the points of connection of the radius-rods with their respective segmental levers according to the units error and word-spaces in the line.

68. In a typographic machine, the combination of a feed-carriage and feed mechanism therefor, with units and word-space registers, a pair of segmental levers, a pair of radius-rods having adjustable connection with said segmental levers, one radius-rod controlling the feed mechanism, word-space devices controlling the movement of the other radius-rod and means whereby the units and word-space registers determine the points of connection of the radius-rods with their respective segmental levers.

69. In a typographic machine the combination of a preliminary representation, a feed-carriage and feed mechanism therefor, with a units-register and a segmental lever, a radius-rod having an adjustable connection with said segmental lever and controlling the feed mechanism, devices whereby the units-register determines the point of connection of the radius-rod with the segmental lever and word-space devices to impart movement to the latter.

70. In a typographic machine, the combination of a composing-wheel having movable pins to represent word-spaces, a feed-carriage and feed mechanism therefor, with a segmental lever, a radius-rod having an adjustable connection with the said segmental lever determined by the units of the line and controlling the feed mechanism, pawl-and-ratchet feed devices controlling the movement of the said segmental lever and controlled by the word-space pins.

71. In a typographic machine, the combination of a feed-carriage and justifying-lever controlling the feed of said carriage, word-space devices controlling the movement of said levers to act upon the carriage and a safety-device to stop the movement of said levers at their justifying limit.

72. In a typographic machine, the combination of a main frame having a hinged door, with a composing-wheel and keyboard mechanism mounted upon said hinged door.

73. A typographic machine having a preliminary-representation means, in combination with automatic line-closing devices and registering means, both operated from said preliminary-representation means.

74. A typographic machine provided with a units-register and a preliminary-representation means representing the word-spaces, in combination with means for returning the register to its initial position by the action of said word-space representation within the closing limits of a line.

75. A typographic machine provided with registers for the units and for the word-spaces and a preliminary-representation means, in combination with devices for returning the registers to their initial positions by the action of a word-space representation within the closing limits of a line.

76. A typographic machine having automatic justifying devices and a preliminary-representation means in combination with automatic line-closing devices and registering means, both operated from said representation means.

77. A typographic machine having a representation device and units and word-space registers, with automatic line-closing devices controlled by said representation device and registers.

78. A typographic machine having a representation device and units and word-space registers, line-closing devices and means controlled by said registers whereby said line-closing devices are automatically brought under the control of a represented word-space near the closing limits of a line.

79. A typographic machine, having a representation device to represent the word-spaces and also the end of the line, in combination with means whereby the word-space representation within the closing limits of a line sets the line representation.

80. A typographic machine having a composing device with word-space pins and line-pins in combination with means whereby a word-space pin automatically sets a line-pin within the closing limits of a line.

81. In a typographic machine, the combination of a preliminary representation device, and a units-register with a lever having a movable part controlled from the units-register within the closing limits of a line to bring the said movable part into the path of the word-space representation to release the register for return.

82. In a typographic machine, the combination of a preliminary representation device and a units-register, a lever having a movable part controlled from the units-register within the closing limits of a line to bring said movable part into the path of the word-space representation to release the register for return and means for maintaining the movable part in its set position until the register reaches its restarting position.

83. A typographic machine provided with a units-register and means for preventing its rebound at the end of its return movement.

84. In a typographic machine, the combination of a pair of segmental levers and radius-rods having adjustable connections therewith, one of said radius-rods controlling the justifying-feed with word-space devices controlling the other radius-rod, and means for automatically raising the radius-rods in the segmental levers at the end of the line.

85. In a typographic machine, the combination of units and word-space registers and a pair of segmental levers and radius-rods adjustably connected to the said levers, and one of said radius-rods controlling the justifying-feed, with word-space devices controlling the other radius-rod, means for automatically raising the radius-rods in the segmental levers at the end of the line and for permitting them to come to rest upon the units and word-space register devices which have been meantime set for a new line.

86. A typographic machine provided with automatic justifying mechanism and means for preventing the operation of said justifying mechanism on short lines.

87. A typographic machine having a cylindrical type-carrier provided with type on part of its circumference in combination with a support to bear against the other and opposite part of its circumference, substantially as described.

In testimony whereof we have signed our names to this specification in the presence of two subscribing witnesses.

ISAAC RISLEY.
     VINCENT F. LAKE.

Witnesses:
 HUBERT HOWSON,
 F. WARREN WRIGHT.